(12) United States Patent
Moriwaki

(10) Patent No.: US 10,386,693 B2
(45) Date of Patent: Aug. 20, 2019

(54) ELECTROPHORETIC ELEMENT AND DISPLAY DEVICE

(71) Applicant: Sharp Kabushiki Kaisha, Sakai, Osaka (JP)

(72) Inventor: Hiroyuki Moriwaki, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 2 days.

(21) Appl. No.: 15/571,479

(22) PCT Filed: Apr. 21, 2016

(86) PCT No.: PCT/JP2016/062646
§ 371 (c)(1),
(2) Date: Nov. 2, 2017

(87) PCT Pub. No.: WO2016/175127
PCT Pub. Date: Nov. 3, 2016

(65) Prior Publication Data
US 2018/0136531 A1    May 17, 2018

(30) Foreign Application Priority Data

Apr. 28, 2015   (JP) ................................ 2015-091568
Nov. 9, 2015    (JP) ................................ 2015-219276

(51) Int. Cl.
*G02B 26/00*    (2006.01)
*G02F 1/167*    (2019.01)
(Continued)

(52) U.S. Cl.
CPC ............... *G02F 1/167* (2013.01); *G09F 9/37* (2013.01); *G09G 3/2003* (2013.01); *G09G 3/344* (2013.01);
(Continued)

(58) Field of Classification Search
CPC ............ G02F 1/167; G02F 2001/1676; G02F 1/134309; G02F 2001/1678;
(Continued)

(56) References Cited

U.S. PATENT DOCUMENTS

2005/0002088 A1   1/2005   Ukigaya
2005/0104844 A1*  5/2005   Nakai ................. G09G 3/3446
                                                           345/107
(Continued)

FOREIGN PATENT DOCUMENTS

JP   2004-333864 A   11/2004
JP   2005-031345 A    2/2005
(Continued)

OTHER PUBLICATIONS

Hiji et al., Novel Color Electrophoretic E-Paper Using Independently Movable Colored Particles, SID 2012 Digest, pp. 85-87.
(Continued)

*Primary Examiner* — Brandi N Thomas
(74) *Attorney, Agent, or Firm* — ScienBiziP, P.C.

(57) ABSTRACT

An electrophoretic element according to an embodiment of the present invention includes: a first substrate and a second substrate facing each other; and an electrophoretic layer provided between the first substrate and the second substrate, and has a plurality of pixels. In each pixel, the electrophoretic layer includes a dispersion medium, and a plurality of types of electrophoretic particles dispersed in the dispersion medium. The plurality of types of electrophoretic particles include first electrophoretic particles and second electrophoretic particles that are charged with the same polarity and have different threshold characteristics from each other. In each pixel, the first substrate includes at least three electrodes to which different potentials can be applied.

20 Claims, 54 Drawing Sheets

(51) Int. Cl.
*G09F 9/37* (2006.01)
*G09G 3/34* (2006.01)
*G09G 3/20* (2006.01)

(52) U.S. Cl.
CPC ............... *G09G 2300/0426* (2013.01); *G09G 2300/0452* (2013.01); *G09G 2310/0264* (2013.01)

(58) Field of Classification Search
CPC ............ G02F 2203/34; G02F 1/13338; G02F 2001/13324; G02F 2001/1672; G02F 1/1362
USPC ............... 359/237, 242, 265–267, 270–273, 359/290–292, 295, 296, 298
See application file for complete search history.

(56) References Cited

U.S. PATENT DOCUMENTS

| | | |
|---|---|---|
| 2008/0303778 A1 | 12/2008 | Machida et al. |
| 2009/0268274 A1 | 10/2009 | Masuzawa et al. |
| 2010/0060623 A1 | 3/2010 | Van Delden et al. |
| 2011/0007381 A1* | 1/2011 | Paolini, Jr. ............... G02F 1/167 359/296 |
| 2011/0043441 A1 | 2/2011 | Tokunaga et al. |
| 2012/0138922 A1 | 6/2012 | Yamazaki et al. |
| 2014/0355104 A1 | 12/2014 | Nakazawa et al. |

FOREIGN PATENT DOCUMENTS

| | | |
|---|---|---|
| JP | 2007-322602 A | 12/2007 |
| JP | 2008-304530 A | 12/2008 |
| JP | 2009-009092 A | 1/2009 |
| JP | 2010-511195 A | 4/2010 |
| JP | 2012-134475 A | 7/2012 |
| JP | 5333045 B2 | 11/2013 |
| JP | 2015-014776 A | 1/2015 |
| WO | 2012/031093 A1 | 3/2012 |

OTHER PUBLICATIONS

Mukherjee et al., The Biprimary Color System for E-Paper: Doubling Color Performance Compared to RGBW, SID 2014 Digest, pp. 869-872.

* cited by examiner

FIG.22
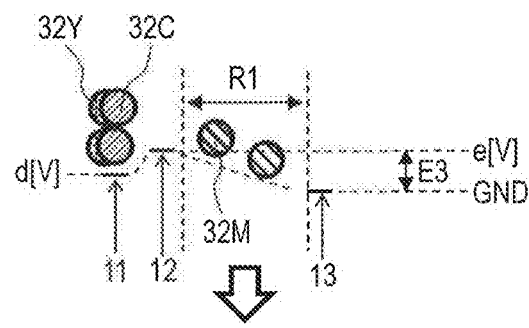
(a) STEP 1 (MAGENTA OUTPUT)
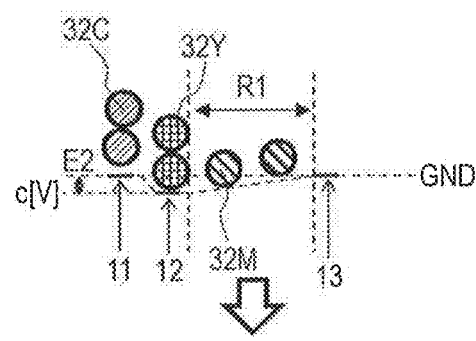
(b) STEP 2
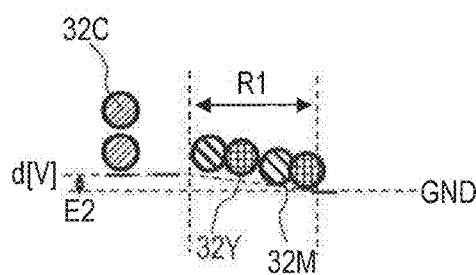
(c) STEP 3 (YELLOW OUTPUT)

ELECTROPHORETIC ELEMENT AND DISPLAY DEVICE

TECHNICAL FIELD

The present invention relates to an electrophoretic element. The present invention also relates to a display device including an electrophoretic element.

BACKGROUND ART

In recent years, electrophoretic displays have been drawing attention as a reflective display device having a low power consumption and a good visibility.

Patent Document Nos. 1 and 2 each disclose an electrophoretic display capable of producing color display as well as black and white display. FIG. 67 shows an electrophoretic display 800 of Patent Document No. 1. FIG. 67 is a cross-sectional view schematically showing one pixel Px of the electrophoretic display 800.

As shown in FIG. 67, the electrophoretic display 800 includes a lower substrate 810, an upper substrate 820, and an insulative liquid 831 sealed therebetween. The insulative liquid 831 includes white particles 832W and black particles 832B dispersed therein. The white particles 832W are positively charged, and the black particles 832B are negatively charged.

A first electrode 811 and a second electrode 812 are provided on the lower substrate 810. A colored plate 813 that is insulative and colored in a particular color is placed over the first electrode 811 and the second electrode 812. A transparent electrode 821 is provided on the upper substrate 820. The area of each of the first electrode 811 and the second electrode 812 is smaller than the area of the transparent electrode 821.

As shown in FIG. 68(a), when a potential of +25 V is applied to the transparent electrode 821 and a potential of +50 V to the first electrode 811 and the second electrode 812, the white particles 832W are drawn to the transparent electrode 821, and the black particles 8322 to the first electrode 811 and the second electrode 812. Therefore, in this state, the pixel Px displays white.

As shown in FIG. 68(b), when a potential of +25 V is applied to the transparent electrode 821 and a potential of 0 V to the first electrode 811 and the second electrode 812, the black particles 832B are drawn to the transparent electrode 821, and the white particles 832W to the first electrode 811 and the second electrode 812. Therefore, in this state, the pixel Px displays black.

As shown in FIG. 68(c), when a potential of +25 V is applied to the transparent electrode 821, a potential of +50 V to the first electrode 811 and a potential of 0 V to the second electrode 812, the black particles 832B are drawn to the first electrode 811, and the white particles 832W to the second electrode 812. At this point, since the area of the colored plate 813 is larger than the area of the white particles 832W and the black particles 832B projected onto the substrate surface, the pixel Px in this state displays the color of the colored plate 813.

Thus, Patent Document No. 1 realizes color display of three colors (white, black and the color of the colored plate 813) with one pixel by using two types of electrophoretic particles that are charged with different polarities from each other (the white particles 832W and the black particles 832B) and the colored plate 813.

FIG. 69 shows three pixels Px1, Px2 and Px3 of the electrophoretic display 800. Of the three pixels Px1, Px2 and Px3 shown in FIG. 69, the left pixel Px1 includes a colored plate 813C of a cyan color, the center pixel Px2 has a colored plate 813M of a magenta color, and the right pixel Px3 has a colored plate 813Y of a yellow color. The electrophoretic element 800 is capable of producing full-color display by mixing together cyan displayed by the pixel Px1, magenta displayed by the pixel Px2 and yellow displayed by the pixel Px3.

In the electrophoretic display disclosed in Patent Document No. 2, a pixel includes positively-charged particles, negatively-charged particles and non-charged particles in a dispersion medium, thereby enabling the pixel to produce color display of three colors. Moreover, pixels including white particles, black particles and cyan particles therein, pixels including white particles, black particles and magenta particles therein, and pixels including white particles, black particles and yellow particles therein are arranged in an array, thereby enabling full-color display.

CITATION LIST

Patent Literature

[Patent Document No. 1] Japanese Laid-Open Patent Publication No. 2005-31345

[Patent Document No. 2] Japanese Laid-Open Patent Publication No. 2009-9092

SUMMARY OF INVENTION

Technical Problem

Conventional electrophoretic displays produce full-color display based on juxtapositional color mixing, and when they are used as reflective display devices, which have restrictions on the amount of ambient light incident thereupon, it is not possible to realize a sufficient brightness and a sufficient color purity. With the electrophoretic displays disclosed in Patent Document Nos. 1 and 2, for example, the three primary colors of cyan, magenta and yellow are assigned to different pixels. Therefore, when producing a single color display of a primary color (that is, a single color display of one of cyan, magenta and yellow), only one out of three pixels contributes to display (i.e., display is produced with ⅓ the area), and it may not be possible to realize a sufficient brightness and a sufficient color purity.

The present invention has been made in view of the problems set forth above, and an object thereof is to provide an electrophoretic element capable of subtractive color mixing (superposition of colors) within a pixel, rather than juxtapositional color mixing (i.e., mixing of colors between pixels).

Solution to Problem

An electrophoretic element according to an embodiment of the present invention is an electrophoretic element including: a first substrate and a second substrate facing each other; an electrophoretic layer provided between the first substrate and the second substrate; and a plurality of pixels each including an opening region through which light is transmitted from the electrophoretic layer to a front side, wherein: in each of the plurality of pixels, the electrophoretic layer includes a dispersion medium, and a plurality of types of electrophoretic particles dispersed in the dispersion medium; the plurality of types of electrophoretic particles include first electrophoretic particles and second electrophoretic particles that are charged with the same polarity and have different threshold characteristics from each other; and in each of the plurality of pixels, the first substrate includes at least three electrodes to which different potentials can be applied.

In an electrophoretic element in one embodiment of the present invention, two or more of the plurality of types of electrophoretic particles can be positioned in the opening region by controlling the potentials of the at least three electrodes.

In one embodiment, the plurality of types of electrophoretic particles include third electrophoretic particles that are charged with a different polarity from the first electrophoretic particles and the second electrophoretic particles; and the at least three electrodes of the first substrate are four or more electrodes to which different potentials can be applied.

In one embodiment, the four or more electrodes include a first electrode, a second electrode, a third electrode and a fourth electrode; and the first electrode, the second electrode, the opening region, the third electrode and the fourth electrode are placed in this order along a certain direction that is parallel to a substrate surface of the first substrate.

In one embodiment, the at least three electrodes include at least one electrode provided in the opening region.

In one embodiment, the at least one electrode provided in the opening region is a reflective electrode having a light-reflecting property.

In one embodiment, the first substrate further includes at least one further electrode that is provided in the opening region, and to which a different potential from the at least three electrodes can be applied.

In one embodiment, the at least one further electrode provided in the opening region is a reflective electrode having a light-reflecting property.

In one embodiment, the plurality of types of electrophoretic particles include third electrophoretic particles and fourth electrophoretic particles that are charged with a different polarity from the first electrophoretic particles and the second electrophoretic particles and have different threshold characteristics from each other; and the at least three electrodes of the first substrate are four or more electrodes to which different potentials can be applied.

In one embodiment, the four or more electrodes include a first electrode, a second electrode, a third electrode and a fourth electrode; and the first electrode, the second electrode, the opening region, the third electrode and the fourth electrode are placed in this order along a certain direction that is parallel to a substrate surface of the first substrate.

In one embodiment, the first substrate includes at least two further electrodes that are provided in the opening region and to which different potentials from the four or more electrodes can be applied.

In an electrophoretic element in one embodiment of the present invention, it is possible to locate two or more of the plurality of types of electrophoretic particles in the opening region by controlling the potentials of the at least two further electrodes as well as the potentials of the four or more electrodes.

In one embodiment, the at least two further electrodes provided in the opening region are each a reflective electrode having a light-reflecting property.

An electrophoretic element in one embodiment of the present invention further includes a light-reflecting layer or a light-absorbing layer that is provided in the opening region on a back side relative to the electrophoretic layer.

In one embodiment, the opening region is substantially colorless and transparent when none of the plurality of types of electrophoretic particles is positioned in the opening region.

In an electrophoretic element in one embodiment of the present invention, in the opening region, the electrophoretic element further comprises a white-colored light-reflecting layer provided on a back side relative to the electrophoretic layer, or the light-reflecting layer and a light diffusion layer provided on a front side relative to the electrophoretic layer; and the plurality of types of electrophoretic particles include cyan-colored electrophoretic particles, magenta-colored electrophoretic particles, yellow-colored electrophoretic particles and black-colored electrophoretic particles.

In embodiment, the cyan-colored electrophoretic particles, the magenta-colored electrophoretic particles and the yellow-colored electrophoretic particles are charged with the same polarity and have different threshold characteristics from each other; and the black-colored electrophoretic particles are charged with a different polarity from the cyan-colored electrophoretic particles, the magenta-colored electrophoretic particles and the yellow-colored electrophoretic particles.

In one embodiment, two types of electrophoretic particles, from among the cyan-colored electrophoretic particles, the magenta-colored electrophoretic particles and the yellow-colored electrophoretic particles, are charged with the same polarity and have different threshold characteristics from each other; and the remaining one type of electrophoretic particles, from among the cyan-colored electrophoretic particles, the magenta-colored electrophoretic particles and the yellow-colored electrophoretic particles, and the black-colored electrophoretic particles are charged with a different polarity from the two types of electrophoretic particles and have different threshold characteristics from each other.

In one embodiment, the second substrate includes at least one electrode to which a potential different from the at least three electrodes can be applied.

In one embodiment, the first substrate further includes an insulating layer covering at least one of the at least three electrodes; and the remaining one or ones of the at least three electrodes are provided on the insulating layer.

In one embodiment, the at least three electrodes of the first substrate are five electrodes to which different potentials can be applied.

In an electrophoretic element in one embodiment of the present invention, a partition wall that divides the electrophoretic layer into pixels is absent.

An electrophoretic element in one embodiment of the present invention further includes: a seal portion that is provided between the first substrate and the second substrate and surrounds the electrophoretic layer; and a plurality of spacers that are provided between the first substrate and the second substrate and define a thickness of the electrophoretic layer.

An electrophoretic element in one embodiment of the present invention further includes a light-blocking layer that is provided in a region, other than the opening region, of each of the plurality of pixels, and is located on a front side relative to the electrophoretic layer, wherein two or more of the at least three electrodes of the first substrate are placed so as to oppose the light-blocking layer.

A display device according to an embodiment of the present invention includes an electrophoretic element as set forth above.

Advantageous Effects of Invention

An embodiment of the present invention provides an electrophoretic element capable of subtractive color mixing (superposition of colors) within a pixel, rather than juxta-positional color mixing (i.e., mixing of colors between pixels).

BRIEF DESCRIPTION OF DRAWINGS

FIG. 22 (a) to (c) are diagrams illustrating a display sequence for red display.

DESCRIPTION OF EMBODIMENTS

Embodiments of the present invention will now be described with reference to the drawings. Note that the present invention is not limited to the following embodiments.

Embodiment 1

Figure 1:
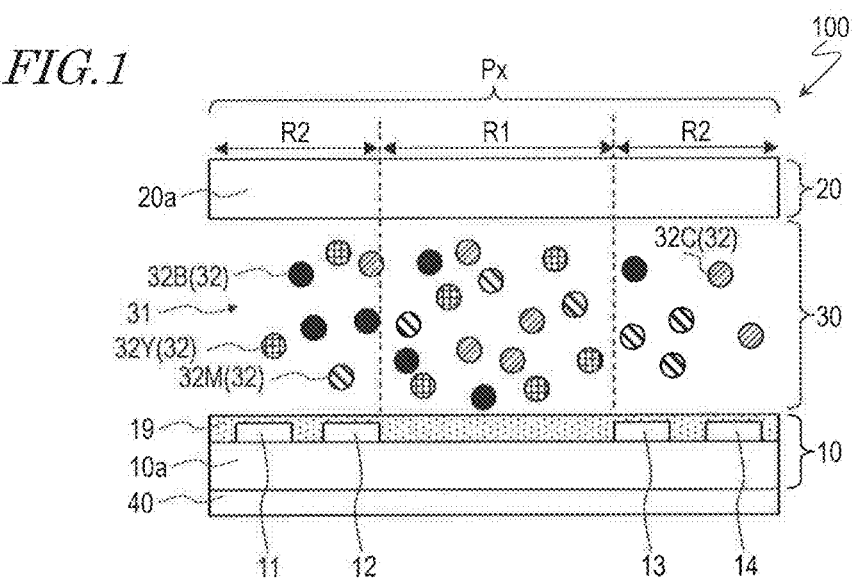
FIG. 1 A cross-sectional view schematically showing an electrophoretic element (display device) 100 according to an embodiment of the present invention.

FIG. 1 shows an electrophoretic element (display device) 100 of the present embodiment. FIG. 1 is a cross-sectional view schematically showing one pixel Px of the electrophoretic element 100.

As shown in FIG. 1 the electrophoretic element 100 includes a first substrate 10 and a second substrate 20 facing each other, and an electrophoretic layer 30 provided between the first substrate 10 and the second substrate 20. In the example shown in FIG. 1, the first substrate 10 is placed on the back side (the side opposite from the observer), and the second substrate 20 placed on the front side (the observer side).

The electrophoretic element 100 also includes a plurality of pixels Px. The plurality of pixels Px each include an opening region R1. The opening region R1 is a region through which light transmitted from the electrophoretic layer 30 to the front side. In a region R2, other than the opening region R1, of each pixel Px, a light-blocking layer (not shown in the figure) is provided, and the light-blocking layer is located on the front side relative to the electrophoretic layer 30. Hereinafter, the region R2 may be referred to as a "light-blocking region".

In each pixel Px, the electrophoretic layer 30 includes a dispersion medium 31, and a plurality of types of electrophoretic particles 32 dispersed in the dispersion medium 31. In the present embodiment, the plurality of types of electrophoretic particles 32 include cyan-colored electrophoretic particles (cyan particles) 32C, magenta-colored electrophoretic particles (magenta particles) 32M, yellow-colored electrophoretic particles (yellow particles) 32Y and black-colored electrophoretic particles (black particles) 32B.

The cyan particles 32C, the magenta particles 32M and the yellow particles 32Y are charged with the same polarity (herein, the positive polarity), and have different threshold characteristics from each other. The black particles 32B are charged with a different polarity (herein, the negative polarity) from the cyan particles 32C, the magenta particles 32M and the yellow particles 32Y.

In each pixel Px, the first substrate 10 includes four (four types of) electrodes 11, 12, 13 and 14 to which different potentials can be applied. The four electrodes (specifically, the first electrode 11, the second electrode 12, the third electrode 13 and the fourth electrode 14) are supported by a transparent substrate 10a. An insulating layer 19 is formed so as to cover the first electrode 11, the second electrode 12, the third electrode 13 and the fourth electrode 14. In the example shown in FIG. 1, the first electrode 11, the second electrode 12, the opening region R1, the third electrode 13 and the fourth electrode 14 are placed in this order along a certain direction (the direction from the left side toward the right side in FIG. 1) that is parallel to the substrate surface of the first substrate 10.

The second substrate 20 includes a transparent substrate 20a. Note that as opposed to the example shown in FIG. 1, the second substrate 20 may be placed on the back side and the first substrate 10 may be placed on the front side.

The electrophoretic element 100 further includes a white-colored light-reflecting layer 40 provided on the back side relative to the electrophoretic layer 30 in the opening region Px. Note that although FIG. 1 illustrates a configuration in which the light-reflecting layer 40 is placed on the back side of the transparent substrate 10a, the light-reflecting layer 40 may be provided on the front side of the transparent substrate 10a (i.e., between the transparent substrate 10a and the electrophoretic layer 30). The light-reflecting layer 40 may be a diffuse reflection layer that diffusively reflects light, or may be a specular reflection layer that specularly reflects light. When a specular reflection layer is used as the light-reflecting layer 40, it is preferably used in combination with a light diffusion layer (forward diffusion layer) provided on the front side relative to the electrophoretic layer 30.

With the electrophoretic element 100 of the present embodiment, it is possible to apply a transverse electric field to the electrophoretic layer 30 by controlling the potentials of the four electrodes 11, 12, 13 and 14, and it is therefore possible to locate two or more of the plurality of types of electrophoretic particles 32 in the opening region R1. Thus, it is possible to realize subtractive color mixing (superposition of colors) within a pixel Px, rather than juxtapositional color mixing (i.e., mixing or colors between pixels Px). Display principles of the electrophoretic element 100 will now be described. First, the threshold characteristics of the electrophoretic particles 32 will be described.

[Threshold Characteristics of Electrophoretic Particles]

Figure 2:
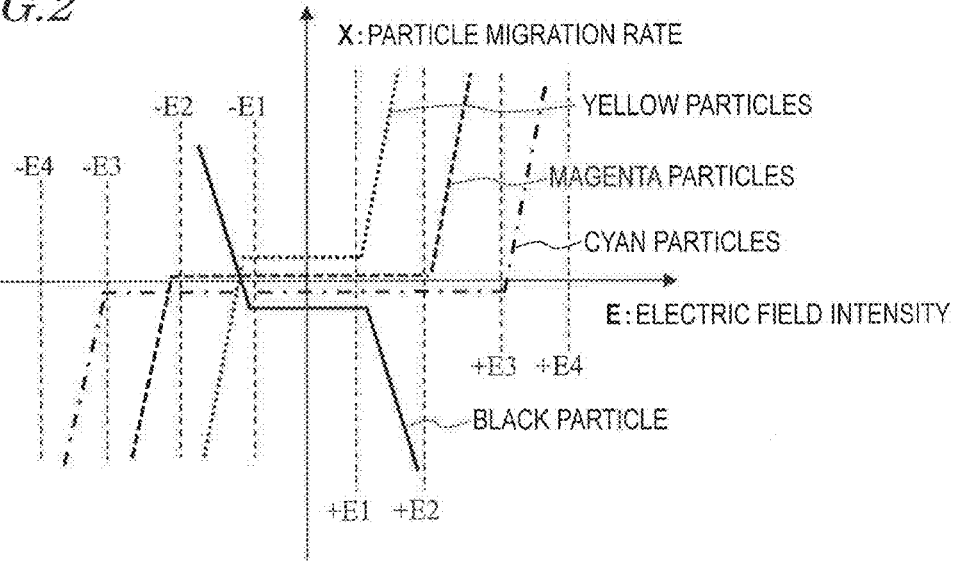
FIG. 2 A graph showing an example of threshold characteristics of cyan particles 32C, magenta particles 32M, yellow particles 32Y and black particles 32B included in an electrophoretic layer 30 of the electrophoretic element 100.

FIG. 2 shows an example of threshold characteristics of the cyan particles 32C, the magenta particles 32M, the yellow particles 32Y and the black particles 32B. FIG. 2 is a graph whose horizontal axis represents the electric field intensity E and whose vertical axis represents the particle migration rate X. The absolute values |E1|, |E2|, |E3| and =E4| of the electric field intensities +E1, +E2, +E3, +E4, −E1, −E2, −E3 and −E4 shown in FIG. 2 satisfy the relationship |E1|<|E2|<|E3|<|E4|. As can be seen from FIG. 2, the cyan particles 32C move in the positive direction (the direction from the high-potential electrode side toward the low-potential electrode side) when +E3<E and move in the negative direction (the direction from the low-potential electrode side toward the high-potential electrode side) when E<−E3. Similarly, the magenta particles 32M move in the positive direction when +E2<E and move in the negative direction when E<−E2, and the yellow particles 32Y move in the positive direction when +E1<E and move in the negative direction when E<−E1. The black particles 32B move in the negative direction when +E1<E and move in the positive direction when E<−E1. As used in the present specification, the voltage (electric field intensity) at which the electrophoretic particles 32 start to move may be referred to as the threshold voltage (threshold electric field intensity).

Next, a display sequence for white display and a display sequence for black display will be described. Note that the six potential levels a [V], b [V], c [V], d [V], e [V] and f [V], as well as the ground potential GND (0 V), will be referred to in the following description. The ground potential GND and these six potential levels satisfy the relationship a<b<c<0<d<e<f. When the potential level difference between adjacent electrodes is one (e.g., when the potentials a [V] and b [V] are applied to two adjacent electrodes), a potential gradient corresponding to the electric field intensity E2 (+E2 or −E2) is formed between the electrodes. Similarly, when the potential level difference between adjacent electrodes is two (e.g., when the potentials a [V] and c [V] are applied to two adjacent electrodes), a potential gradient corresponding to the electric field intensity E3 (+E3 or −E3) is formed between the electrodes. When the potential level difference between adjacent electrodes is three (e.g., when the potential a [V] and the ground potential GND are applied to two adjacent electrodes), a potential gradient corresponding to the electric field intensity E4 (+E4 or −E4) is formed between the electrodes.

[White Display (Reset)]

Figure 3:
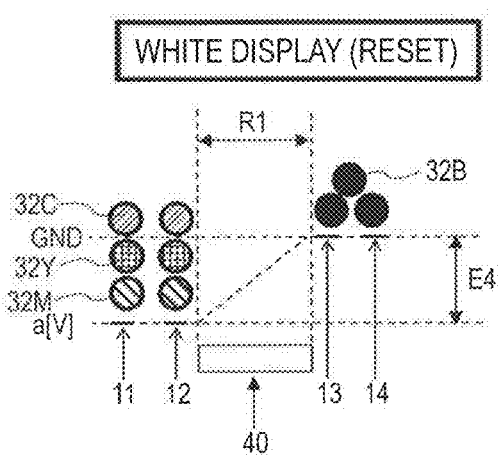
FIG. 3 A diagram illustrating a display sequence for white display.

FIG. 3 is a diagram illustrating a display sequence for white display. As shown in FIG. 3, the potentials of the first electrode 11 and the second electrode 12 are set to a [V], and the potentials of the third electrode 13 and the fourth electrode 14 are set to the ground potential GND. At this point, since a potential gradient corresponding to the electric field intensity E4 is formed in the opening region R1, the cyan particles 32C, the magenta particles 32M and the yellow particles 32Y are positioned over the first electrode 11 and the second electrode 12, and the black particles 32B are positioned over the third electrode 13 and the fourth electrode 14. In this state, since the electrophoretic particles 32 are absent in the opening region R1, the external light (ambient light) entering the electrophoretic layer 30 from the observer side reflected by the light-reflecting layer 40, thereby producing white display.

With the electrophoretic element 100, switching from one color to another is basically done via this white display state. Therefore, white display can also be said to be a reset operation.

[Black Display]

Figure 4:
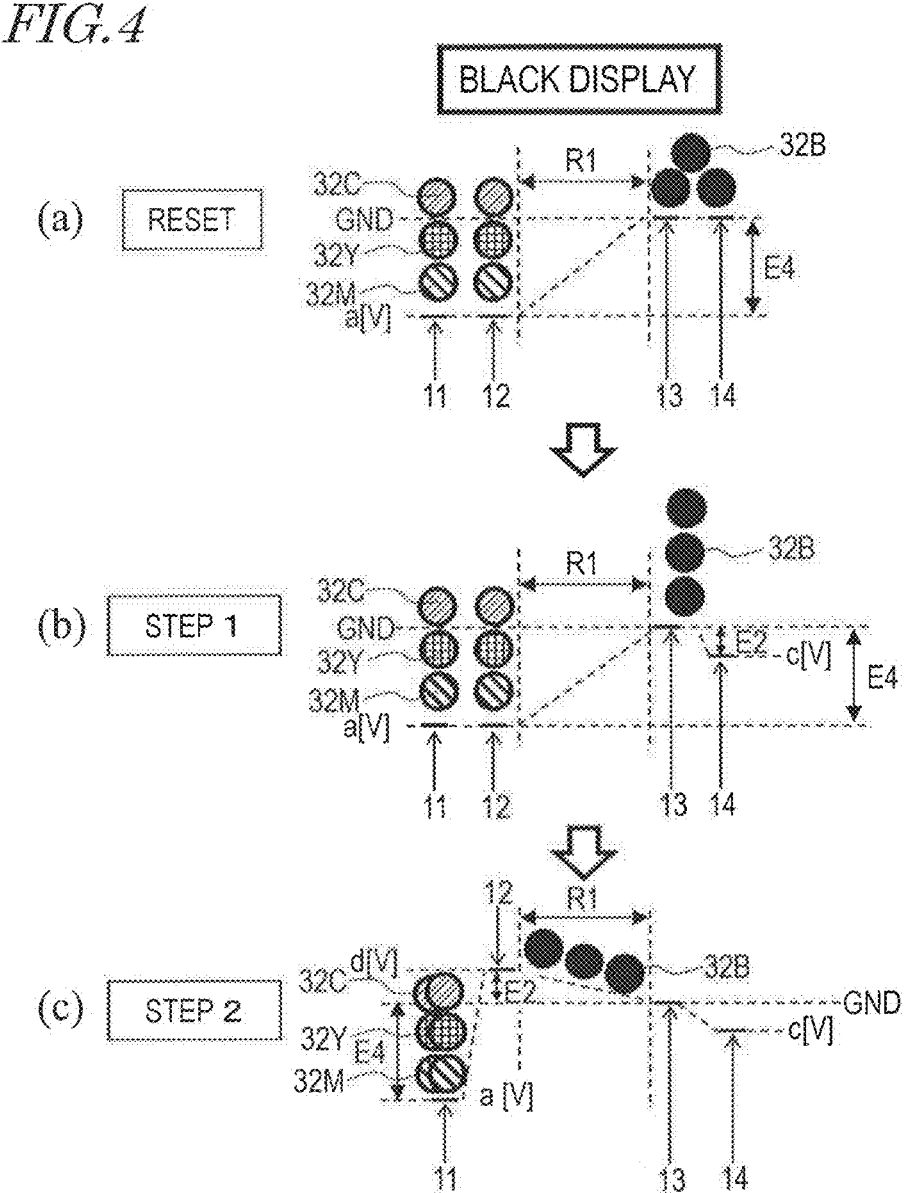
FIG. 4 (a) to (c) are diagrams illustrating a display sequence for black display.

FIGS. 4(a) to 4(c) are diagrams illustrating a display sequence for black display. First, as shown in FIG. 4(a), the same potentials as those in the white display state are applied to the first electrode 11, the second electrode 12, the third electrode 13 and the fourth electrode 14, thus resetting display.

Next, as shown in FIG. 4(b), the potential of the fourth electrode 14 is set to c [V] (step 1). At this point, since a potential gradient corresponding to the electric field intensity E2 is formed between the third electrode 13 and the fourth electrode 14, the black particles 32B move from over the fourth electrode 14 to over the third electrode 13.

Then, as shown in FIG. 4(c), the potential of the second electrode 12 is set to d [V] (step 2). At this point, since a potential gradient corresponding to the electric field intensity E2 is formed between the second electrode 12 and the third electrode 13 (i.e., in the opening region R1), the black particles 32B move from over the third electrode 13 to the opening region R1. Therefore, in this state, black display is produced.

Next, display sequences for single-color display of cyan, magenta and yellow will be described.

[Cyan Display]

Figure 5:
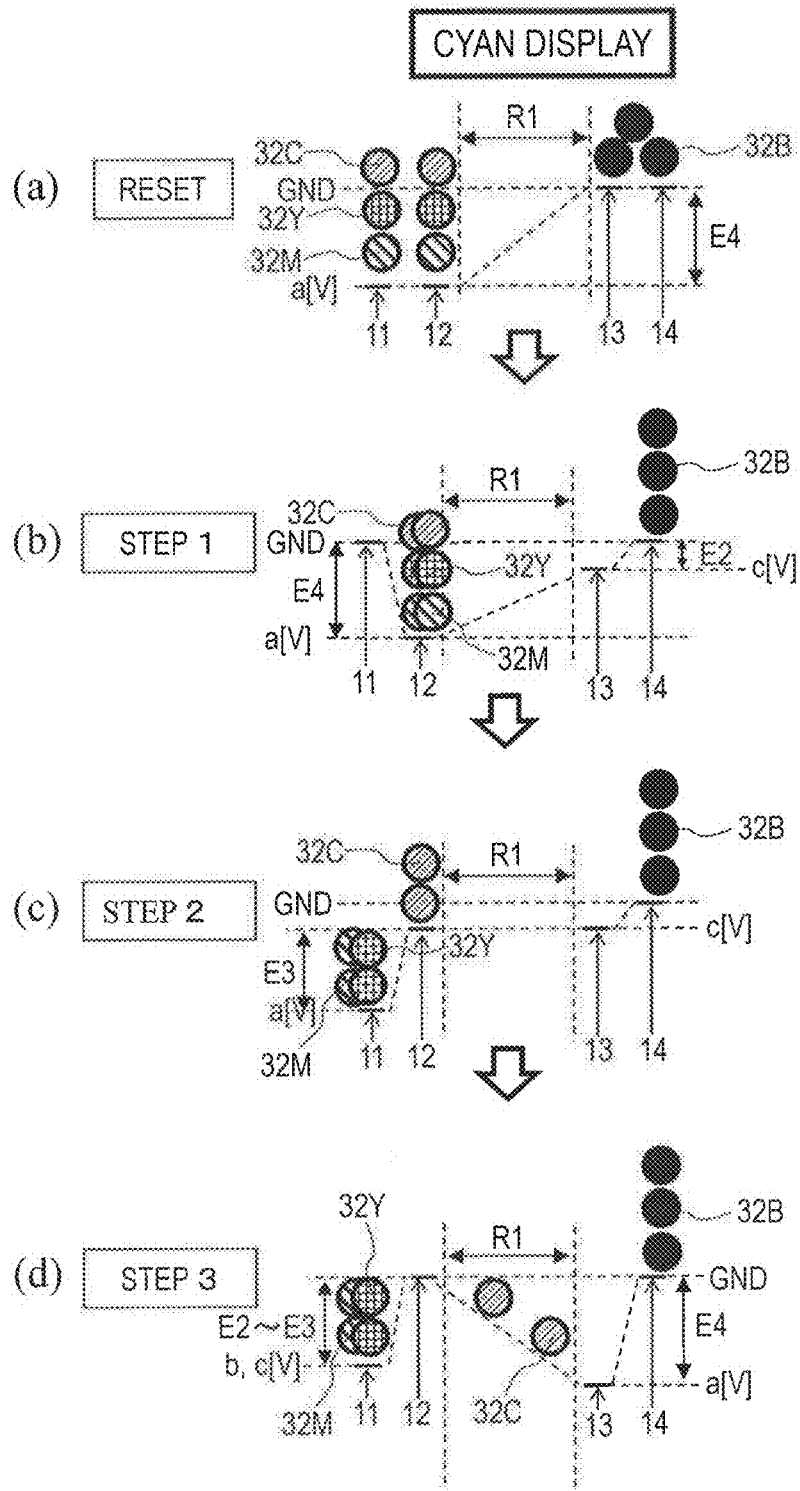
FIG. 5 (a) to (d) are diagrams illustrating a display sequence for cyan display.

FIGS. 5(a) to 5(d) are diagrams illustrating a display sequence for cyan display. First, as shown in FIG. 5(a), the same potentials as those in the white display state are applied to the first electrode 11, the second electrode 12, the third electrode 13 and the fourth electrode 14, thereby performing the reset operation.

Next, as shown in FIG. 5(b), the potential of the first electrode 11 is set to the ground potential GND, and the potential of the third electrode 13 is set to c [V] (step 1). At this point, a potential gradient corresponding to the electric field intensity E4 is formed between the first electrode 11 and the second electrode 12, and a potential gradient corresponding to the electric intensity E2 is formed between the third electrode 13 and the fourth electrode 14. Therefore, the cyan particles 32C, the magenta particles 32M and the yellow particles 32Y move from over the first electrode 11 to over the second electrode 12, and the black particles 32B move from over the third electrode 13 to over the fourth electrode 14.

Next, as shown in FIG. 5(c), the potential of the first electrode 11 is set to a [V], and the potential of the second electrode 12 is set to c [V] (step 2). At this point, since a potential gradient corresponding to the electric field intensity E3 is formed between the first electrode 11 and the second electrode 12, the magenta particles 32M and the yellow particles 32Y move from over the second electrode 11 to over the first electrode 11 (the cyan particles 32C remain over the second electrode 12).

Then, as shown in FIG. 5(d), the potential of the first electrode 11 is set to b [V] or c [V], the potential of the second electrode 12 is set to the ground potential GND, and the potential of the third electrode 13 is set to a [V] (step 3). At this point, since a potential gradient corresponding to the electric field intensity E2 or E3 is formed between the first electrode 11 and the second electrode 12, and a potential gradient corresponding to the electric field intensity E4 is formed between the second electrode 12 and the third electrode 13 (i.e., in the opening region R1), the cyan particles 32C move from over the electrode 12 to the opening region R1. Therefore, in this state, cyan display is produced.

[Magenta Display]

Figure 6:
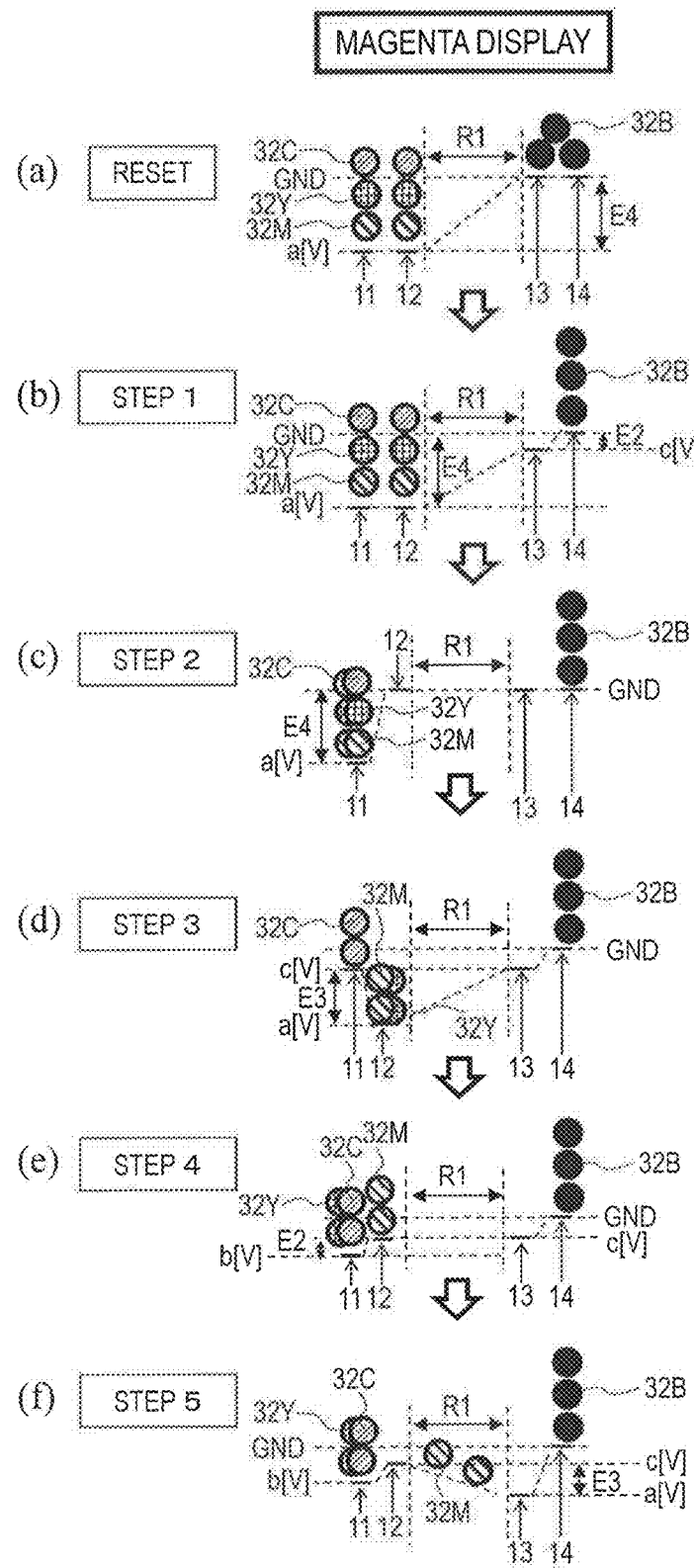
FIG. 6 (a) to (f) are diagrams illustrating a display sequence for magenta display.

FIGS. 6(a) to 6(f) are diagrams illustrating a display sequence for magenta display. First, as shown in FIG. 6(a), the same potentials as those in the white display state are applied to the first electrode 11, the second electrode 12, the third electrode 13 and the fourth electrode 14, thus resetting display.

Next, as shown in FIG. 6(b), the potential of the third electrode 13 is set to c [V] (step 1). At this point, since a potential gradient corresponding to the electric field intensity E2 is formed between the third electrode 13 and the fourth electrode 14, the black particles 32B move from over the third electrode 13 to over the fourth electrode 14.

Next, as shown in FIG. 6(c), the potentials of the second electrode 12 and the third electrode 13 are set to the ground potential GND (step 2). At this point, since a potential gradient corresponding to the electric field intensity E4 is formed between the first electrode 11 and the second electrode 12, the cyan particles 32C, the magenta particles 32M and the yellow particles 32Y move from over the second electrode 12 to over the first electrode 11.

Next, as shown in FIG. 6(d), the potentials of the first electrode 11 and the third electrode 13 are set to c [V], and the potential of the second electrode 12 is set to a [V] (step 3). At this point, since a potential gradient corresponding to the electric field intensity E3 is formed between the first electrode 11 and the second electrode 12, the magenta particles 32M and the yellow particles 32C move from over the first electrode 11 to over the second electrode 12.

Next, as shown in FIG. 6(e), the potential of the first electrode 11 is set to b [V], and the potential of the second electrode 12 is set to c [V] (step 4). At this point, since a potential gradient corresponding to the electric field intensity E2 is formed between the first electrode 11 and the second electrode 12, the yellow particles 32Y move from over the second electrode 12 to over the first electrode 11.

Then, as shown in FIG. 6(f), the potential of the third electrode 13 is set to a [V] (step 5). At this point, since a potential gradient corresponding to the electric field intensity E3 is formed between the second electrode 12 and the third electrode 13 (i.e., in the opening region R1), the magenta particles 32M move from over the second electrode 12 to the opening region R1. Therefore, in this state, magenta display is produced.

[Yellow Display]

Figure 7:
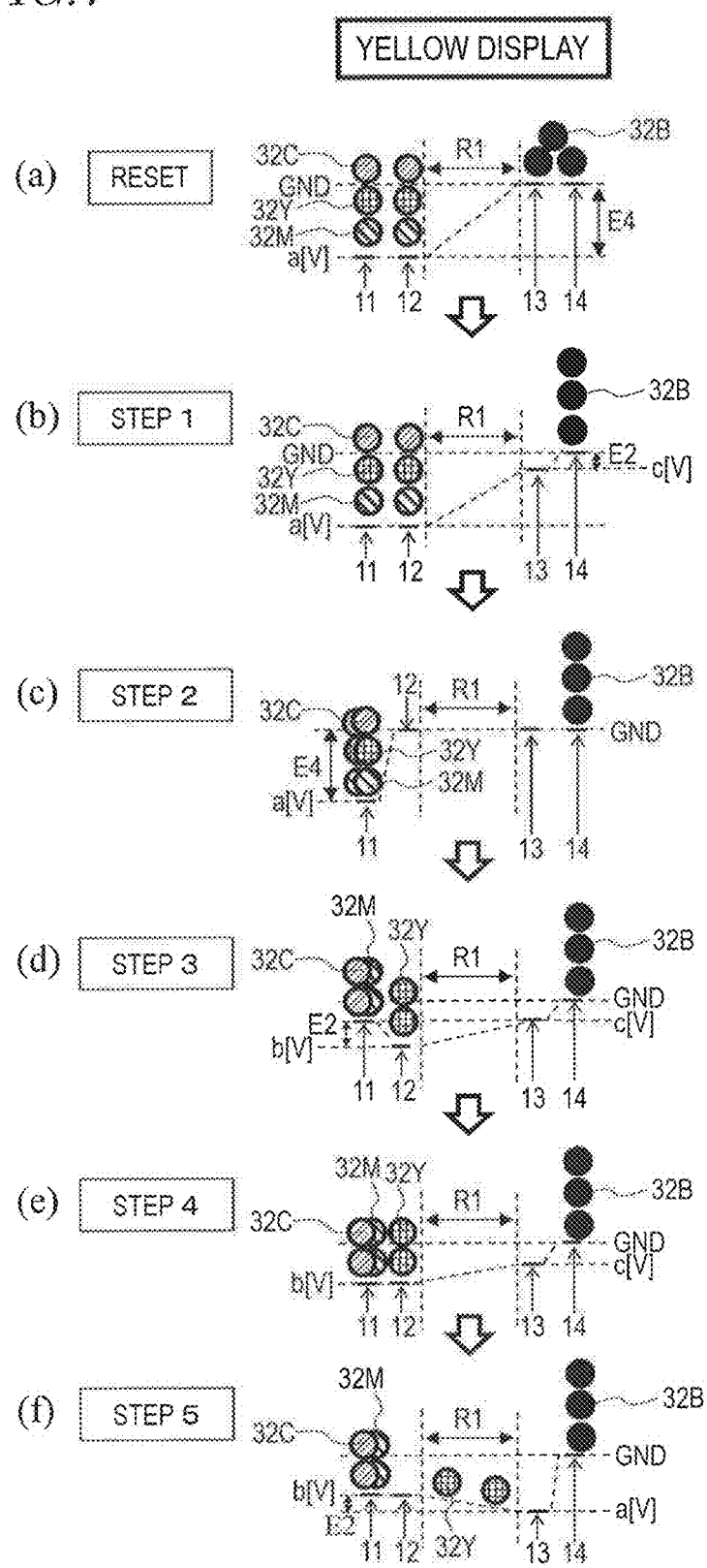
FIG. 7 (a) to (f) are diagrams illustrating a display sequence for yellow display.

FIGS. 7(a) to 7(f) are diagrams illustrating a display sequence for yellow display. First, as shown in FIG. 7(a), the same potentials as those in the white display state are applied to the first electrode 11, the second electrode 12, the third electrode 13 and the fourth electrode 14, thus resetting display.

Next, as shown in FIG. 7(b), the potential of the third electrode 13 is set to c [V] (step 1). At this point, since a potential gradient corresponding to the electric field intensity E2 is formed between the third electrode 13 and the fourth electrode 14, the black particles 32B move from over the third electrode 13 to over the fourth electrode 14.

Next, as shown in FIG. 7(c), the potentials of the second electrode 12 and the third electrode 13 are set to the ground potential GND (step 2). At this point, since a potential gradient corresponding to the electric field intensity E4 is formed between the first electrode 11 and the second electrode 12, the cyan particles 32C, the magenta particles 32M and the yellow particles 32Y move from over the second electrode 12 to over the first electrode 11.

Next, as shown in FIG. 7(d), the potentials of the first electrode 11 and the third electrode 13 are set to c [V], and the potential of the second electrode 12 is set to b [V] (step 3). At this point, since a potential gradient corresponding to the electric field intensity E2 is formed between the first electrode 11 and the second electrode 12, the yellow particles 32C move from over the first electrode 11 to over the second electrode 12.

Next, as shown in FIG. 7(e), the potential of the first electrode 11 is set to b [V]. At this point, since no such potential gradient that moves the electrophoretic particles 32 is formed between adjacent electrodes, the cyan particles 32C and the magenta particles 32M remain over the first electrode 11, the yellow particles 32Y over the second electrode 12, and the black particles 32B over the fourth electrode 14.

Then, as shown in FIG. 7(f), the potential of the third electrode 13 is set to a [V] (step 5). At this point, since a potential gradient corresponding to the electric field intensity E2 is formed between the second electrode 12 and the third electrode 13 (i.e., in the opening region R1), the yellow particles 32Y move from over the second electrode 12 to opening region R1. Therefore, in this state, yellow display is produced.

Next, display sequences for green display (mixed color display between cyan and yellow), blue display (mixed color display between cyan and magenta) and red display (mixed color display between magenta and yellow) will be described.

[Green Display]

Figure 8:
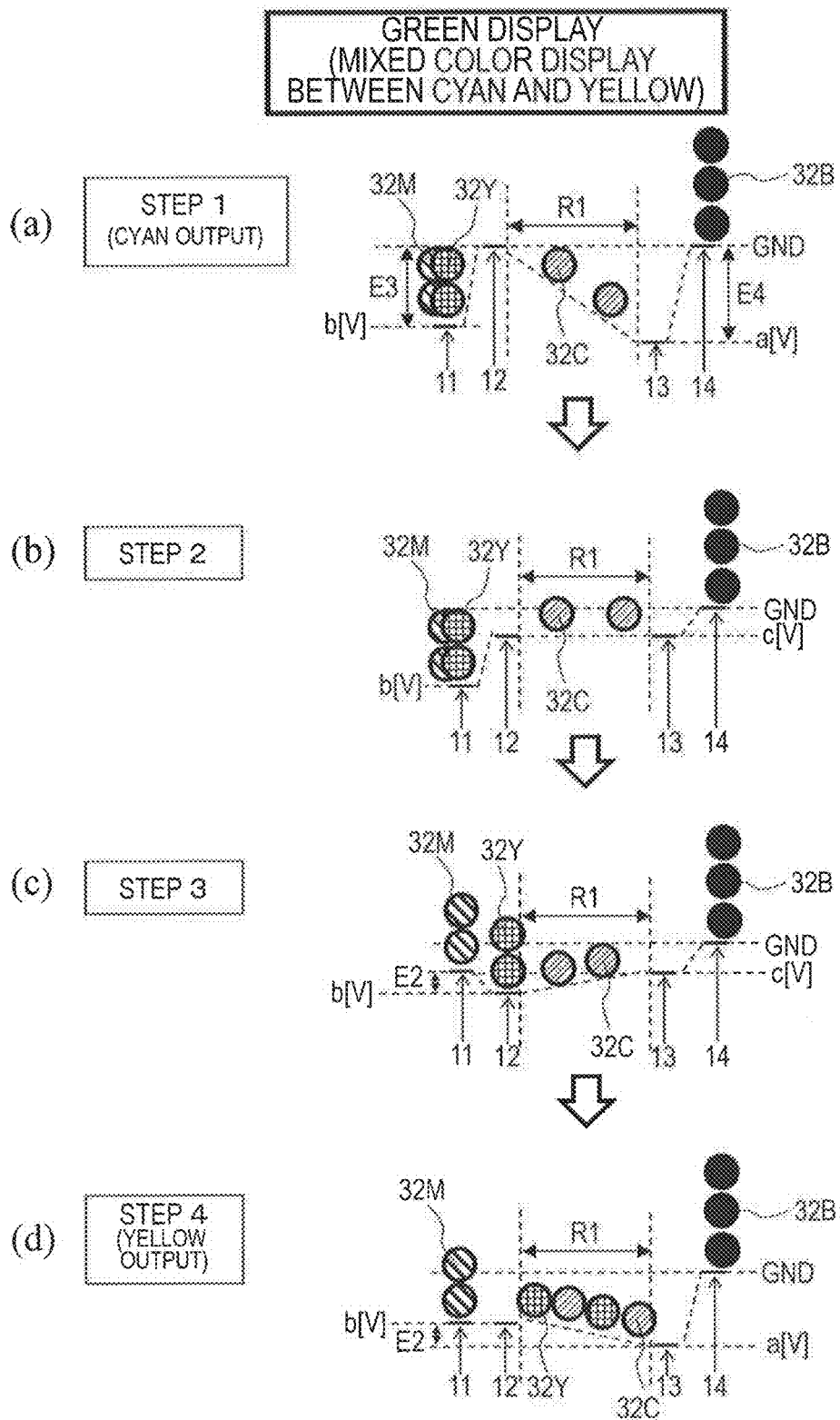
FIG. 8 (a) to (d) are diagrams illustrating a display sequence for green display.

FIGS. 8(a) to 8(d) are diagrams illustrating a display sequence for green display (i.e., mixed color display between cyan and yellow). First, as shown in FIG. 8(a), the cyan particles 32C are moved to the opening region R1, as in the display sequence for cyan display (step 1: cyan output).

Next, as shown in FIG. 8(b), the potentials of the second electrode 12 and the third electrode 13 are set to c [V] (step 2). At this point, since no such potential gradient that moves the electrophoretic particles 32 is formed between adjacent electrodes, the magenta particles 32M and the yellow particles 32Y remain over the first electrode 11, the cyan particles 32C in the opening region R1, and the black particles 32B over the fourth electrode 14.

Next, as shown in FIG. 8(c), the potential of the first electrode 11 is set to c [V], and the potential of the second electrode 12 is set to b [V] (step 3). At this point, since a potential gradient corresponding to the electric field intensity E2 is formed between the first electrode 11 and the second electrode 12, the yellow particles 32Y move from over the first electrode 11 to over the second electrode 12.

Then, as shown in FIG. 8(d), the potential of the first electrode 11 is set to b [V], and the potential of the third electrode 13 is set to a [V] (step 4). At this point, since a potential gradient corresponding to the electric field intensity E2 is formed between the second electrode 12 and the third electrode 13 (i.e., in the opening region R1), the yellow particles 32Y move from over the second electrode 12 to the opening region R1 (yellow output). Therefore, in this state, green display is produced by subtractive color mixing between cyan and yellow.

[Blue Display]

Figure 9:
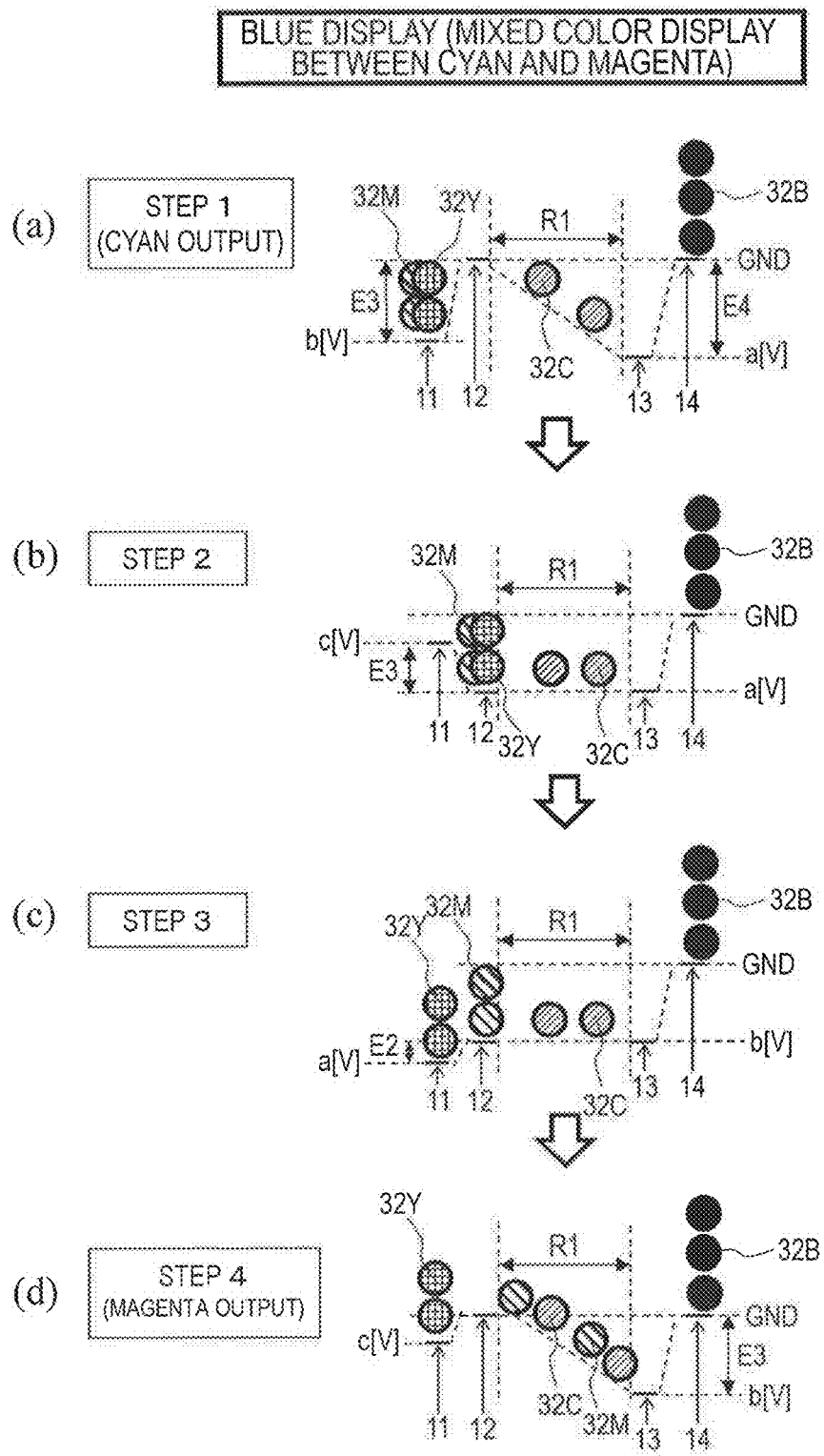
FIG. 9 (a) to (d) are diagrams illustrating display sequence for blue display.

FIGS. 9(a) to 9(d) are diagrams illustrating a display sequence for blue display (i.e., mixed color display between cyan and magenta). First, as shown in FIG. 9(a), the cyan particles 32C are moved to the opening region R1, as in the display sequence for cyan display (step 1: cyan output).

Next, as shown in FIG. 9(b), the potential of the first electrode 11 is set to c [V], and the potential of the second electrode 12 is set to a [V] (step 2). At this point, since a potential gradient corresponding to the electric field intensity E3 is formed between the first electrode 11 and the second electrode 12, the magenta particles 32M and the yellow particles 32Y move from over the first electrode 11 to over the second electrode 12.

Next, as shown in FIG. 9(c), the potential of the first electrode 11 is set to a [V], and the potentials of the second electrode 12 and the third electrode 13 are set to b [V] (step 3). At this point, since a potential gradient corresponding to the electric field intensity E2 is formed between the first electrode 11 and the second electrode 12, the yellow particles 32Y move from over the second electrode 12 to over the first electrode 11.

Then, as shown in FIG. 9(d), the potential of the first electrode 11 is set to c [V], and the potential of the second electrode 12 is set to the ground potential GND (step 4). At this point, since a potential gradient corresponding to the electric field intensity E3 is formed between the second electrode 12 and the third electrode 13 (i.e., in the opening region R1), the magenta particles 32M move from over the second electrode 12 to the opening region R1 (magenta output). Therefore, in this state, blue display is produced by subtractive color mixing between cyan and magenta.

[Red Display]

Figure 10:
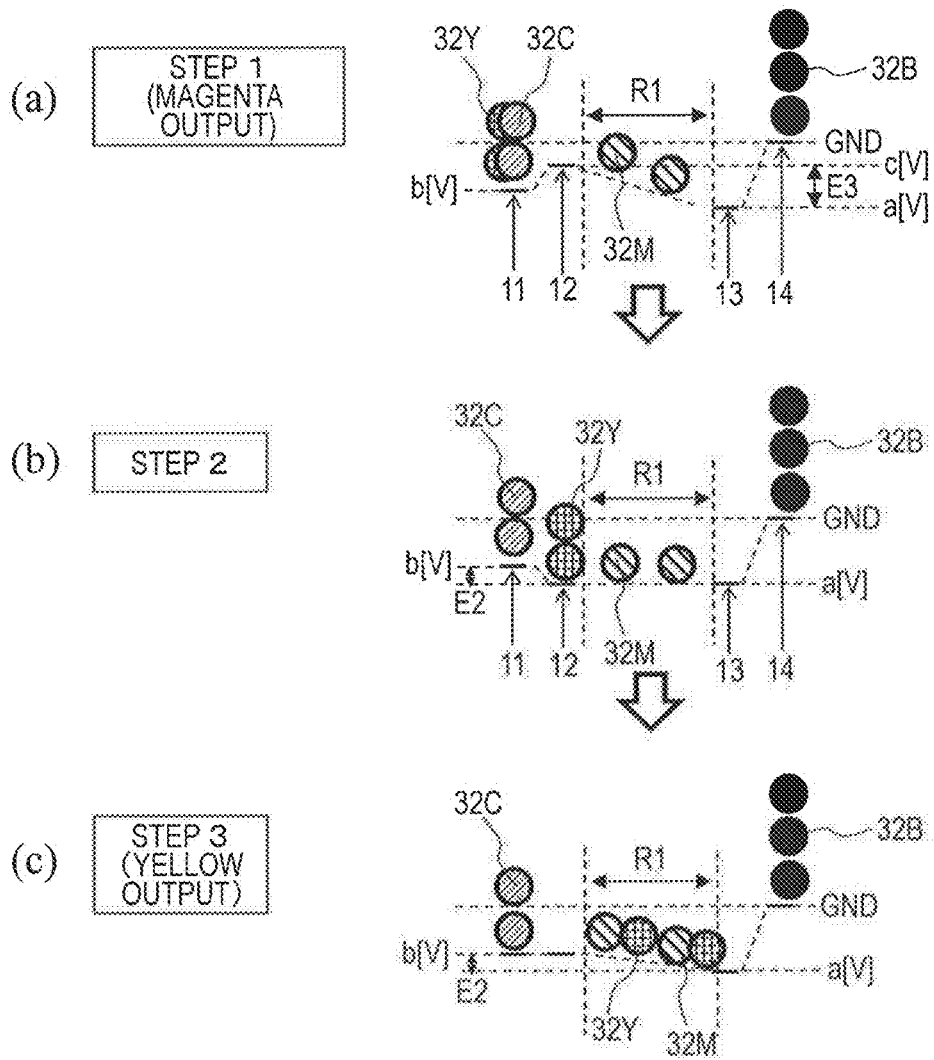
FIG. 10 (a) to (c) are diagrams illustrating a display sequence for red display.

FIGS. 10(a) to 10(c) are diagrams illustrating a display sequence for red display (i.e., mixed color display between magenta and yellow). First, as shown in FIG. 10(a), the magenta particles 32M are moved to the opening region R1, as in the display sequence for magenta display (step 1: magenta output).

Next, as shown in FIG. 10(b), the potential of the second electrode 12 is set to a [V] (step 2). At this point, since a potential gradient corresponding to the electric field intensity E2 is formed between the first electrode 11 and the second electrode 12, the yellow particles 32Y move from over the first electrode 11 to over the second electrode 12.

Then, as shown in FIG. 10(c), the potential of the second electrode 12 is set to b [V] (step 3). At this point, since a potential gradient corresponding to the electric field intensity E2 is formed between the second electrode 12 and the third electrode 13 (i.e., in the opening region R1), the yellow particles 32Y move from over the second electrode 12 to the opening region R1 (yellow output). Therefore, in this state, red display is produced by subtractive color mixing between magenta and yellow.

As described above, with the electrophoretic element 100 of the present embodiment, by controlling the potentials of the plurality of electrodes 11, 12, 13 and 14 of the first substrate 10, it is possible to locate any one or more of the plurality of types of electrophoretic particles 32 in the opening region R1. Therefore, it is possible to produce display in which only one type of electrophoretic particles 32 is positioned in the opening region R1 (herein, black display, cyan display, magenta display and yellow display), and it is possible to produce display in which none of the types of electrophoretic particles 32 is positioned in the opening region R1 (herein, white display). Moreover, with the electrophoretic element 100 of the present embodiment, it is also possible to produce display in which two or more of the plurality of types of electrophoretic particles 32 are positioned in the opening region R1 (e.g., green display, blue display and red display illustrated above). Thus, it is possible to realize subtractive color mixing (superposition of colors) within a pixel Px, rather than juxtapositional color mixing (i.e., mixing or colors between pixels Px). As can be seen from the description above, mixed color display can be produced by moving (outputting) electrophoretic particles 32 to the opening region R1, starting from those having a higher threshold voltage (threshold electric field intensity). Moreover, by controlling the potential difference and/or the output time between the second electrode 12 and the third electrode 13, it is possible to adjust the amount of the electrophoretic particles 32 to move to the opening region R1, thus realizing gray level display.

Note that although the present embodiment illustrates a case in which the electrophoretic layer 30 includes four types of electrophoretic particles 32, the number of types of electrophoretic particles 32 is not limited to four. It is only required that the electrophoretic layer 30 includes therein at least two types of electrophoretic particles ("first electrophoretic particles" and "second electrophoretic particles") that are charged with the same polarity and have different threshold characteristics from each other.

When the plurality of types of electrophoretic particles 32 include electrophoretic particles ("third electrophoretic particles") that are charged with a different polarity from the two types of electrophoretic particles (the first electrophoretic particles and the second electrophoretic particles) described above, as in the present embodiment, the number of control parameters for the electrophoretic particles 32 increases, and it is therefore possible to provide a large margin for crosstalk occurring between the plurality of types of electrophoretic particles 32 that are threshold-controlled.

Although the first substrate 10 includes four (four types of) electrodes 11, 12, 13 and 14 in each pixel Px in the present embodiment, the first substrate 10 may include three (three types of) electrodes in each pixel Px as in Embodiment 2 to be described below, or the first substrate 10 may include five (five types of) electrodes (or six or more (six or more types of) electrodes) in each pixel Px as in Embodiment 3 to be described below. When the electrophoretic layer 30 includes three types of electrophoretic particles 32 that are charged with the same polarity and have different threshold characteristics from each other and another type of electrophoretic particles 32 that is charged with a different polarity, as in the present embodiment, it is preferred that the first substrate 10 includes four or more (four or more types of) electrodes in each pixel Px. With the provision of four or more electrodes in each pixel Px, any (at least one of) the four types of electrophoretic particles 32 described above can be selectively positioned in the opening region Px.

When the light-reflecting layer 40 is provided, in the opening region R1, on the back side relative to the electrophoretic layer 30, as in the present embodiment, the number of types of electrophoretic particles 32 can be reduced by the number of colors of the light-reflecting layer 40 (i.e., one), thereby making threshold control easier. Note that the color of the light-reflecting layer 40 is not limited to a white color as illustrated above. The light-reflecting layer 40 may be in a black color or a particular chromatic color (e.g., cyan, magenta or yellow). A light-absorbing layer may be provided instead of the light-reflecting layer 40.

When the cyan particles 32C, the magenta particles 32M, the yellow particles 32Y and the black particles 32B are used as the electrophoretic particles 32 in addition to the provision of the white-colored light-reflecting layer 40, as in the present embodiment, it is possible to produce color display comparable to photogravure in one pixel.

[Specific Configuration Example for Active Matrix Driving]

The electrophoretic element (display device) 100 of the present embodiment is typically driven by active matrix addressing. A specific configuration example of the active matrix-type display device 100 will now be described.

Figure 11:
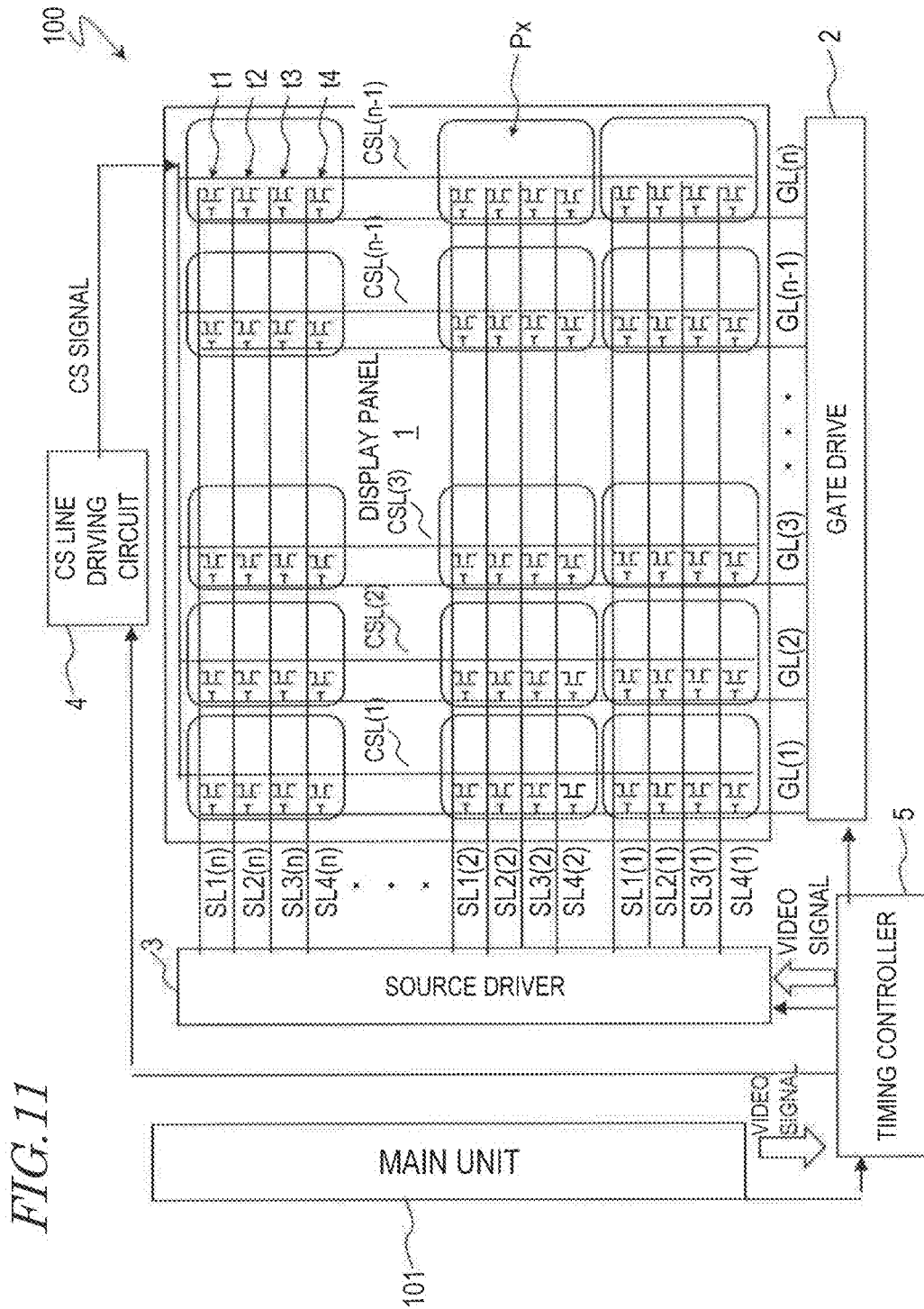
FIG. 11 A diagram schematically showing an active matrix-type electrophoretic element (display device) 100.

FIG. 11 shows a specific configuration example of the display device 100. In the example shown in FIG. 11, the display device 100 includes a main unit 101, a display panel 1, a gate driver (scanning line driving circuit) 2 and a source driver (signal line driving circuit) 3. The display device 100 also includes a storage capacitor line driving circuit (CS line driving circuit) 4 and a timing controller 5.

The display panel 1 includes four thin film transistors (TFTs) t1, t2, t3 and t4 provided in each pixel Px. The display panel 1 also includes a gate line GL provided for each pixel row, four source lines SL1, SL2, SL3 and SL4 provided for each pixel column, and a storage capacitor line (CS line) CSL provided for each pixel row. In FIG. 11, a gate line GL corresponding to the $n^{th}$ pixel row is denoted as GL(n), and the source lines SL1, SL2, SL3 and SL4 corresponding to the $n^{th}$ pixel column are denoted as SL1(n), SL2(n), SL3(n) and SL4(n). A CS line CSL corresponding to the $n^{th}$ pixel row is denoted as CSL(n).

The gate driver 2 supplies scanning signal voltages to the gate lines GL. The source driver 3 calculates the value of the voltage to be output to each pixel Px based on a video signal that is received from the main unit 101 via the timing controller 5, and supplies a display signal voltage of the calculated value to the source lines SL1, SL2, SL3 and SL4.

The CS line driving circuit 4 outputs CS signals to the CS lines CSL based on signals received from the timing controller 5.

Based on the clock signal, the horizontal sync signal and the vertical sync signal received from the main unit 101, the timing controller 5 outputs, to the gate driver 2 and the source driver 3, a signal that serves as a reference for the gate driver 2 and the source driver 3 to operate in sync with each other. Specifically, based on the vertical sync signal, the timing controller 5 outputs a gate start pulse signal, a gate clock signal and a gate output enable signal to the gate driver 2. Based on the horizontal sync signal, the timing controller 5 outputs a source start pulse signal, a source latch strobe signal and a source clock signal to the source driver 3.

The gate driver 2 starts scanning the display panel 1 using the gate start pulse signal received from the timing controller 5 as a trigger, and applies the ON voltage successively to the gate lines GL based on the gate clock signal, which is a signal used for shifting the selection state of the gate lines GL. Based on the source start pulse signal received from the timing controller 5, the source driver 3 stores received image data of each pixel in the register in accordance with the source clock signal. Then, after storing the image data, the source driver 3 writes the image data on the source lines SL1, SL2, SL3 and SL4 of the display panel 1 in accordance with the next source latch strobe signal. An analog amplifier of the source driver 3, for example, is used for writing the image data.

The main unit 101 transmits the video signal and the video sync signal to the timing controller 5 in order to control the display on the display panel 1.

Figure 12:
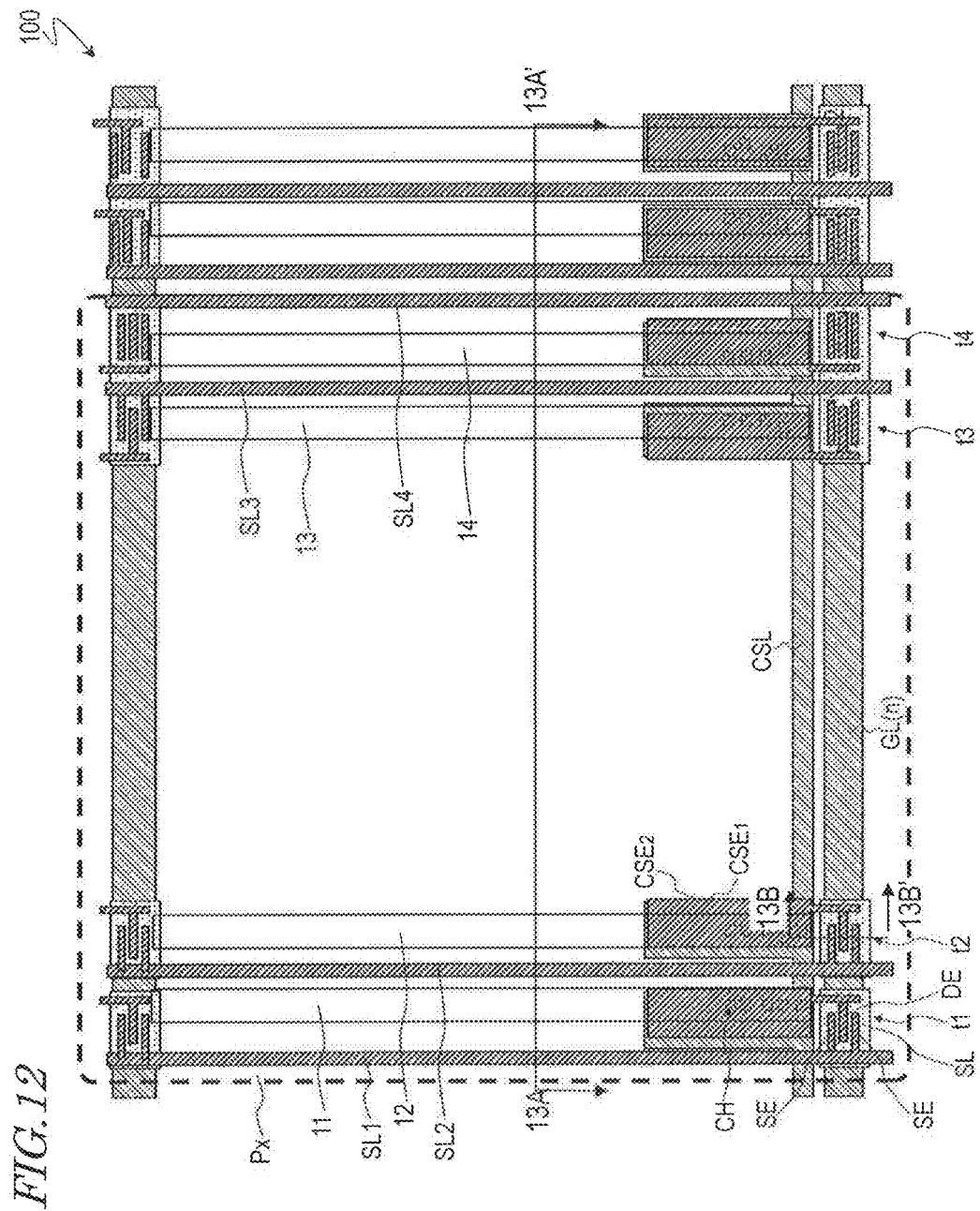
FIG. 12 A plan view schematically showing the active matrix-type electrophoretic element 100.
Figure 13:
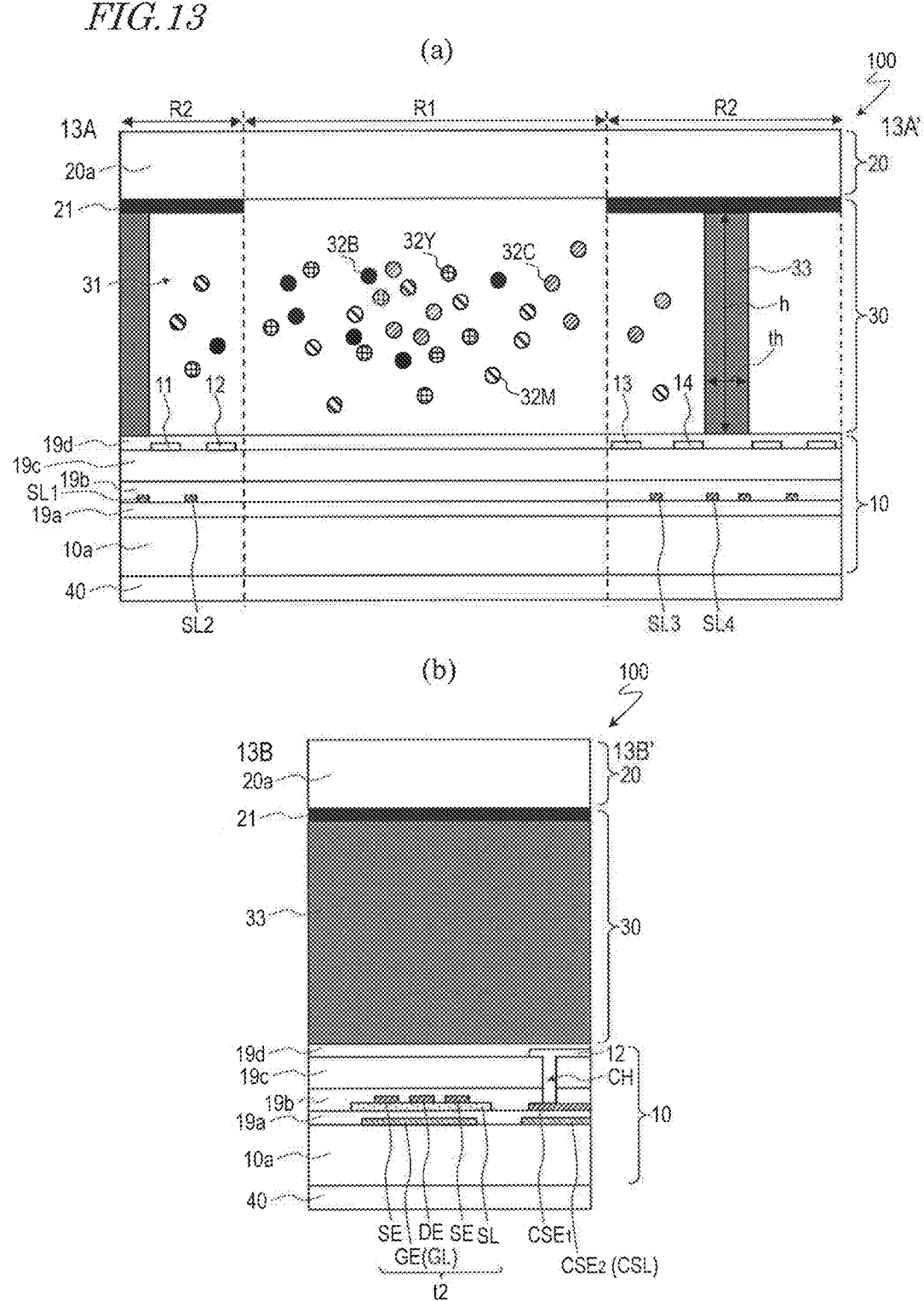
FIGS. 13 (a) and (b) are cross-sectional views schematically showing the active matrix-type electrophoretic element 100, taken along line 13A-13A' and 13B-13B', respectively, of FIG. 12.

Next, referring to FIG. 12, FIGS. 13(a) and 13(b), a more specific configuration example of the display device 100 will be described. FIG. 12 is a plan view schematically showing the display device 100. FIGS. 13(a) and 13(b) are cross-sectional views taken along line 13A-13A' and 13B-13B', respectively, of FIG. 12.

As shown in FIG. 12, four TFTs (specifically, a first TFT t1, a second TFT t2, a third TFT t3 and a fourth TFT t4) are provided in each pixel Px. The first TFT t1, the second TFT t2, the third TFT t3 and the fourth TFT t4 each include a gate electrode GE, a source electrode SE, a drain electrode DE and a semiconductor layer SL, as shown in FIG. 12 and FIG. 13(b).

The gate electrodes GE of the first TFT t1, the second TFT t2, the third TFT t3 and the fourth TFT t4 are electrically connected to a common gate line GL. The source electrodes SE of the first TFT t1, the second TFT t2, the third TFT t3 and the fourth TFT t4 are electrically connected to the first source line SL1, the second source SL2, the third source line SL3 and the fourth source line SL4, respectively. The drain electrodes DE of the first TFT t1, the second TFT t2, the third TFT t3 and the fourth TFT t4 are electrically connected to the first electrode 11, the second electrode 12, the third electrode 13 and the fourth electrode 14, respectively.

A storage capacitor electrode (CS electrode) CSE1 extended from the drain electrode DE, a storage capacitor counter electrode (CS counter electrode) CSE2 extended from the CS line CSL, and an insulating layer (the gate insulating layer to be described below) 19a located therebetween together form a storage capacitor.

The gate line GL, the gate electrode GE, the CS line CSL and the CS counter electrode CSE2 are formed on a surface of the transparent substrate (e.g., a glass substrate) 10a of the first substrate 10 that is on the electrophoretic layer 30 side. The gate line GL, the gate electrode GE, the CS line CSL and the CS counter electrode CSE2 can be formed by patterning the same metal film. A gate insulating layer (first insulating layer) 19a is formed so as to cover the gate line GL, the gate electrode GE, etc.

An island-shaped semiconductor layer SL is formed on a gate insulating layer 19a. The material of the semiconductor layer SL may be any of various known semiconductor materials. e.g., amorphous silicon, polycrystalline silicon, continuous grain silicon (CGS), etc.

The semiconductor layer SL may be an oxide semiconductor layer formed from an oxide semiconductor. The oxide semiconductor layer includes an In—Ga—Zn—O-based semiconductor, for example. Herein, the In—Ga—Zn—O-based semiconductor is a ternary oxide of In (indium), Ga (gallium) and Zn (zinc), wherein there is no particular limitation on the ratio (composition ratio) between In, Ga and Zn, and it may be In:Ga:Zn=2:2:1, In:Ga:Zn=1:1:1, In:Ga:Zn=1:1:2, or the like, for example. The In—Ga—Zn—O-based semiconductor may be amorphous or crystalline. For a crystalline In—Ga—Zn—O-based semiconductor, it is preferred that the c axis is oriented generally perpendicular to the layer surface. The crystal structure of such an In—Ga—Zn—O-based semiconductor is disclosed is Japanese Laid-Open Patent Publication No. 2012-134475, for example. The entire disclosure of Japanese Laid-Open Patent Publication No. 2012-134475 is incorporated herein by reference. A TFT Saving an In—Ga—Zn—O-based semiconductor layer has a high mobility (20 times or more that of an a-Si TFT) and a low leak current (less than $\frac{1}{100}$ that of an a-Si TFT). Therefore, when an oxide semiconductor layer formed from an In—Ga—Zn—O-based semiconductor is used as the semiconductor layer, there is little OFF leak, and it is therefore possible to further reduce the power consumption.

Note that the oxide semiconductor layer is not limited to an In—Ga—Zn—O-based semiconductor layer. The oxide semiconductor layer may include a Zn—O-based semiconductor (ZnO), an In—Zn—O-based semiconductor (IZO), a Zn—Ti—O-based semiconductor (ZTO). Cd—Ge—O-based semiconductor, a Cd—Pb—O-based semiconductor, an In—Sn—Zn—O-based semiconductor (e.g., $In_2$—$SnO_2$—ZnO), an In—Ga—Sn—O-based semiconductor, etc., for example.

The source electrode SE and the drain electrode DE are formed so as to be laid on the semiconductor layer SL. The source lines SL1, SL2, SL3 and SL4 and the CS electrode CSE1 are also formed on the gate insulating layer 18a. The source electrode SE, the drain electrode DE, the source lines SL1, SL2, SL3 and SL4 and the CS electrode CSE1 can be formed by patterning the same metal film. An interlayer insulating layer (second insulating layer) 19b is formed so as to cover the source electrode SE, the drain electrode DE, etc.

A flattening layer (third insulating layer) 19c is formed on the interlayer insulating layer 19b. The material of the flattening layer 19c is a photosensitive acrylic resin, for example.

The first electrode 11, the second electrode 12, the third electrode 13 and the fourth electrode 14 are formed on the flattening layer 19c. The first electrode 11, the second electrode 12, the third electrode 13 and the fourth electrode 14 can be formed by patterning the same conductive film. A contact hole CH is formed in the interlayer insulating layer 19b and the flattening layer 19c, and the first electrode 11, the second electrode 12, the third electrode 13 and the fourth electrode 14 are connected to the CS electrode CSE1 in the contact hole CH, and are electrically connected to the drain electrode DE via the CS electrode CSE1.

An insulating layer (fourth insulating layer) 19d is formed so as to cover the first electrode 11, the second electrode 12, the third electrode 13 and the fourth electrode 14. The insulating layer 19d is an SiN layer or $SiO_2$ layer having a thickness of 100 nm, for example. Note that the insulating layer 19d may be omitted. With the provision of the insulating layer 19d, it is possible to prevent the electrophoretic particles 32 from being stuck on the first substrate 10 and prevent inter-electrode leakage.

A light-blocking layer 21 is formed so as to be located in the light-blocking region R2 on a surface of the transparent substrate (e.g., a glass substrate) 20a of the second substrate 20 that is on the electrophoretic layer 30 side. The material of the light-blocking layer 21 is a black-colored acrylic resin a low-reflectance metal material, for example. The first electrode 11, the second electrode 12, the third electrode 13 and the fourth electrode 14 of the first substrate 10 are placed so as to oppose the light-blocking layer 21 (i.e., in the light-blocking region R2).

A partition wall 33 that divides the electrophoretic layer 30 into pixels Px is provided between the first substrate 10 and the second substrate 20. The partition wall 33 is formed from a photoresist, for example. The height h of the partition wall 33 is 10 µm to 60 µm, for example, and the width th of the partition wall 33 is 10 µm to 60 µm, for example.

The dispersion medium 31 is an insulative, colorless and transparent liquid. The dispersion medium 31 may be isoparaffin, toluene, xylene, normal paraffin or silicone oil, which are hydrocarbon-based solvents, for example.

The electrophoretic particles 32 (the cyan particles 32C, the magenta particles 32M, the yellow particles 32Y and the black particles 32B) may be pigment particles of an intended color or resin particles including a pigment or a dye of an intended color therein. A pigment a dye may be those that are ordinary and used in printing ink or color toner, for example. The threshold characteristics of the electrophoretic particles 32 (the applied voltage required for migration) can be determined by adjusting the amount of charge, the particle diameter, the particle surface shape, the material, etc. For example, the threshold characteristics of the plurality of types of electrophoretic particles 32 can be made different from each other by the approach disclosed in Japanese Patent. No. 5333045. The entire disclosure of Japanese Patent No. 5333045 is incorporated herein by reference.

The average particle diameter (herein, the volume average diameter) of the electrophoretic particles 32 is typically 0.01 µm or more and 10 µm or less, and preferably 0.03 µm or more and 3 µm or less. When the volume average diameter of the electrophoretic particles 32 is less than 0.03 µm, the amount of charge of the electrophoretic particles 32 may be small and the migration speed may be slow. When the volume average diameter of the electrophoretic particles 32 is 3 µm or more, it may precipitate due to its own weight or the memory property thereof may deteriorate, thou the migration speed is sufficient.

The white-colored light-reflecting layer 40 may be a diffuse reflection film for a reflective liquid crystal display device (e.g., an aluminum vapor deposition film or a silver vapor deposition film). A combination of a diffusive film and a specular reflection film (e.g., an aluminum vapor deposition film or a silver vapor deposition film) may be used, instead of a diffuse reflection film. Moreover, a white reflector for backlight of a liquid crystal display device may be used.

Note that the display device 100 does not need to include the partition wall 33 that divides the electrophoretic layer 30 into pixels Px. This is because the display device 100 is capable of subtractive color mixing within one pixel Px, and it is therefore not necessary to separately define pixels corresponding different colors as with conventional electrophoretic displays. Since the display device 100 does not include the partition wall 33, it is possible to improve the aperture ratio.

When the partition wall 33 is omitted, the display device 100 includes, for example, a seal portion that is provided between the first substrate 10 and the second substrate 20 and surrounds the electrophoretic layer 30, and a plurality of spacers that are provided between the first substrate 10 and the second substrate 20 and define the thickness of the electrophoretic layer 30. The seal portion and the spacers can be formed in a manner similar to that for a seal portion and spacers of a liquid crystal display device.

Embodiment 2

Figure 14:
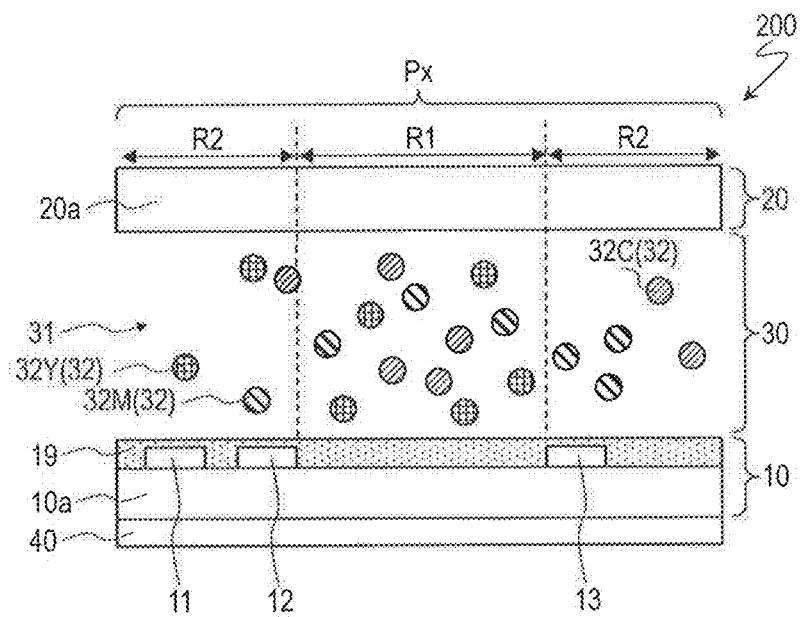
FIG. 14 A cross-sectional view schematically showing an electrophoretic element (display device) 200 according to an embodiment of the present invention.

FIG. 14 shows an electrophoretic element (display device) 200 of the present embodiment. FIG. 14 is a cross-sectional view schematically showing one pixel Px of the electrophoretic element 200.

As shown in FIG. 14, the electrophoretic element 200 includes the components of the electrophoretic element 100 of Embodiment 1, except for the black particles 32B and the fourth electrode 14. That is, the plurality of types of electrophoretic particles 32 in the electrophoretic layer 32 of the electrophoretic element 200 include the cyan particles 32C, the magenta particles 32M and the yellow particles 32Y but, do not include the black particles 32B. The first substrate 10 of the electrophoretic element 200 includes three (three types of) electrodes, i.e., the first electrode 11, the second electrode 12 and the third electrode 13.

With the electrophoretic element 200 of the present embodiment, it is possible to apply a transverse electric field to the electrophoretic layer 30 by controlling the potentials of the three electrodes 11, 12 and 13, and it is therefore possible to locate two or more of the plurality of types of electrophoretic particles 32 in the opening region R1. Thus, it is possible to realize subtractive color mixing (superposition of colors) within a pixel Px, rather than juxtapositional color mixing (i.e., mixing or colors between pixels Px). Display principles of the electrophoretic element 200 will now be described. First, the threshold characteristics of the electrophoretic particles 32 will be described.

[Threshold Characteristics of Electrophoretic Particles]

Figure 15:
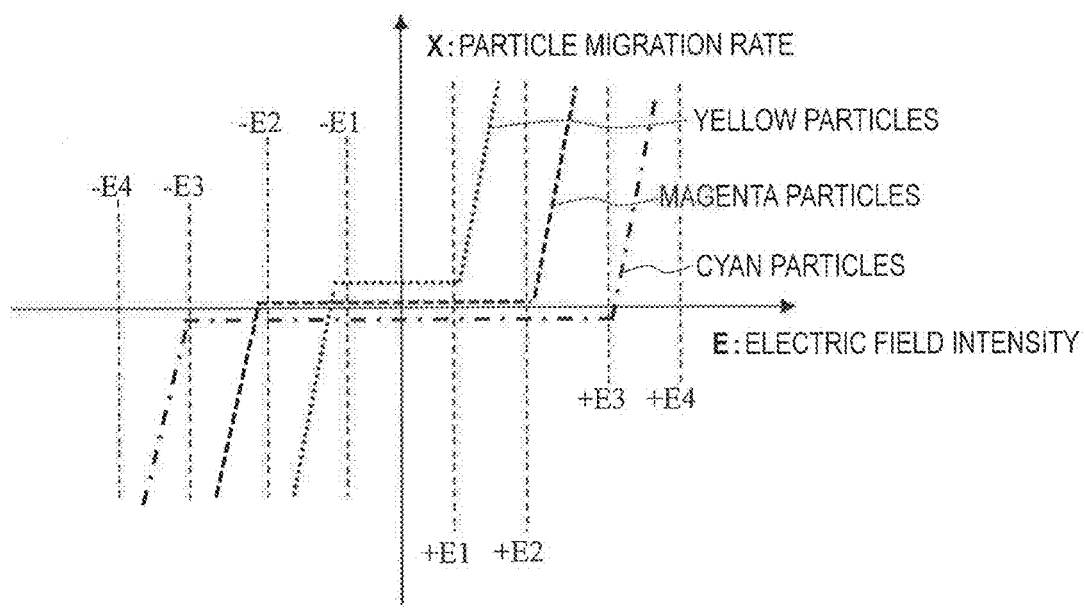
FIG. 15 A graph showing an example of threshold characteristics of the cyan particles 32C, the magenta particles 32M and the yellow particles 32Y included in the electrophoretic layer 30 of the electrophoretic element 200.

FIG. 15 shows an example of threshold characteristics of the cyan particles 32C, the magenta particles 32M and the yellow particles 32Y. FIG. 15 is a graph whose horizontal axis represents the electric field intensity E and whose vertical axis represents the particle migration rate X. As can be seen from FIG. 15, the cyan particles 32C move in the positive direction when +E3<E and move in the negative direction when E<−E3. Similarly, the magenta particles 32M move in the positive direction when +E2<E and move in the negative direction when E<−E2, and the yellow particles 32Y move in the positive direction when +E1<E and move in the negative direction when E<−E1.

Next, a display sequence for white display will be described.

[White Display (Reset)]

Figure 16:
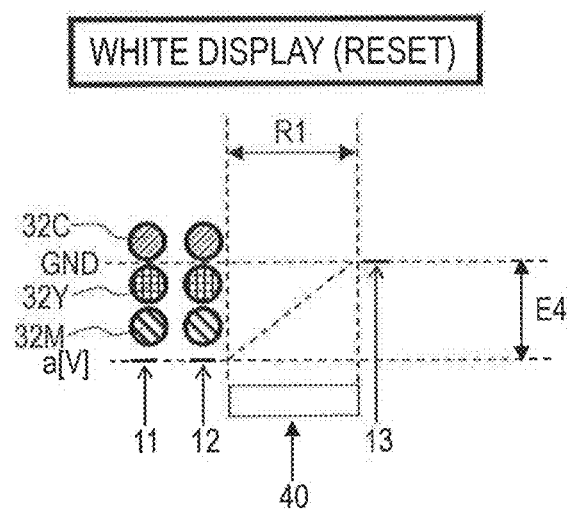
FIG. 16 A diagram illustrating a display sequence for white display.

FIG. 16 is a diagram illustrating a display sequence for white display. As shown in FIG. 16, the potentials of the first electrode 11 and the second electrode 12 are set to a [V], and the potential of the third electrode 13 is set to the ground potential GND. At this point, since a potential gradient corresponding to the electric field intensity E4 is formed in the opening region R1, the cyan particles 32C, the magenta particles 32M and the yellow particles 32Y are positioned over the first electrode 11 and the second electrode 12. In this state, since the electrophoretic particles 32 are absent in the opening region R1, the external light (ambient light) entering the electrophoretic layer 30 from the observer side is reflected by the light-reflecting layer 30, thereby producing white display.

Note that also with the electrophoretic element 200, switching from one color to another is basically done via this white display state. Therefore, white display can also be said to be a reset operation.

Next, display sequences for single-color display of cyan, magenta and yellow will be described.

[Cyan Display]

Figure 17:
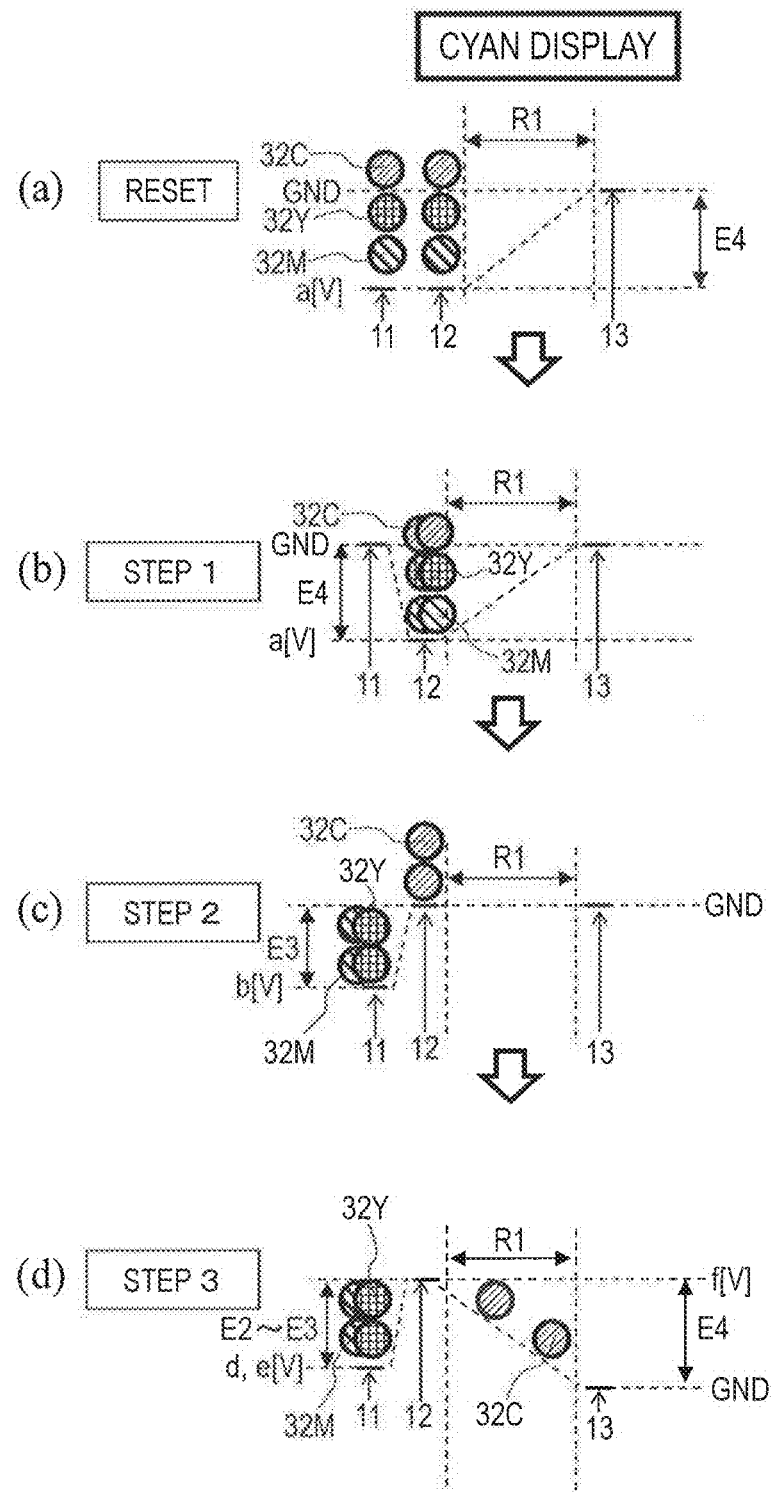
FIG. 17 (a) to (d) are diagrams illustrating a display sequence for cyan display.

FIGS. 17(a) to 17(d) are diagrams illustrating a display sequence for cyan display. First, as shown in FIG. 17(a), the same potentials as those in the white display state are applied to the first electrode 11, the second electrode 12 and the third electrode 13, thus resetting display.

Next, as shown in FIG. 17(b), the potential of the first electrode 11 is set to the ground potential GND (step 1). At this point, since a potential gradient corresponding to the electric field intensity E4 is formed between the first electrode 11 and the second electrode 12, the cyan particles 32C, the magenta particles 32M and the yellow particles 32Y move from over the first electrode 11 to over the second electrode 12.

Next, as shown in FIG. 17(c), the potential of the first electrode 11 is set to b [V], and the potential of the second electrode 12 is set to the around potential GND (step 2). At this point, since a potential gradient corresponding to the electric field intensity E3 is formed between the first electrode 11 and the second electrode 12, the magenta particles 32M and the yellow particles 32Y move from over the second electrode 11 to over the first electrode 11 (the cyan particles 32C remain over the second electrode 12).

Then, as shown in FIG. 17(d), the potential of the first electrode 11 is set to d [V] or e [V], and the potential of the second electrode 12 is set to f [V] (step 3). At this point, since a potential gradient corresponding to the electric field intensity E2 or E3 is formed between the first electrode 11 and the second electrode 12, and a potential gradient corresponding to the electric field intensity E4 is formed between the second electrode 12 and the third electrode 13 (i.e., in the opening region R1), the cyan particles 32C move from over the second electrode 12 to the opening region R1. Therefore, in this state, cyan display is produced.

[Magenta Display]

Figure 18:
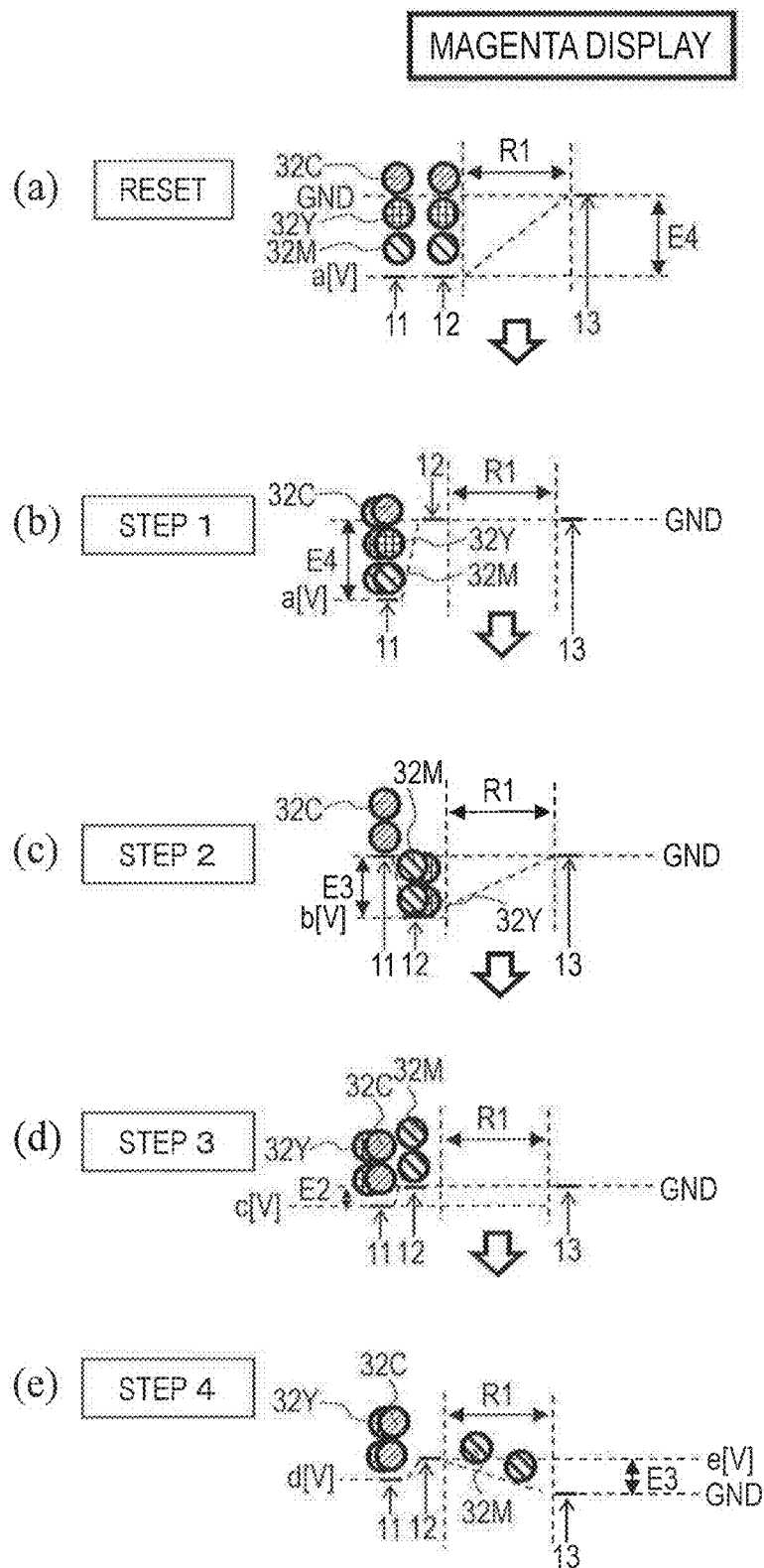
FIG. 18 (a) to (e) are diagrams illustrating a display sequence for magenta display.

FIGS. 18(a) to 18(e) are diagrams illustrating a display sequence for magenta display. First, as shown in FIG. 18(a), the same potentials as those in the white display state are applied to the first electrode 11, the second electrode 12 and the third electrode 13, thus resetting display.

Next, as shown in FIG. 18(b), the potential of the second electrode 12 is set to the around potential GND (step 1). At this point, since a potential gradient corresponding to the electric field intensity E4 is formed between the first electrode 11 and the second electrode 12, the cyan particles 32C, the magenta particles 32M and the yellow particles 32Y move from over the second electrode 12 to over the first electrode 11.

Next, as shown in FIG. 18(c), the potential of the first electrode 11 is set to the ground potential GND, and the potential of the second electrode 12 is set to b [V] (step 2). At this point, since a potential gradient corresponding to the electric field intensity E3 is formed between the first electrode 11 and the second electrode 12, the magenta particles 32M and the yellow particles 32C move from over the first electrode 11 to over the second electrode 12.

Next, as shown in FIG. 18(d), the potential of the first electrode 11 is set to c [V], and the potential of the second electrode 12 is set to the ground potential GND (step 3). At this point, since a potential gradient corresponding to the electric field intensity E2 is formed between the first electrode 11 and the second electrode 12, the yellow particles 32Y move from over the second electrode 12 to over the first electrode 11.

Then, as shown in FIG. 18(e), the potential of the first electrode 11 is set to d [V], and the potential of the second electrode 12 is set to e [V] (step 4). At this point, since a potential gradient corresponding to the electric field intensity E3 is formed between the second electrode 12 and the third electrode 13 (i.e., in the opening region R1), the magenta particles 32M move from over the second electrode 12 to the opening region R1. Therefore, in this state, magenta display is produced.

[Yellow Display]

Figure 19:
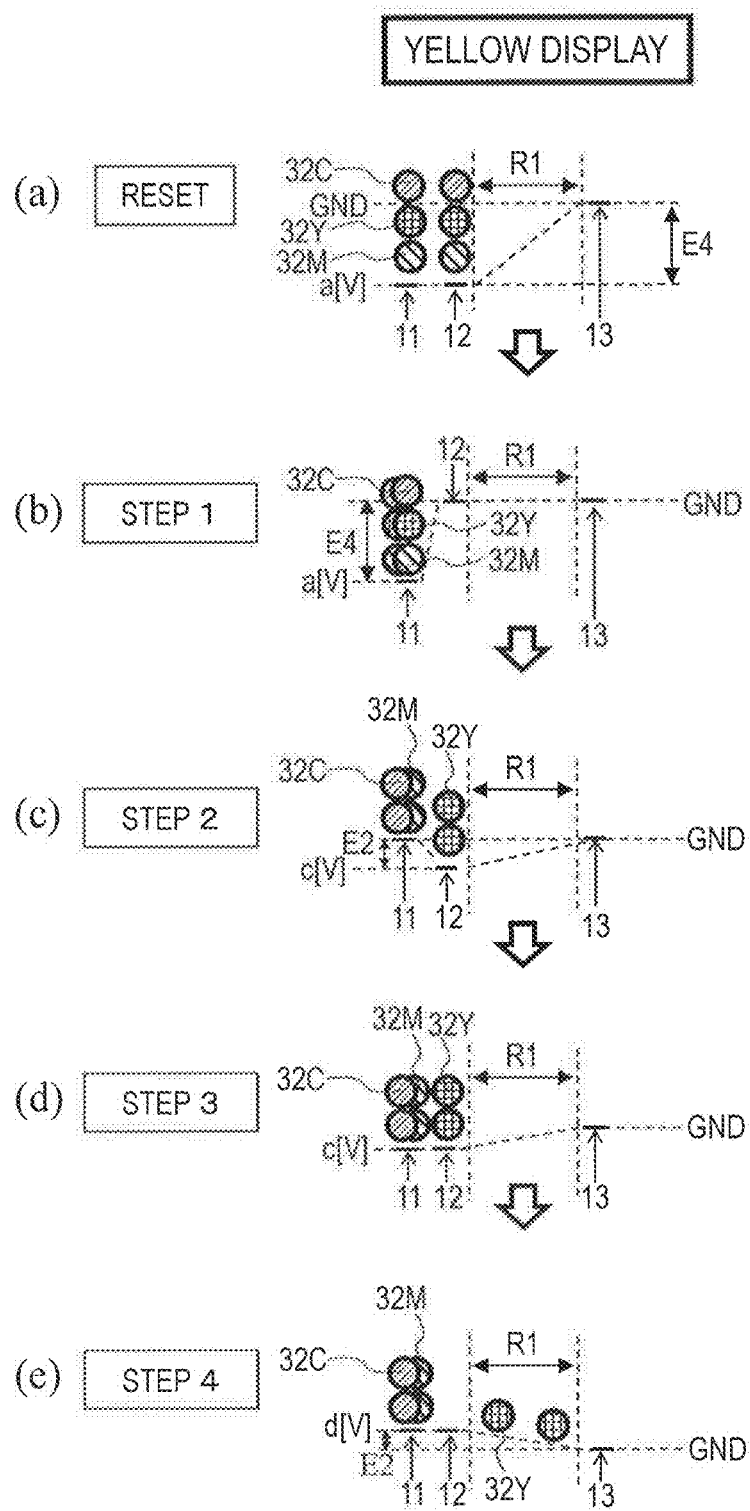
FIG. 19 (a) to (e) are diagrams illustrating a display sequence for yellow display.

FIGS. 19(a) to 19(e) are diagrams illustrating a display sequence for yellow display. First, as shown in FIG. 19(a), the same potentials as those in the white display state are applied to the first electrode 11, the second electrode 12 and the third electrode 13, thus resetting display.

Next, as shown in FIG. 19(b), the potential of the second electrode 12 is set to the ground potential GND (step 1). At this point, since a potential gradient corresponding to the electric field intensity E4 is formed between the first electrode 11 and the second electrode 12, the cyan particles 32C, the magenta particles 32M and the yellow particles 32Y move from over the second electrode 12 to over the first electrode 11.

Next, as shown in FIG. 19(c), the potential of the first electrode 11 is set to the ground potential GND, and the potential of the second electrode 12 is set to c [V] (step 2).

At this point, since a potential gradient corresponding to the electric field intensity E2 is formed between the first electrode 11 and the second electrode 12, the yellow particles 32C move from over the first electrode 11 to over the second electrode 12.

Next, as shown in FIG. 19(d), the potential of the first electrode 11 is set to c [V] (step 3). At this point, since no such potential gradient that moves the electrophoretic particles 32 is formed between adjacent electrodes, the cyan particles 32C and the magenta particles 32M remain over the first electrode 11 and the yellow particles 32Y over the second electrode 12.

Then, as shown in FIG. 19(e), the potentials of the first electrode 11 and the second electrode 12 are set to d [V] (step 4). At this point, since a potential gradient corresponding to the electric field intensity E2 is formed between the second electrode 12 and the third electrode 13 (i.e., in the opening region R1), the yellow particles 32Y move from over the second electrode 12 to the opening region R1. Therefore, in this state, yellow display is produced.

Next, display sequences for green display (mixed color display between cyan and yellow), blue display (mixed color display between cyan and magenta) and red display (mixed color display between magenta and yellow) will be described.

[Green Display]

Figure 20:
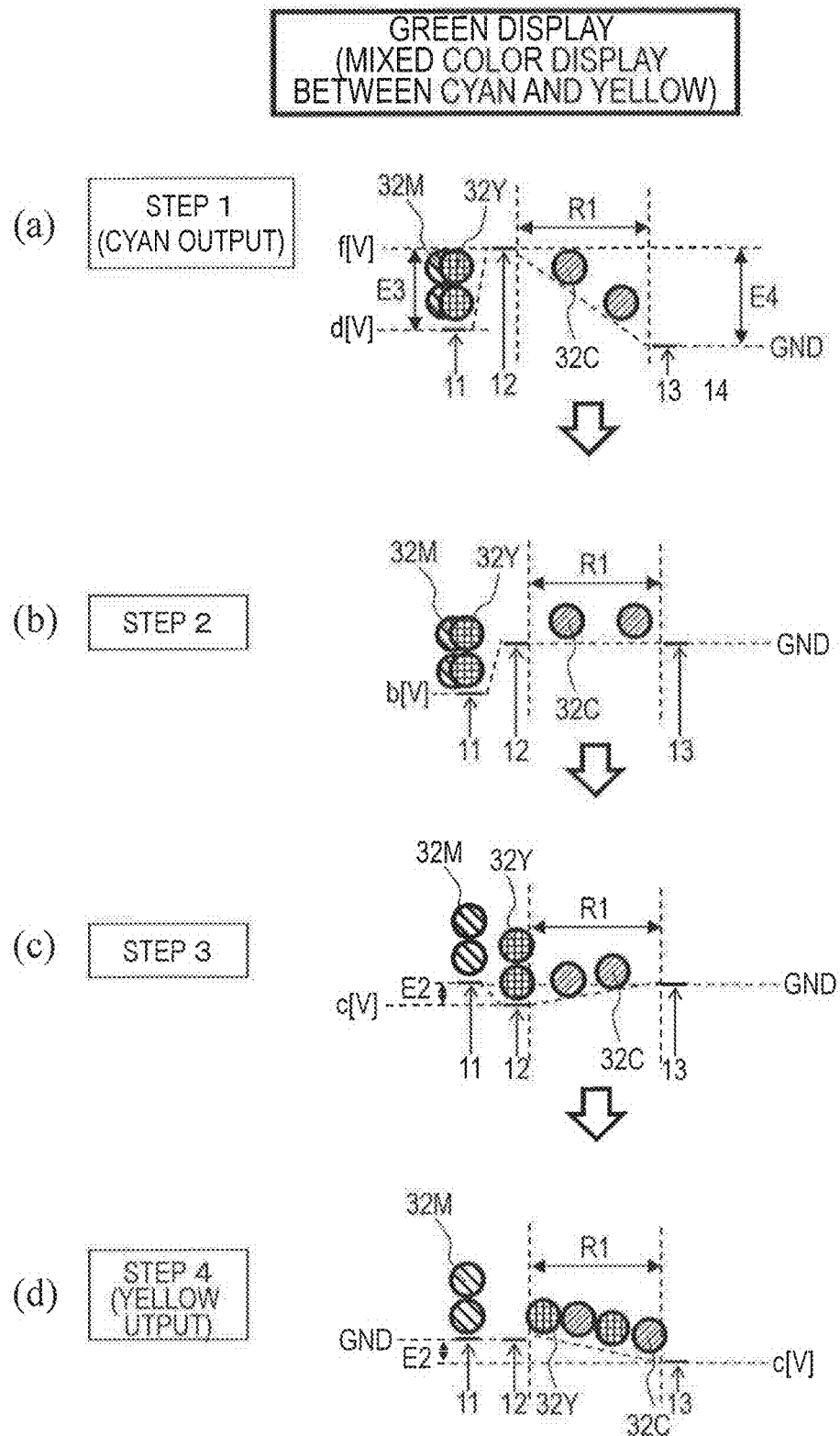
FIG. 20 (a) to (d) are diagrams illustrating a display sequence for green display.

FIGS. 20(a) to 20(d) are diagrams illustrating a display sequence for green display (i.e., mixed color display between cyan and yellow). First, as shown in FIG. 20(a), the cyan particles 32C are moved to the opening region R1, as in the display sequence for cyan display (step 1: cyan output).

Next, as shown in FIG. 20(b), the potential of the first electrode 11 is set to b [V], and the potential of the second electrode 12 is set to the ground potential GND (step 2). At this point, since no such potential gradient that moves the electrophoretic particles 32 is formed between adjacent electrodes, the magenta particles 32M and the yellow particles 32Y remain over the first electrode 11 and the cyan particles 32C in the opening region R1.

Next, as shown in FIG. 20(c), the potential of the first electrode 11 is set to the ground potential GND, and the potential of the second electrode 12 is set to c [V] (step 3). At this point, since a potential gradient corresponding to the electric field intensity E2 is formed between the first electrode 11 and the second electrode 12, the yellow particles 32Y move from over the first electrode 11 to over the second electrode 12.

Then, as shown in FIG. 20(d), the potential of the second electrode 12 is set to the ground potential GND, and the potential of the third electrode 13 is set to c [V] (step 4). At this point, since a potential gradient corresponding to the electric field intensity E2 is formed between the second electrode 12 and the third electrode 13 the opening region R1), the yellow particles 32Y move from over the second electrode 12 to the opening region R1 (yellow output). Therefore, in this state, green display is produced by subtractive color mixing between cyan and yellow.

[Blue Display (Mixed Color Display Between Cyan and Magenta)]

Figure 21:
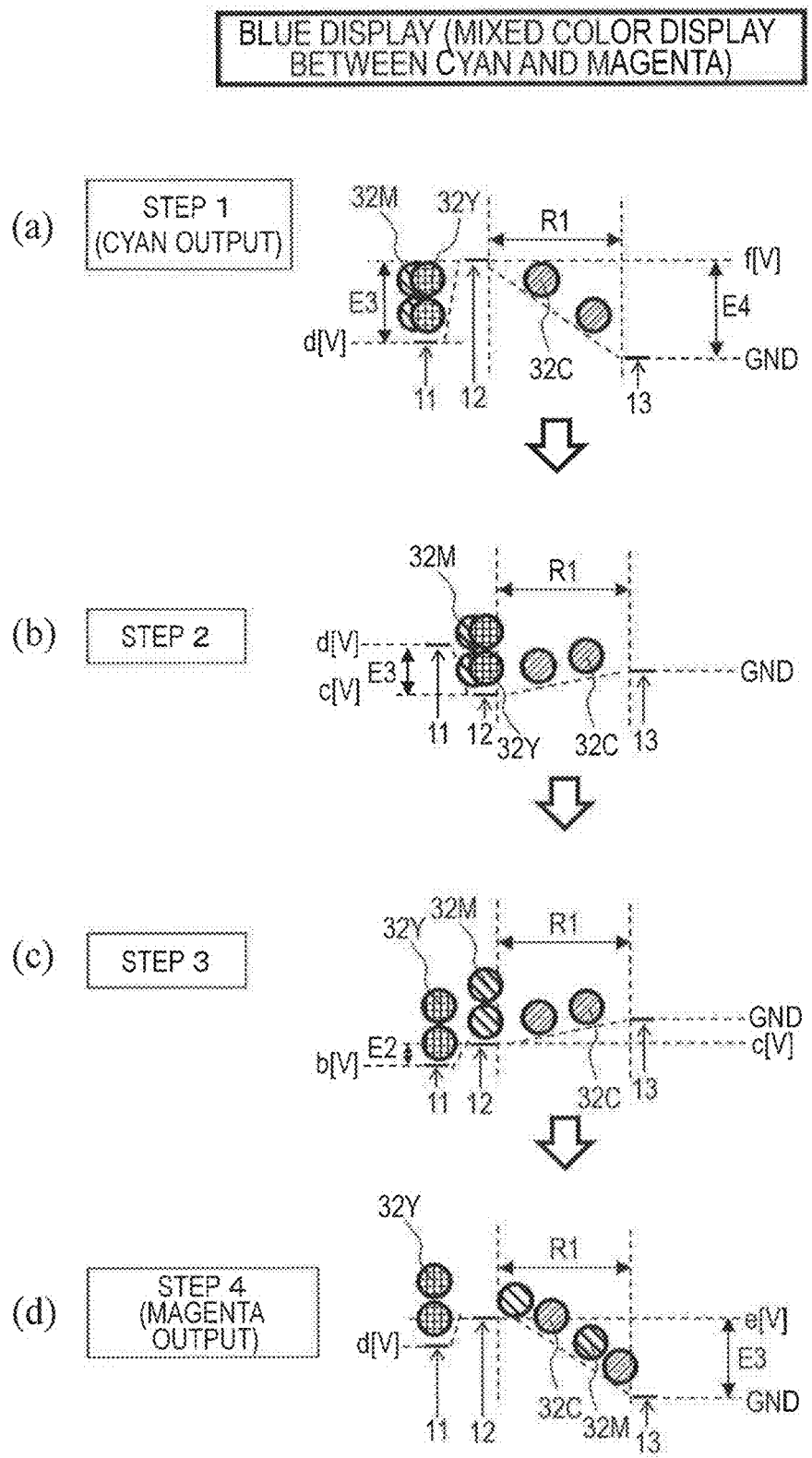
FIG. 21 (a) to (d) are diagrams illustrating a display sequence for blue display.

FIGS. 21(a) to 21(d) are diagrams illustrating a display sequence for blue display (i.e., mixed color display between cyan and magenta). First, as shown in FIG. 21(a), the cyan particles 32C are moved to the opening region R1, as in the display sequence for cyan display (step 1: cyan output).

Next, as shown in FIG. 21(b), the potential of the first electrode 11 is set to d [V], and the potential of the second electrode 12 is set to c [V] (step 2). At this point, since a potential gradient corresponding to the electric field intensity E3 is formed between the first electrode 11 and the second electrode 12, the magenta particles 32M and the yellow particles 32Y move from over the first electrode 11 to over the second electrode 12.

Next, as shown in FIG. 21(c), the potential of the first electrode 11 is set to b [V] (step 3). At this point, since a potential gradient corresponding to the electric field intensity E2 is formed between the first electrode 11 and the second electrode 12, the yellow particles 32Y move from over the second electrode 12 to over the first electrode 11.

Then, as shown in FIG. 21(d), the potential of the first electrode 11 is set to d [V], and the potential of the second electrode 12 is set to e [V] (step 4). At this point, since a potential gradient corresponding to the electric field intensity E3 is formed between the second electrode 12 and the third electrode 13 (i.e., in the opening region R1), the magenta particles 32M move from over the second electrode 12 to the opening region R1 (magenta output). Therefore, in this state, blue display is produced by subtractive color mixing between cyan and magenta.

[Red Display (Mixed Color Display Between Magenta and Yellow)]

FIGS. 22(a) to 22(c) are diagrams illustrating a display sequence for red display (i.e., mixed color display between magenta and yellow). First, as shown in FIG. 22(a), the magenta particles 32M are moved to the opening region R1, as in the display sequence for magenta display (step 1: magenta output).

Next, as shown in FIG. 22(b), the potential of the first electrode 11 is set to the ground potential GND, and the potential of the second electrode 12 is set, to c [V] (step 2). At this point, since a potential gradient corresponding to the electric field intensity E2 is formed between the first electrode 11 and the second electrode 12, the yellow particles 32Y move from over the first electrode 11 to over the second electrode 12.

Then, as shown in FIG. 22(c), the potentials of the first electrode 11 and the second electrode 12 are set to d [V] (step 3). At this point, since a potential gradient corresponding to the electric field intensity E2 is formed between the second electrode 12 and the third electrode 13 (i.e., in the opening region R1), the yellow particles 32Y move from over the second electrode 12 to the opening region R1 (yellow output). Therefore, in this state, red display is produced by subtractive color mixing between magenta and yellow.

Next, a display sequence for black display (mixed color display between cyan, magenta and yellow) will be described.

[Black Display]

Figure 23:
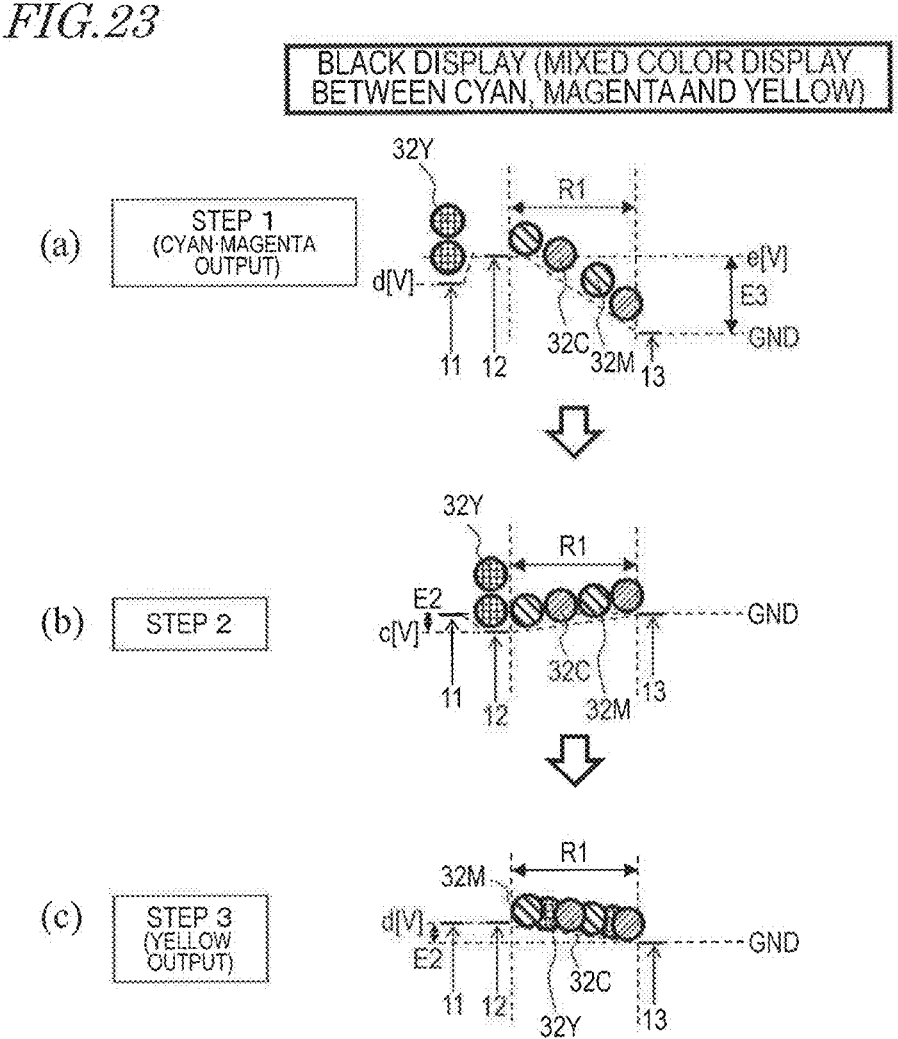
FIG. 23 (a) to (c) are diagrams illustrating a display sequence for black display.

FIGS. 23(a) to 23(c) are diagrams illustrating a display sequence for black display (mixed color display between cyan, magenta and yellow). First, as shown in FIG. 23(a), the cyan particles 32C and the magenta particles 32M are moved to the opening region R1, as in the display sequence for blue display (step 1: cyan·magenta output).

Next, as shown in FIG. 23(b), the potential of the first electrode 11 is set to the ground potential GND, and the potential of the second electrode 12 is set to c [V] (step 2). At this point, since a potential gradient corresponding to the electric field intensity E2 is formed between the first electrode 11 and the second electrode 12, the yellow particles 32Y move from over the first electrode 11 to over the second electrode 12.

Then, as shown in FIG. 23(c), the potentials of the first electrode 11 and the second electrode 12 are set to d [V] (step 3: yellow output). At this point, since a potential gradient corresponding to the electric field intensity E2 is formed between the second electrode 12 and the third electrode 13 (i.e., in the opening region R1), the yellow particles 32Y move from over the second electrode 12 to the opening region R1 (yellow output). Therefore, in this state, black display is produced by subtractive color mixing between cyan, magenta and yellow.

As described above, with the electrophoretic element 200 of the present embodiment, by controlling the potentials of the plurality of electrodes 11, 12 and 13 of the first substrate 10, it is possible to locate any one or more of the plurality of types of electrophoretic particles 32 in the opening region R1. Therefore, it is possible to produce display in which only one type of electrophoretic particles 32 is positioned in the opening region R1 (herein, cyan display, magenta display and yellow display), and it is possible to produce display in which none of the types of electrophoretic particles 32 is positioned in the opening region R1 (herein, white display). Moreover, with the electrophoretic element 100 of the present embodiment, it is also possible to produce display in which two or more of the plurality of types of electrophoretic particles 32 are positioned in the opening region R1 (e.g., green display, blue display, red display and black display illustrated above). Thus, it is possible to realize subtractive color mixing (superposition of colors) within a pixel Px, rather than juxtapositional color mixing (i.e., mixing or colors between pixels Px). Note that as can be seen from the description above, mixed color display can be produced by moving (outputting) electrophoretic particles 32 to the opening region R1, starting from those having a higher threshold voltage (threshold electric field intensity). Moreover, by controlling the potential difference and/or the output time between the second electrode 12 and the third electrode 13, it is possible to adjust the amount of the electrophoretic particles 32 to move to the opening region R1, thus realizing gray level display.

Embodiment 3

Figure 24:
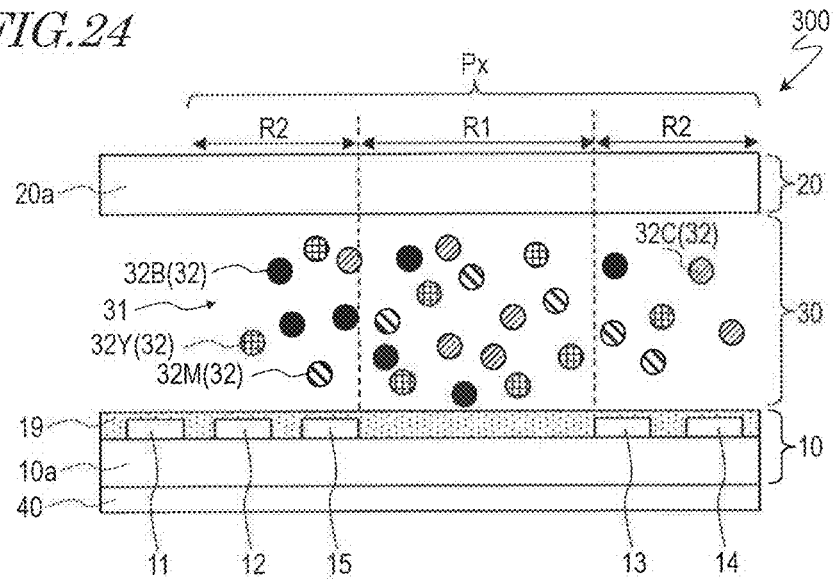
FIG. 24 A cross-sectional view schematically showing an electrophoretic element (display device) 300 according to an embodiment of the present invention.

FIG. 24 shows an electrophoretic element (display device) 300 of the present embodiment. FIG. 24 is a cross-sectional view schematically showing one pixel Px of the electrophoretic element 300.

The electrophoretic element 300 is different from the electrophoretic element 100 of Embodiment 1 in that the first substrate 10 includes a fifth electrode 15, in addition to the first electrode 11, the second electrode 12, the third electrode 13 and the fourth electrode 14 as shown in FIG. 24. That is, the first substrate 10 of the electrophoretic element 300 includes five (five types of) electrodes 11, 12, 13, 14 and 15 to which different potentials can be applied.

The fifth electrode 15 is placed between the second electrode 12 and the opening region R1. That is, the first electrode 11, the second electrode 12, the fifth electrode 15, the opening region R1, the third electrode 13 and the fourth electrode 14 are placed in this order along a certain direction (the direction from the left side toward the right side in FIG. 24) that is parallel to the substrate surface of the first substrate 10.

The amount of output of the electrophoretic particles 32 to the opening region R1 is determined based on the potential difference (voltage) between adjacent electrodes and the voltage application time. That is, by controlling the potential difference and/or the output time between the second electrode 12 and the third electrode 13, it is possible to adjust the amount of the electrophoretic particles 32 to move to the opening region R1. However, the adjustment performed as described above is an act of stopping halfway the output of the electrophoretic particles 32 existing over the second electrode 12 and the third electrode 13 to the opening region R1. Thus, conversely, if the potential difference between electrodes is made sufficiently large and the voltage application time is made sufficiently long, most of the electrophoretic particles 32 of the intended color move to one electrode side, and it may not be possible to ensure a sufficient contrast and a sufficient color purity. Thus, the control of the potential difference and the output time between the second electrode 12 and the third electrode 13 significantly influences the display quality. Therefore, the control of the amount of the electrophoretic particles 32 to be output to the opening region R1 is preferably done in advance. That is, the amount of the electrophoretic particles 32 to be output is preferably determined already at the point in time when the electrophoretic particles 32 exist over the second electrode 12 or the third electrode 13. In contrast, by making the fifth electrode 15 function as an auxiliary output port as will be described below and adjusting in advance the amount of output by means of the auxiliary output port, an appropriate amount of the electrophoretic particles 32 to be output, to the opening region R1 can be moved (output). This enables a finer gray level control.

A display sequence using the fifth electrode 15 as an auxiliary output port will be described below using a case of producing cyan display as an example.

Figure 25:
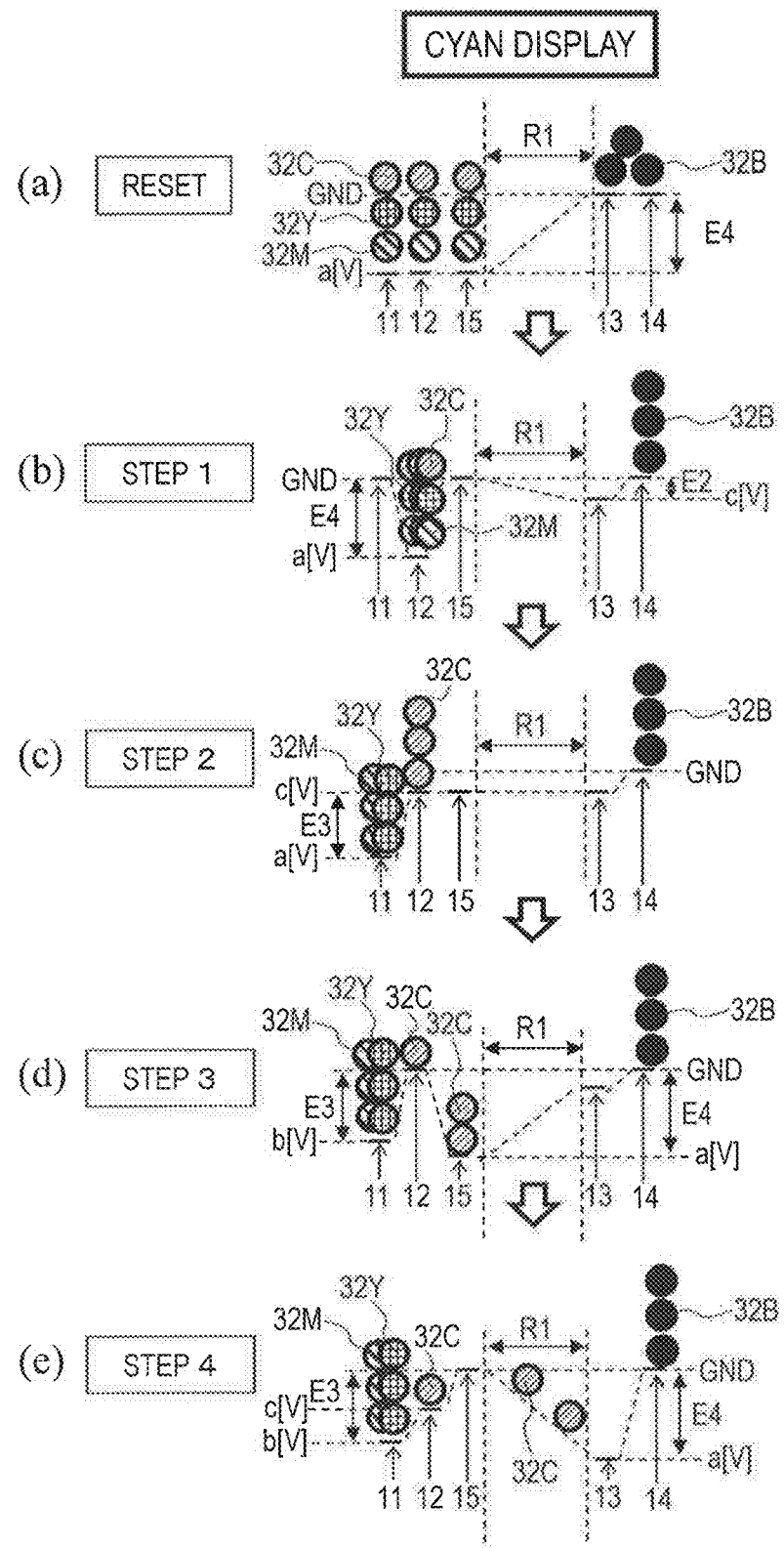
FIG. 25 (a) to (e) are diagrams illustrating a display sequence for cyan display.

FIGS. 25(a) to 25(e) are diagrams illustrating a method for producing cyan display. First, as shown in FIG. 25(a), the potentials of the first electrode 11, the second electrode 12 and the fifth electrode 15 are set to [V], and the potentials of the third electrode 13 and the fourth electrode 14 are set to the ground potential GND, thus resetting display.

Next, as shown in FIG. 25(b), the potentials of the first electrode 11 and the fifth electrode 15 are set to the ground potential GND, and the potential of the third electrode 13 is set to c [V] (step 1). At this point, a potential gradient corresponding the electric field intensity E4 is formed between the first electrode 11 and the second electrode 12 and between the second electrode 12 and the fifth electrode 15, and a potential gradient corresponding to the electric field intensity E2 is formed between the third electrode 13 and the fourth electrode 14. Therefore, cyan particles 32C, the magenta particles 32M and the yellow particles 32Y move from over the first electrode 11 and the fifth electrode 15 is over the second electrode 12, and the black particles 32B move from over the third electrode 13 to over the fourth electrode 14.

Next, as shown in FIG. 25(c), the potential of the first electrode 11 is set to a [V], and the potential of the second electrode 12 is set to c [V] (step 2). At this point, since a potential gradient corresponding to the electric field intensity E3 is formed between the first electrode 11 and the second electrode 12, the magenta particles 32M and the yellow particles 32Y move from over the second electrode 11 to over the first electrode 11 (the cyan particles 32C remain over the second electrode 12).

Then, as shown in FIG. 25(d), the potential of the first electrode 11 is set to b [V], the potential of the second electrode 12 is set the ground potential GND, and the potential of the fifth electrode 13 is set to a [V] (step 3). At this point, since a potential gradient corresponding to the electric field intensity E4 is formed between the second electrode 12 and the fifth electrode 15, some of the cyan particles 32C move from over the second electrode 12 to over the fifth electrode 15, which is an auxiliary output port.

Then, as shown in FIG. 25(e), the potential of the second electrode 12 is set to c [V], the potential of the fifth electrode 15 is set to the ground potential GND, and the potential of the third electrode 13 is set to a [V] (step 4). At this point, since a potential gradient corresponding to the electric field intensity E4 is formed between the fifth electrode 15 and the third electrode 13 (i.e., in the opening region R1), the cyan particles 32C move from over the fifth electrode 15 to the opening region R1. Therefore, in this state, cyan display is produced.

Thus, with the electrophoretic element 300 of the present embodiment, the electrophoretic particles 32 of the intended color can be once accumulated to an intended amount over the fifth electrode 15, which is an auxiliary output port, and can then be output from the fifth electrode 15 to the opening region R1. This enables a finer gray level control.

Embodiment 4

Figure 26:
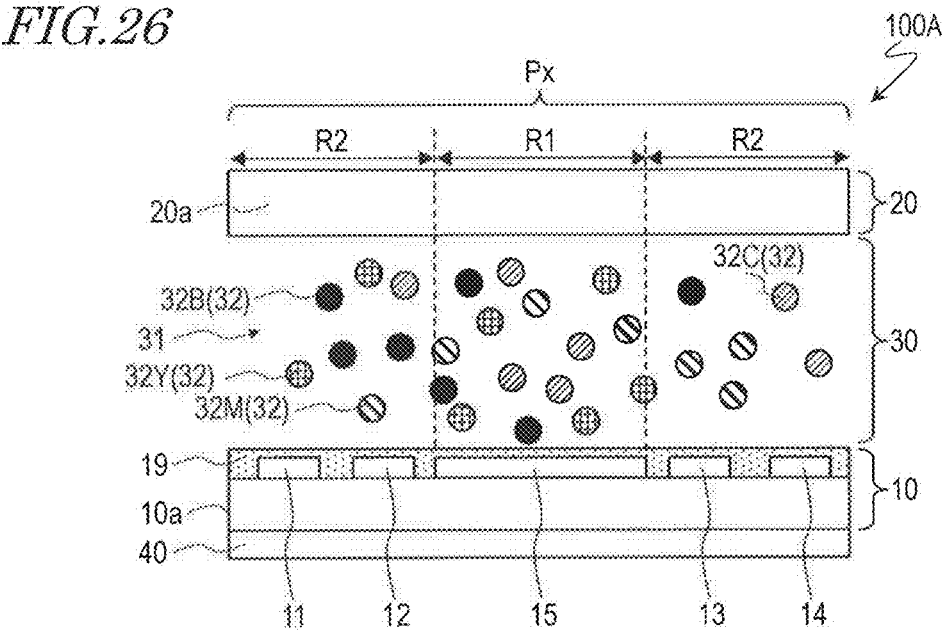
FIG. 26 A cross-sectional view schematically showing an electrophoretic element (display device) 100A according to an embodiment of the present invention.

FIG. 26 shows an electrophoretic element display device) 100A of the present embodiment. FIG. 26 is a cross-sectional view schematically showing one pixel Px of the electrophoretic element 100A.

The electrophoretic element 100A is different from the electrophoretic element 100 of Embodiment 1 in that the first substrate 10 includes the fifth electrode 15 provided in the opening region R1 as shown in FIG. 26. A potential different from the first electrode 11, the second electrode 12, the third electrode 13 and the fourth electrode 14 can be applied to the fifth electrode 15. The fifth electrode 15 is formed from a transparent conductive material (e.g., ITO).

By providing the fifth electrode 15 in the opening region R1 and also controlling the potential of the fifth electrode 15, as in the present embodiment, it is possible to more precisely adjust the diffusion of the electrophoretic particles 32 into the opening region R1 and thus to improve the contrast ratio. The electrophoretic particles 32 in the opening region R1 are trapped by the fifth electrode 15 due to an image force, thereby expressing a memory property. The same potential as that of one of the second electrode 12 and the third electrode 13 that is not the output side electrode or a potential between the potential of the second electrode 12 and the potential of the third electrode is applied to the fifth electrode 15, for example.

Embodiment 5

Figure 27:
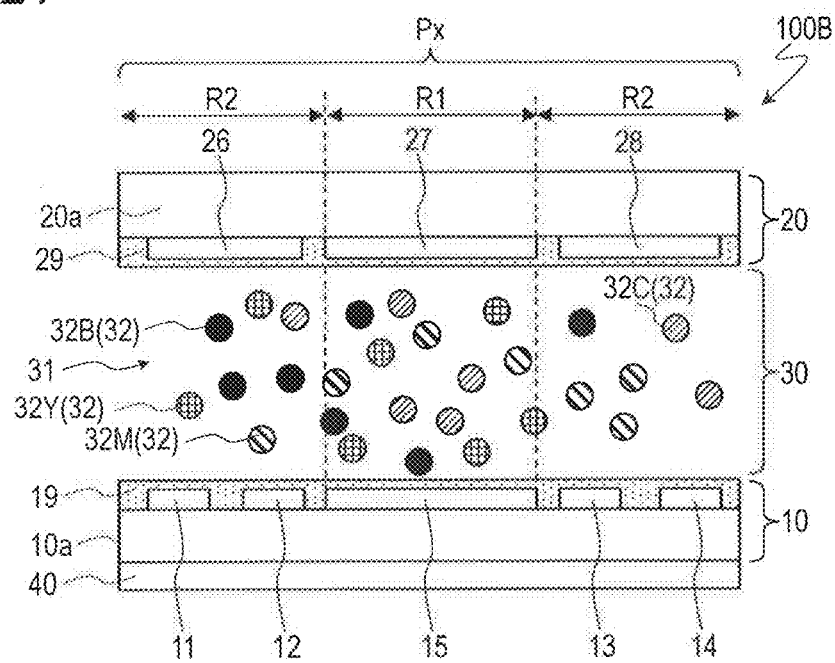
FIG. 27 A cross-sectional view schematically showing an electrophoretic element (display device) 100B according to an embodiment of the present invention.

FIG. 27 shows an electrophoretic element (display device) 100B of the present embodiment. FIG. 27 is a cross-sectional view schematically showing one pixel Px of the electrophoretic element 100B.

The electrophoretic element 100B is different from the electrophoretic element 100A of Embodiment 4 in that the second substrate 20 includes a sixth electrode 26, a seventh electrode 27 and an eighth electrode 28 as shown in FIG. 27. A potential different from the first electrode 11, the second electrode 12, the third electrode 13, the fourth electrode 14 and the fifth electrode 15 can be applied to the sixth electrode 26, the seventh electrode 27 and the eighth electrode 28. The sixth electrode 26 and the eighth electrode 28 are formed in the light-blocking region R2. The sixth electrode 26 is placed so as to face the first electrode 11 and the second electrode 12, and the eighth electrode 28 is placed so as to face the third electrode 13 and the fourth electrode 14. The seventh electrode 27 is formed in the opening region R1 and is placed so as to face the fifth electrode 15. The sixth electrode 26, the seventh electrode 27 and the eighth electrode 28 are formed from a transparent conductive material (e.g., ITO), and an insulating layer 29 is formed so as to cover these electrodes.

By providing the sixth electrode 26, the seventh electrode 27 and the eighth electrode 28 on the second substrate 20 side and also controlling the potential of the sixth electrode 26, the seventh electrode 27 and the eighth electrode 28, as in the present embodiment, it is possible to more precisely adjust the diffusion of the electrophoretic particles 32 to the opening region R1 and to further improve the contrast ratio. For example, the same potential as the second electrode 12 is applied to the sixth electrode 26, the same potential as the fifth electrode 15 is applied to the seventh electrode 27, and the same potential as the third electrode 13 is applied to the eighth electrode 28.

Embodiment 6

Figure 28:
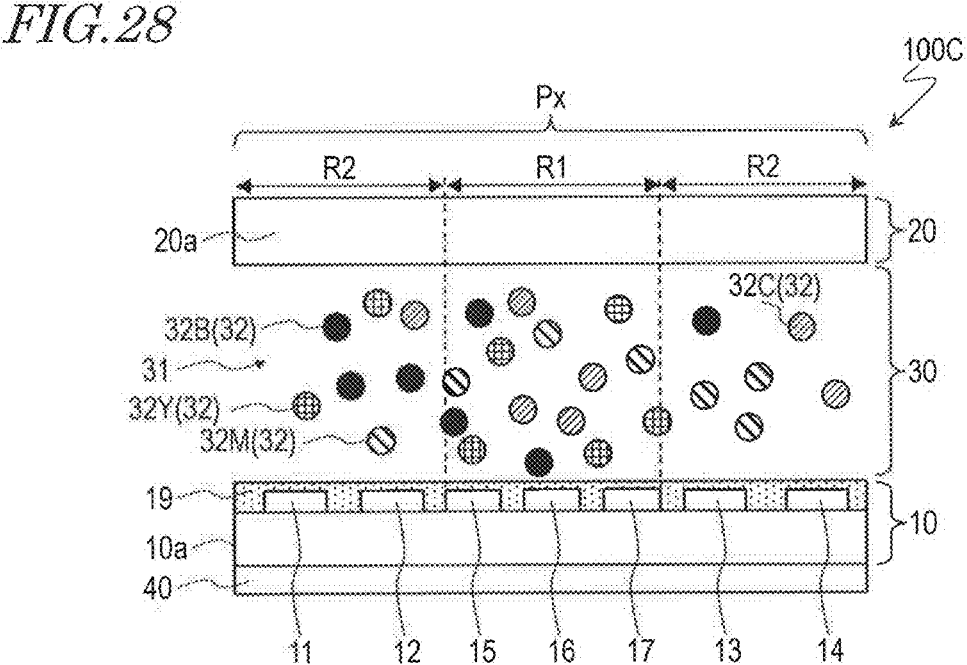
FIG. 28 A cross-sectional view schematically showing an electrophoretic element (display device) 100C according to an embodiment of the present invention.

FIG. 28 shows an electrophoretic element (display device) 100C of the present embodiment. FIG. 28 is a cross-sectional view schematically showing one pixel PX of the electrophoretic element 100C.

The electrophoretic element 100C is different from the electrophoretic element 100A of Embodiment 4 in that the first substrate 10 includes three electrodes (the fifth electrode, the sixth electrode and the seventh electrode) 15, 16 and 17 provided in the opening region R1 as shown in FIG. 28. A potential different from the first electrode 11, the second electrode 12, the third electrode 13 and the fourth electrode 14 can be applied to each of the fifth electrode 15, a sixth electrode 16 and a seventh electrode 17. The fifth electrode 15, the sixth electrode and the seventh electrode 17 are formed from a transparent conductive material (e.g., ITO).

By providing the fifth electrode 15, the sixth electrode 16 and the seventh electrode 17 in the opening region R1 and also controlling the potential of the fifth electrode 15, the sixth electrode 16 and the seventh electrode 17, as in the present embodiment, it is possible to more precisely adjust diffusion of the electrophoretic particles 32 to the opening region R1. In the present embodiment, with the provision of the three electrodes 15, 16 and 17 in the opening region R1, it is possible to give a potential difference therebetween, enabling even finer adjustments.

Note that the number of electrodes provided in the opening region R1 is not limited to three as illustrated herein. The first substrate 10 may include two electrodes or four or more electrodes in the opening region R1.

Embodiment 7

Figure 29:
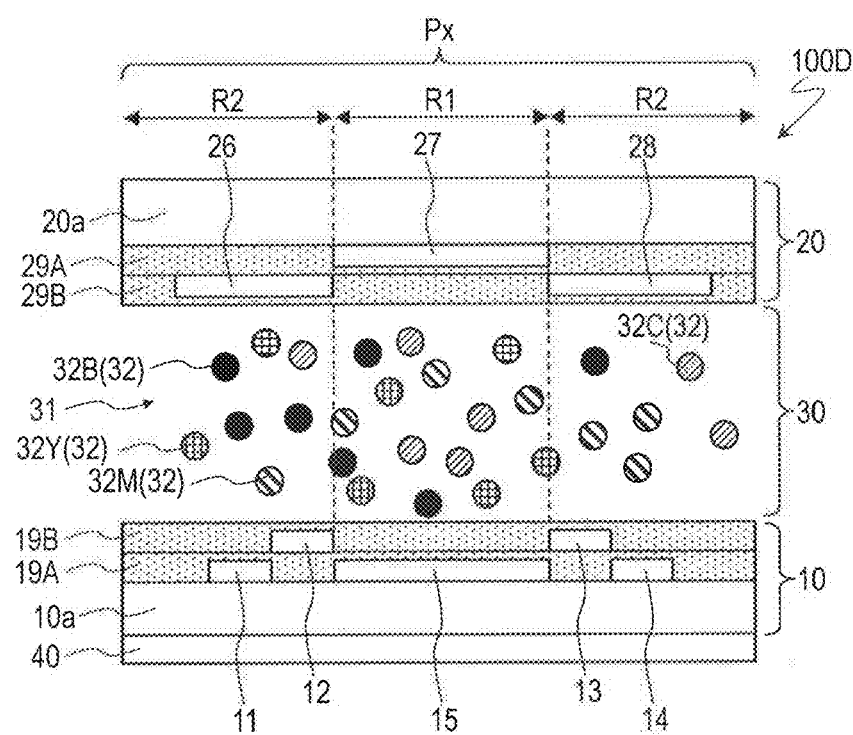
FIG. 29 A cross-sectional view schematically showing an electrophoretic element (display device) 100D according to an embodiment of the present invention.

FIG. 29 shows an electrophoretic element (display device) 100D of the present embodiment. FIG. 29 is a cross-sectional view schematically showing one pixel Px of the electrophoretic element 100D. The following description will focus on the difference between the electrophoretic element 100D of the present embodiment and the electrophoretic element 100B of Embodiment 5.

In the present embodiment, an insulating layer (lower-layer insulating layer) 19A is formed so as to cover the first electrode 11, the fourth electrode 14 and the fifth electrode 15 of the first substrate 10, and the second electrode 12 and the third electrode 13 are provided on the insulating layer 19A. An insulating layer (upper-layer insulating layer) 19B is formed so as to cover the second electrode 12 and the third electrode 13.

An insulating layer (lower-layer insulating layer) 29A is formed so as to cover the seventh electrode 27 of the second substrate 20, and the sixth electrode 26 and the eighth electrode 28 are provided on the insulating layer 29A. An insulating layer (upper-layer insulating layer) 29B is formed so as to cover the sixth electrode 26 and the eighth electrode 28.

As described above, in the present embodiment, the first substrate 10 includes the insulating layer 19A that covers some (the electrodes 11, 14 and 15) of the plurality of electrodes 11, 12, 13, 14 and 15, with the rest of the electrodes 12 and 13 being provided on the insulating layer 19A. Therefore, even if adjacent electrodes overlap with each other as seen from above (as seen from the direction normal to the display surface), they will not be short-circuited, and there is no need to provide a gap between adjacent electrodes. Therefore, it is possible to increase the ratio of the opening region R1 in each pixel Px and to produce brighter display.

Note that since adjacent electrodes are formed at different levels (heights) in the present embodiment, a fringe electric field is formed in the electrophoretic layer 30 when a potential difference is applied between the adjacent electrodes. With an electrode structure configured to form such a fringe electric field, the inter-electrode distance can be made smaller than with an electrode structure configured to form a simple transverse electric field. Therefore, it is possible to increase the electric field intensity between electrodes, and it is therefore possible to increase the force for separating the electrophoretic particles 32 from between electrodes. As a result, it is possible to preferably move the electrophoretic particles 32, to improve the response speed, to lower the driving voltage, etc.

Embodiment 8

Figure 30:
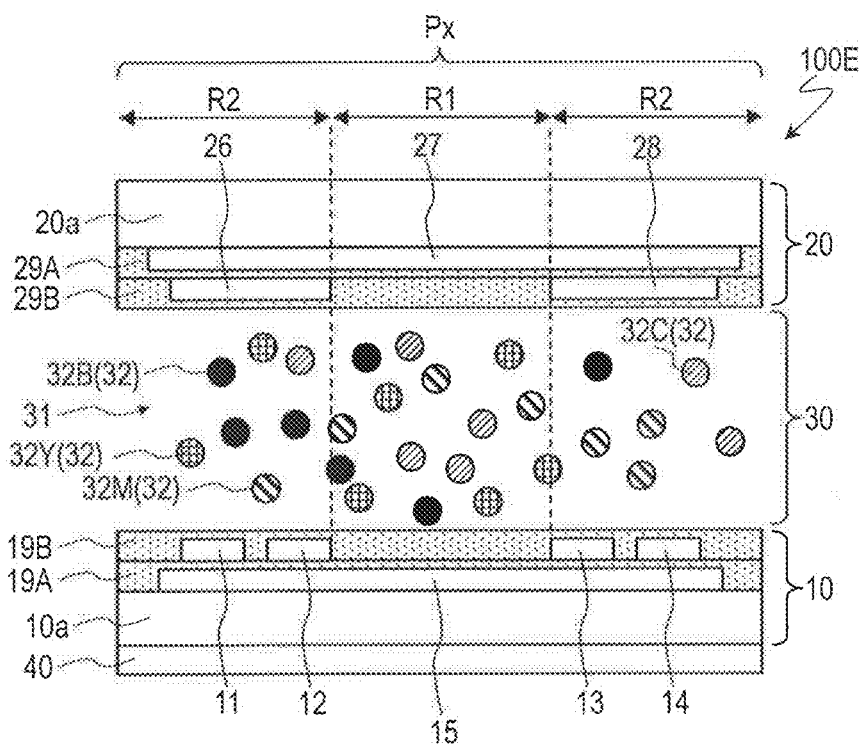
FIG. 30 A cross-sectional view schematically showing an electrophoretic element (display device) 100E according to an embodiment of the present invention.

FIG. 30 shows an electrophoretic element (display device) 100E of the present embodiment. FIG. 30 is a cross-sectional view schematically showing one pixel Px of the electrophoretic element 100E. The following description will focus on the difference between the electrophoretic element 100D of the present embodiment and the electrophoretic element 100E of Embodiment 5.

In the present embodiment, an insulating layer (lower-layer insulating layer) 19A is formed so as to cover the fifth electrode 15 of the first substrate 10, and the first electrode 11, the second electrode 12, the third electrode 13 and the fourth electrode 14 are provided on the insulating layer 19A. An insulating layer (upper-layer insulating layer) 19B is formed so as to cover the first electrode 11, the second electrode 12, the third electrode 13 and the fourth electrode 14. The fifth electrode 15 is formed over both the opening region R1 and the light-blocking region R2, and is laid on the first electrode 11, the second electrode 12, the third electrode 13 and the fourth electrode 14 with the insulating layer 19A interposed therebetween.

An insulating layer (lower-layer insulating layer) 29A is formed so as to cover the seventh electrode 27 of the second substrate 20, and the sixth electrode 26 and the eighth electrode 28 are provided on the insulating layer 29A. An insulating layer (upper-layer insulating layer) 29B is formed so as to cover the sixth electrode 26 and the eighth electrode 28. The seventh electrode 27 is formed over both the opening region R1 and the light-blocking region R2, and is laid on the sixth electrode 26 and the eighth electrode 28 with the insulating layer 29A interposed therebetween.

In the present embodiment, areas of the first substrate 10 where the fifth electrode 15 is laid on the first electrode 11, the second electrode 12, the third electrode 13 and the fourth electrode 14 can be used as storage capacitors. Areas of the second substrate 20 where the seventh electrode 27 is laid on the sixth electrode 26 and the eighth electrode 28 can also be used as storage capacitors.

Embodiment 9

Figure 31:
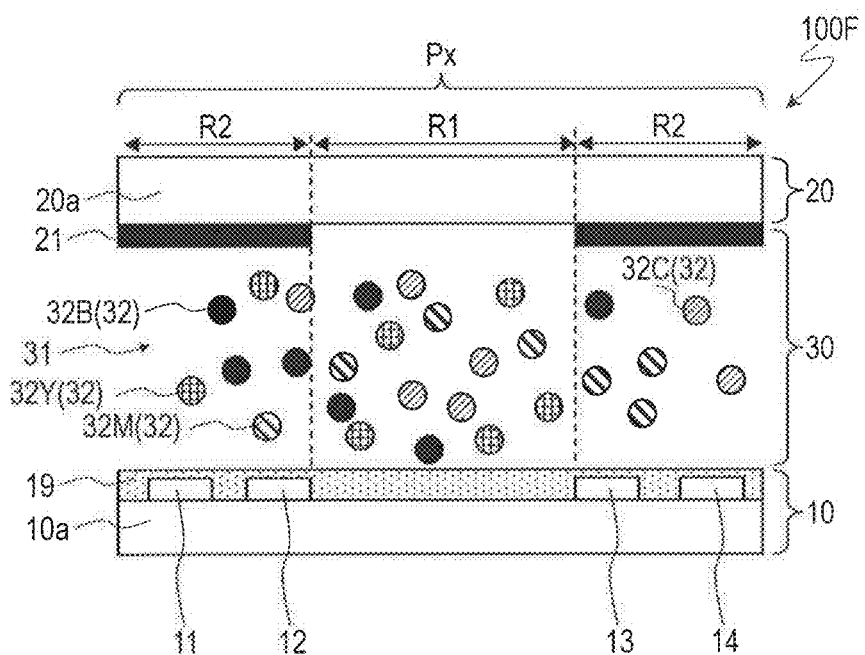
FIG. 31 A cross-sectional view schematically showing an electrophoretic element (display device) 100F according to an embodiment of the present invention.

FIG. 31 shows an electrophoretic element (display device) 100F of the present embodiment. FIG. 31 is a cross-sectional view schematically showing one pixel Px of an electrophoretic element 100F.

As shown in FIG. 31, the electrophoretic element 100F includes the components of the electrophoretic element 100 of Embodiment 1, except for the light-reflecting layer 40. Therefore, when none of the plurality of types of electrophoretic particles 32 is positioned in the opening region R1 of the electrophoretic element 100F, the opening region R1 is substantially colorless and transparent. Therefore, the electrophoretic element 100F can be used as a transparent display (see-through display).

Note that when producing white display on the electrophoretic element 100F, white-colored electrophoretic particles may be included in the electrophoretic layer 30.

Embodiment 10

Figure 32:
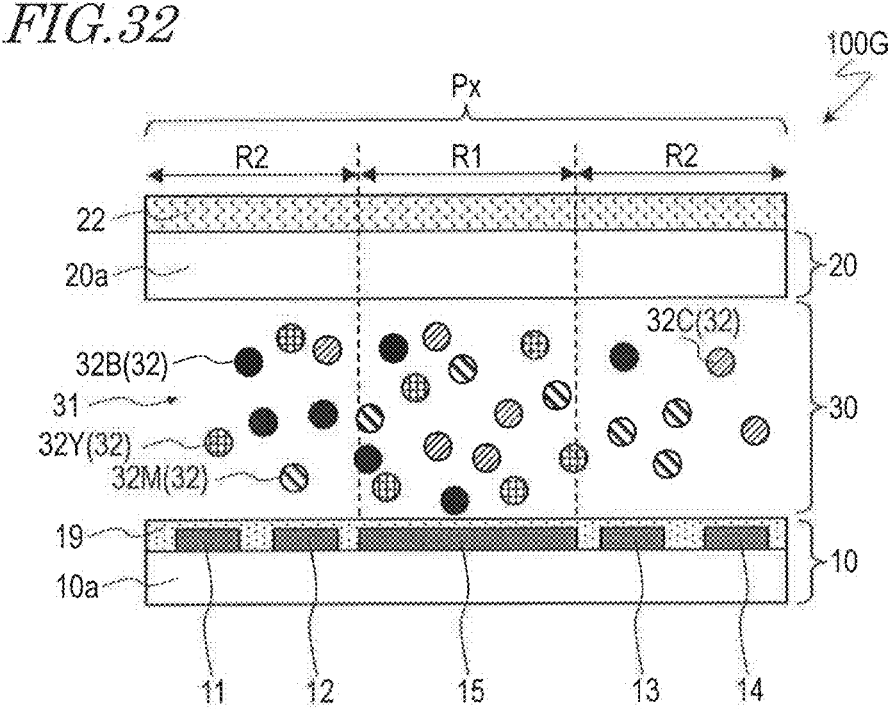
FIG. 32 A cross-sectional view schematically showing an electrophoretic element (display device) 100G according to an embodiment of the present invention.

FIG. 32 shows an electrophoretic element (display device) 100G of the present embodiment. FIG. 32 is a cross-sectional view schematically showing one pixel Px of the electrophoretic element 100G. The following description will focus on the difference between the electrophoretic element 100G of the present embodiment and the electrophoretic element 100A of Embodiment 4.

In the electrophoretic element 100G, the fifth electrode 15 provided in the opening region R1 is a reflective electrode having a light-reflecting property and functions as a light-reflecting layer. More specifically, the fifth electrode 15 is a specular reflection electrode that specularly reflects light. A light diffusion layer (a light-diffusing film) 22 that diffuses light is provided on the front side relative to the electrophoretic layer 30 (herein, on the front side of the transparent substrate 20a of the second substrate 20).

The fifth electrode 15 includes a layer that is formed from a metal material having a high reflectance (e.g., aluminum). The fifth electrode 15 may have a multi-layer structure including a plurality of layers formed from different conductive materials. For example, the fifth electrode 15 has a multi-layer structure including a titanium layer, an aluminum layer and an ITO layer layered in this order from the transparent substrate 10a. The ITO layer in this configuration serves to prevent corrosion of the aluminum layer.

By employing a reflective electrode for the fifth electrode 15, it is possible to place lines, TFTs, storage capacitors, etc., under the reflective electrode (light-reflecting layer), thereby improving the reflective aperture ratio. Moreover, there is no need to provide a light-reflecting layer (the light-reflecting layer 40 in the electrophoretic element 100 of Embodiment 1) separately from the fifth electrode 15, and it is therefore possible to reduce cost.

Note that the first electrode 11, the second electrode 12, the third electrode 13 and the fourth electrode 14 may each be a reflective electrode having the same configuration as the fifth electrode 15 or a transparent electrode formed from a transparent conductive material.

Similar effects can be realized also by employing a reflective electrode for the fifth electrode 15, the sixth electrode 16 and the seventh electrode 17 provided in the opening region R1 in the electrophoretic element 100C of Embodiment 6.

Embodiment 11

Figure 33:
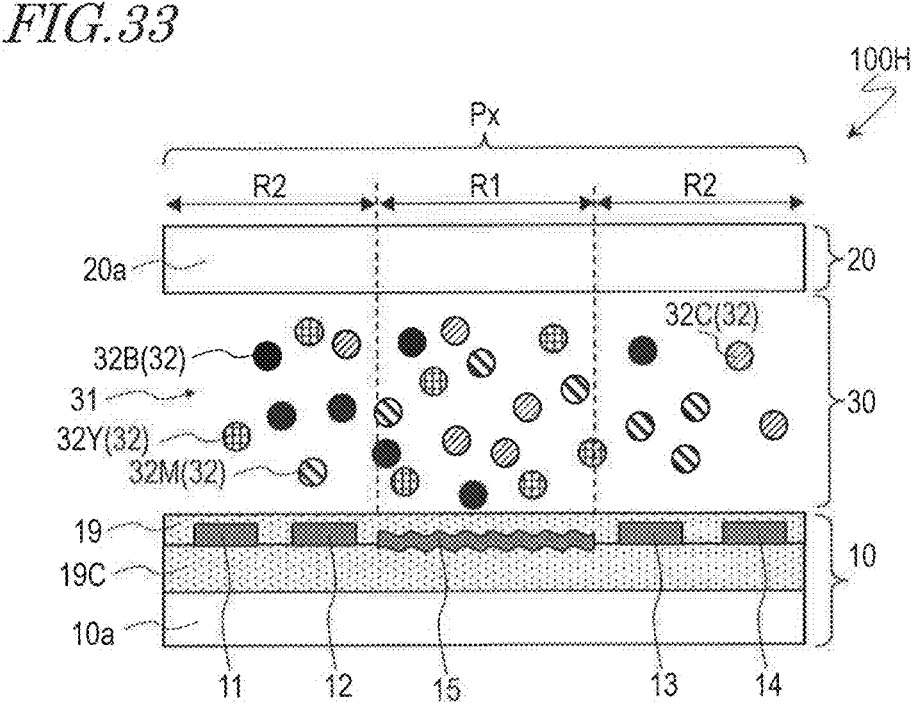
FIG. 33 A cross-sectional view schematically showing an electrophoretic element (display device) 100H according to an embodiment of the present invention.

FIG. 33 shows an electrophoretic element (display device) 100H of the present embodiment. FIG. 33 is a cross-sectional view schematically showing one pixel Px of the electrophoretic element 100H. The following description will focus on the difference between the electrophoretic element 100E of the present embodiment and the electrophoretic element 100A of Embodiment 4.

In the electrophoretic element 100G, the fifth electrode 15 provided in the opening region R1 is a reflective electrode having a light-reflecting property and functions as a light-reflecting layer. More specifically, the fifth electrode 15 is a diffuse reflection electrode that diffusively reflects light.

The fifth electrode 15 includes a layer that is formed from a metal material having a high reflectance to aluminum). The fifth electrode 15 may have a multi-layer structure including a plurality of layers formed from different conductive materials. For example, the fifth electrode 15 has a multi-layer structure including a titanium layer, an aluminum layer and an ITO layer layered in this order from the transparent substrate 10a. The ITO layer in this configuration serves to prevent corrosion of the aluminum layer.

The surface of the fifth electrode 15 has an uneven shape, thereby diffusively reflecting (scattering) light at the fifth electrode 15. Herein, an uneven shape is formed on the surface of an insulating layer (e.g., formed from a photosensitive acrylic resin material) 19C located directly below the fifth electrode 15, thereby giving an uneven shape to the surface of the fifth electrode 15 (reflecting the uneven shape of the surface of the insulating layer 19C).

By employing a reflective electrode for the fifth electrode 15, it is possible to place lines, TFTs, storage capacitors, etc., under the reflective electrode (light-reflecting layer), thereby improving the reflective aperture ratio. Moreover, there is no need to provide a light-reflecting layer (the light-reflecting layer 40 in the electrophoretic element 100 of Embodiment 1) separately from the fifth electrode 15, and it is therefore possible to reduce cost.

Note that the first electrode 11, the second electrode 12, the third electrode 13 and the fourth electrode 14 may each be a reflective electrode having the same configuration as the fifth electrode 15 or a transparent electrode formed from a transparent conductive material.

Similar effects can be realized also by employing a reflective electrode (diffuse reflection electrode) for the fifth electrode 15, the sixth electrode 16 and the seventh electrode 17 provided in the opening region R1 in the electrophoretic element 100C of Embodiment 6.

Embodiment 12

FIG. 34, FIG. 35, FIG. 36 and FIG. 37 slaw electrophoretic elements (display devices) 200A, 100I, 100J and 100K of the present embodiment. FIG. 34, FIG. 35, FIG. 36 and FIG. 37 are cross-sectional views schematically showing one pixel Px of the electrophoretic elements 200A, 100I, 100J and 100K, respectively.

Figure 34:
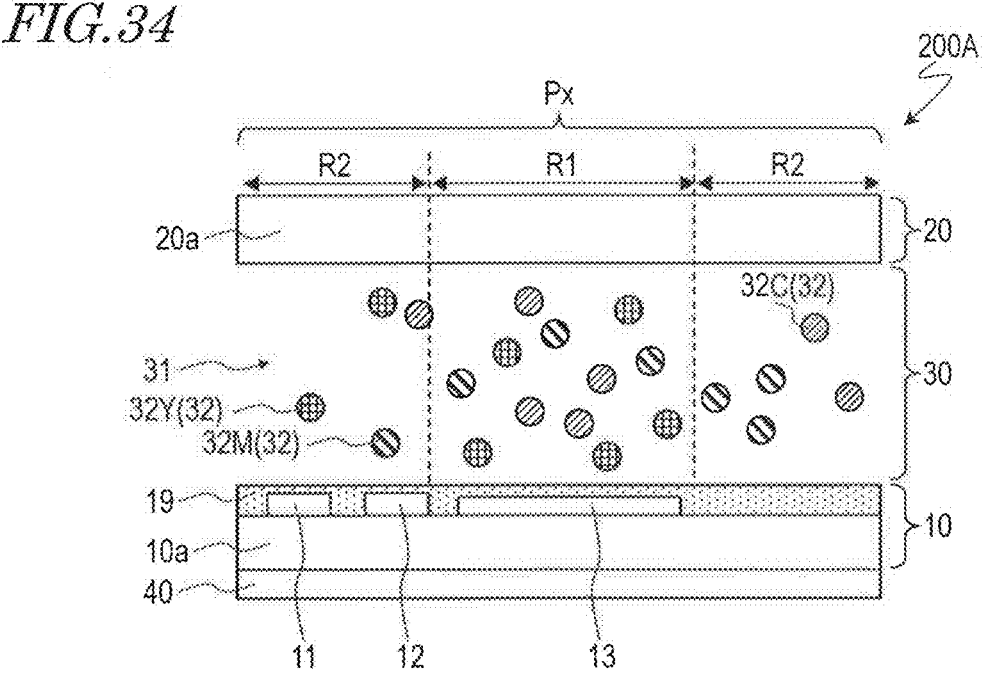
FIG. 34 A cross-sectional view schematically showing an electrophoretic element (display device) 200A according to an embodiment of the present invention.

The electrophoretic element 200A shown in FIG. 34 is different from the electrophoretic element 200 of Embodiment 2 shown in FIG. 14 in that the third electrode 13 is provided in the opening region R1. With the provision of the third electrode 13 in the opening region R1, the electrophoretic particles 32 in the opening region R1 are trapped by the third electrode 13 due to an image force, thereby expressing a memory property.

Figure 35:
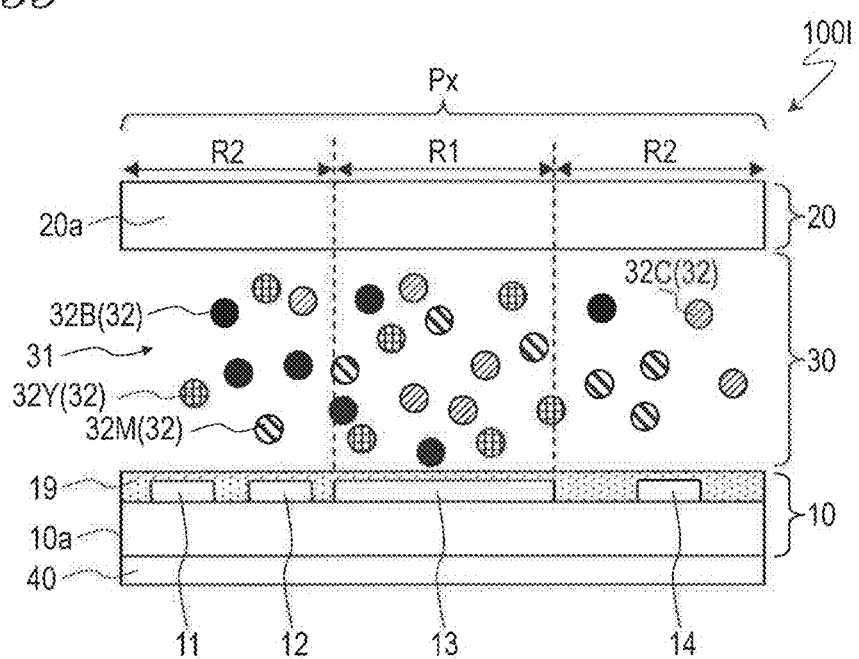
FIG. 35 A cross-sectional view schematically showing an electrophoretic element (display device) 100I according to an embodiment of the present invention.

The electrophoretic element 100I shown in FIG. 35 is different from the electrophoretic element 100A of Embodiment 4 shown in FIG. 26 in that the third electrode 13, instead of the fifth electrode 15, is provided in the opening region R1. That is, the electrophoretic element 100I has a configuration in which the third electrode 13 and the fifth electrode 15 of the electrophoretic element 100A are replaced by a single component.

Figure 36:
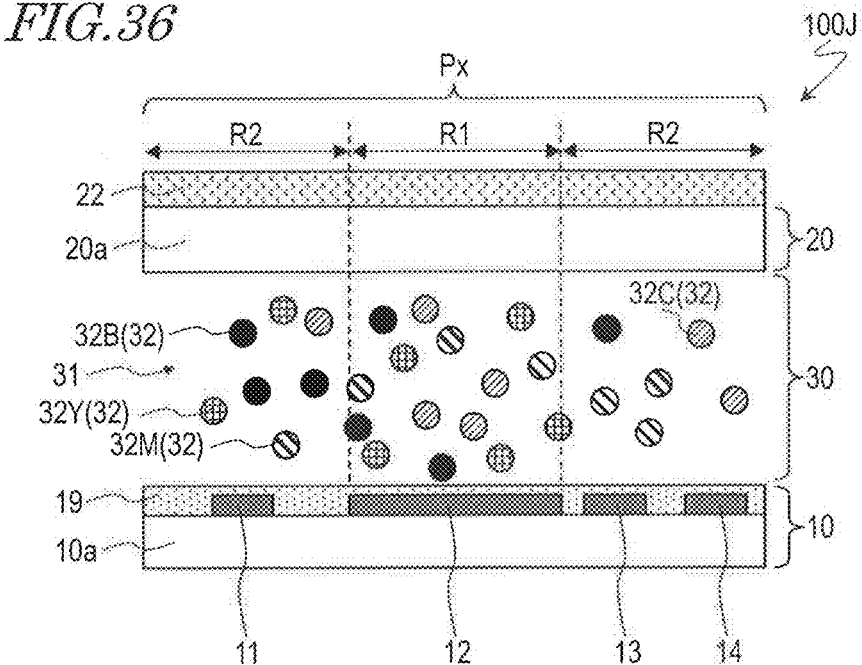
FIG. 36 A cross-sectional view schematically showing an electrophoretic element (display device) 100J according to an embodiment of the present invention.

The electrophoretic element 100J shown in FIG. 36 is different from the electrophoretic element 100G of Embodiment 10 shown in FIG. 32 in that the second electrode 12, instead of the fifth electrode 15, is provided in the opening region R1. That is, the electrophoretic element 100J has a configuration in which the second electrode 12 and the fifth electrode 15 of the electrophoretic element 100G are replaced by a single component. The second electrode 12 of the electrophoretic element 100J is a reflective electrode having a light-reflecting property and, more specifically, a specular reflection electrode that specularly reflects light.

Figure 37:
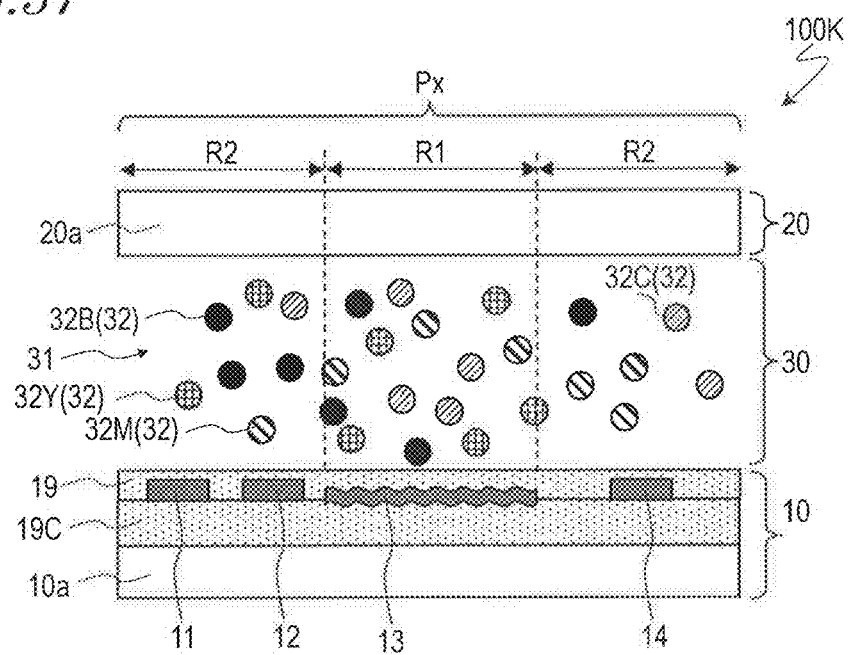
FIG. 37 A cross-sectional view schematically showing an electrophoretic element (display device) 100K according to an embodiment of the present invention.

The electrophoretic element 100K shown in FIG. 37 is different from the electrophoretic element 100H of Embodiment 11 shown in FIG. 33 in that the third electrode 13, instead of the fifth electrode 15, is provided in the opening region R1. That is, the electrophoretic element 100K has a configuration in which the third electrode 13 and the fifth electrode 15 of the electrophoretic element 100H are replaced by a single component. The third electrode 13 of the electrophoretic element 100K is a reflective electrode having a light-reflecting property and, more specifically, a diffuse reflection electrode that diffusively reflects light.

Embodiment 13

Figure 38:
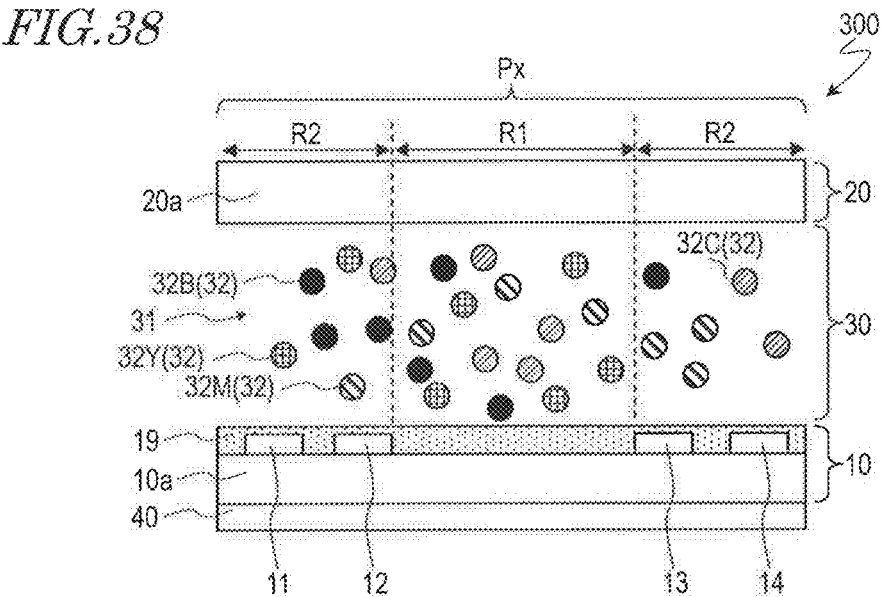
FIG. 38 A cross-sectional view schematically showing an electrophoretic element (display device) 300 according to an embodiment of the present invention.

FIG. 38 shows an electrophoretic element (display device) 300 of the present embodiment. FIG. 38 is a cross-sectional view schematically showing one pixel Px of the electrophoretic element 300.

As shown in FIG. 38, the electrophoretic layer 30 of the electrophoretic element 300 includes the cyan particles 32C, the magenta particles 32M, the yellow particles 32Y and the black particles 32B, as does the electrophoretic layer 30 of the electrophoretic element 100 of Embodiment 1. The first substrate 10 of the electrophoretic element 300 includes four electrodes (the first electrode, the second electrode, the third electrode and the fourth electrode) 11, 12, 13 and 14 to which different potentials can be applied, as does the first substrate 10 of the electrophoretic element 100 of Embodiment 1, and the first electrode 11, the second electrode 12, the opening region R1, the third electrode 13 and the fourth electrode 14 are placed in this order along a certain direction (the direction from the left side toward the right side in FIG. 38) that is parallel to the substrate surface of the first substrate 10.

Note however that the electrophoretic element 300 is different from the electrophoretic element 100 of Embodiment 1 as follows.

With the electrophoretic element 100 of Embodiment 1, the cyan particles 32C, the magenta particles 32M and the yellow particles 32Y are charged with the same polarity, and the black particles 32B are charged with a different polarity from the cyan particles 32C, the magenta particles 32M and the yellow particles 32Y. That is, three of the four types of electrophoretic particles 32 are charged with the same polarity and the remaining one type of electrophoretic particles 32 are charged with a different polarity.

In contrast, with the electrophoretic element 300 of the present embodiment, two of the four types of electrophoretic particles 32 are charged with the same polarity and the remaining two types of electrophoretic particles 32 are charged with a different polarity. Specifically, two types of electrophoretic particles 32 (from among the cyan particles 32C, the magenta particles 32M and the yellow particles 32Y) are charged with the same polarity and the remaining one type of electrophoretic particles 32 (from among the cyan particles 32C, the magenta particles 32M and the yellow particles 32Y) and the black particles 32B are charged with a different polarity from the first two types of electrophoretic particles 32.

Herein, the cyan particles 32C and the black particles 32B are positively charged, and the magenta particles 32M and the yellow particles 32Y are negatively charged. The cyan particles 32C and the black particles 32B have different threshold characteristics from each other. The magenta particles 32M and the yellow particles 32Y have different threshold characteristics from each other.

With the electrophoretic element 300 of the present embodiment, it is possible to apply a transverse electric field to the electrophoretic layer 30 by controlling the potentials of the four electrodes 11, 12, 13 and 14, and it is therefore possible to locate two or more of the plurality of types of electrophoretic particles 32 in the opening region R1. Thus, it is possible to realize subtractive color mixing (superposition of colors) within a pixel Px, rather than juxtapositional color mixing (i.e., mixing or colors between pixels Px). Display principles of the electrophoretic element 300 will now be described. First, the threshold characteristics of the electrophoretic particles 32 will be described.

[Threshold Characteristics of Electrophoretic Particles]

Figure 39:
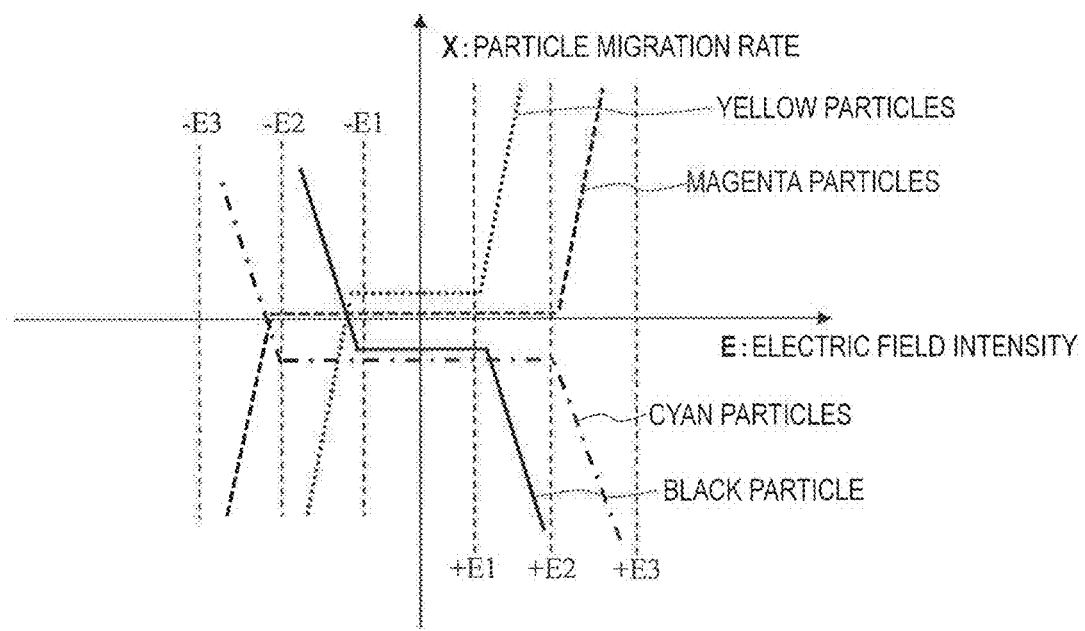
FIG. 39 A graph showing an example of threshold characteristics of the cyan particles 32C, the magenta particles 32M, the yellow particles 32Y and the black particles 32B included in the electrophoretic layer 30 of the electrophoretic element 300.

FIG. 39 shows an example of threshold characteristics of the cyan particles 32C, the magenta particles 32M, the yellow particles 32Y and the black particles 32B. FIG. 39 is a graph whose horizontal axis represents the electric field intensity E and whose vertical axis represents the particle migration rate X. The absolute values |E1|, |E2| and |E3| of the electric field intensities +E1, +E2, +E3, −E1, −E2 and −E3 shown in FIG. 39 satisfy the relationship |E1|<|E2|<|E3|. As can be seen from FIG. 39, the cyan particles 32C move in the negative direction when +E2<E and move in the positive direction when E<−E2. The magenta particles 32M move in the positive direction when +E2<E and move in the negative direction when E<−E2. The yellow particles 32Y move in the positive direction when +E1<E and move in the negative direction when E<−E1. The black particles 32B move in the negative direction when +E1<E and move in the positive direction when E<−E1.

Next, a display sequence for white display and a display sequence for black display will be described. Note that the four potential levels, a [V], b [V], c [V] and d [V], as well as the ground potential GND (0 V), will be referred to in the following description. The ground potential GND and these four potential levels satisfy the relationship a<b<0<c<d. When the potential level difference between adjacent electrodes is one (e.g., when the potentials a [V] and b [V] are applied to two adjacent electrodes), a potential gradient corresponding to the electric field intensity E2 (+E2 or −E2) is formed between the electrodes. Similarly, when the potential level difference between adjacent electrodes is two (e.g., when the potentials a [V] the ground potential GND are applied to two adjacent electrodes), a potential gradient corresponding to the electric field intensity E3 (+E3 or −E3) is formed between the electrodes.

[White Display (Reset)]

Figure 40:
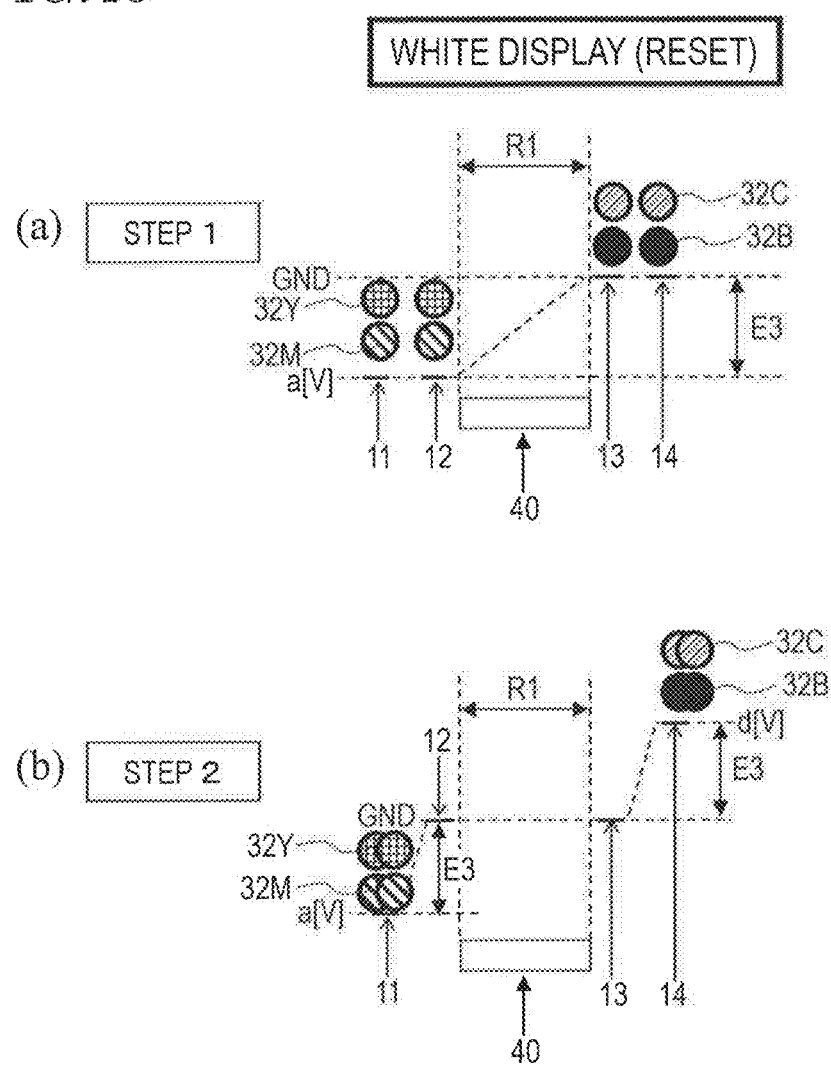
FIGS. 40 (a) and (b) are diagrams illustrating a display sequence for white display.

FIGS. 40(a) and 40(b) are diagrams illustrating a display sequence for white display. First, as shown in FIG. 40(a), the potentials of the first electrode 11 and the second electrode 12 are set to a [V], and the potentials of the third electrode 13 and the fourth electrode 14 are set to the ground potential GND (step 1). At this point, since a potential gradient corresponding to the electric field intensity E3 is formed in the opening region R1, the magenta particles 32M and the yellow particles 32Y are positioned over the first electrode 11 and the second electrode 12 and the cyan particles 32C and the black particles 32B are positioned over the third electrode 13 and the fourth electrode 4.

Next, as shown in FIG. 40(b), the potential of the second electrode 12 is set the ground potential GND, and the potential of the fourth electrode 14 is set to d [V] (step 2). At this point, since a potential gradient corresponding to the electric field intensity E3 is formed between the first electrode 11 and the second electrode 12 and a potential gradient corresponding to the electric field intensity E3 is formed between the third electrode 13 and the fourth electrode 14, the magenta particles 32M and the yellow particles 32Y move from over the second electrode 12 to over the first electrode 11, and the cyan particles 32C and the black particles 32B move from over the third electrode 13 to over the fourth electrode 14. In this state, since the electrophoretic particles 32 are absent in the opening region R1, the external light (ambient light) entering the electrophoretic layer 30 from the observer side is reflected by the light-reflecting layer 40, thereby producing white display.

With the electrophoretic element 300, switching from one color to another is basically done via this white display state. Therefore, white display can also be said to be a reset operation.

[Black Display]

Figure 41:
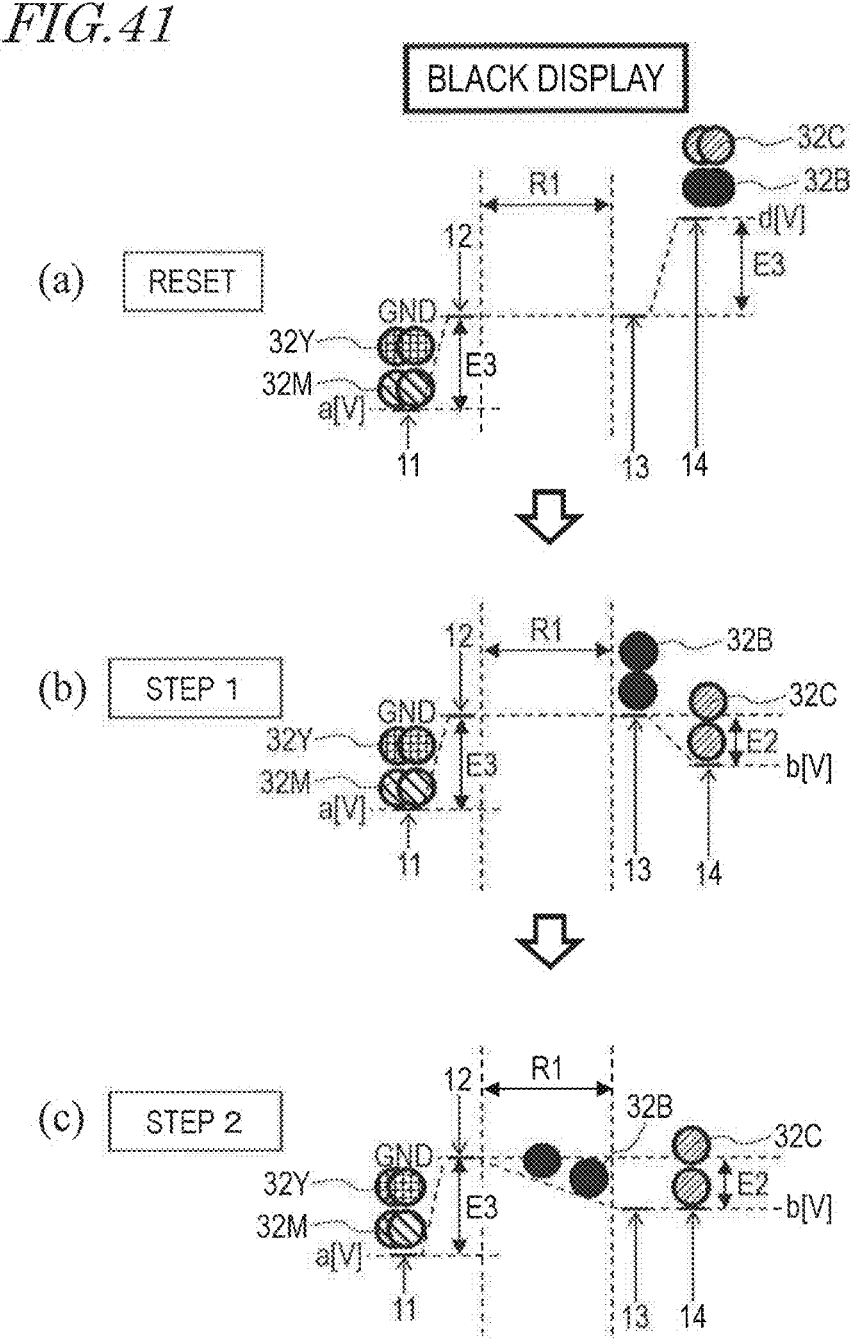
FIG. 41 (a) to (c) are diagrams illustrating a display sequence for black display.

FIGS. 41(a) to 41(c) are diagrams illustrating a display sequence for black display. First, as shown in FIG. 41(a), the same potentials as those in the white display state are applied to the first electrode 11, the second electrode 12, the third electrode 13 and the fourth electrode 14, thus resetting display.

Next, as shown in FIG. 41(b), the potential of the fourth electrode 14 is set to b [V] (step 1). At this point, since a potential gradient corresponding to the electric field intensity E2 is formed between the third electrode 13 and the fourth electrode 14, the black particles 32B move from over the fourth electrode 14 to over the third electrode 13 (the cyan particles 32C remain over the fourth electrode 14).

Then, as shown in FIG. 41(c), the potential of the third electrode 13 is set to b [V] (step 2). At this point, since a potential gradient corresponding to the electric field intensity E2 is formed between the second electrode 12 and the third electrode 13 (i.e., in the opening region R1), the black particles 32B move from over the third electrode 13 to the opening region R1. Therefore, in this state, black display is produced.

Next, display sequences for single-color display of cyan, magenta and yellow will be described.

[Cyan Display]

FIGS. 42(a) to 42(d) are diagrams illustrating a display sequence for cyan display. First, as shown in FIG. 42(a), the same potentials as those in the white display state are applied to the first electrode 11, the second electrode 12, the third electrode 13 and the fourth electrode 14, thus resetting display.

Figure 42:
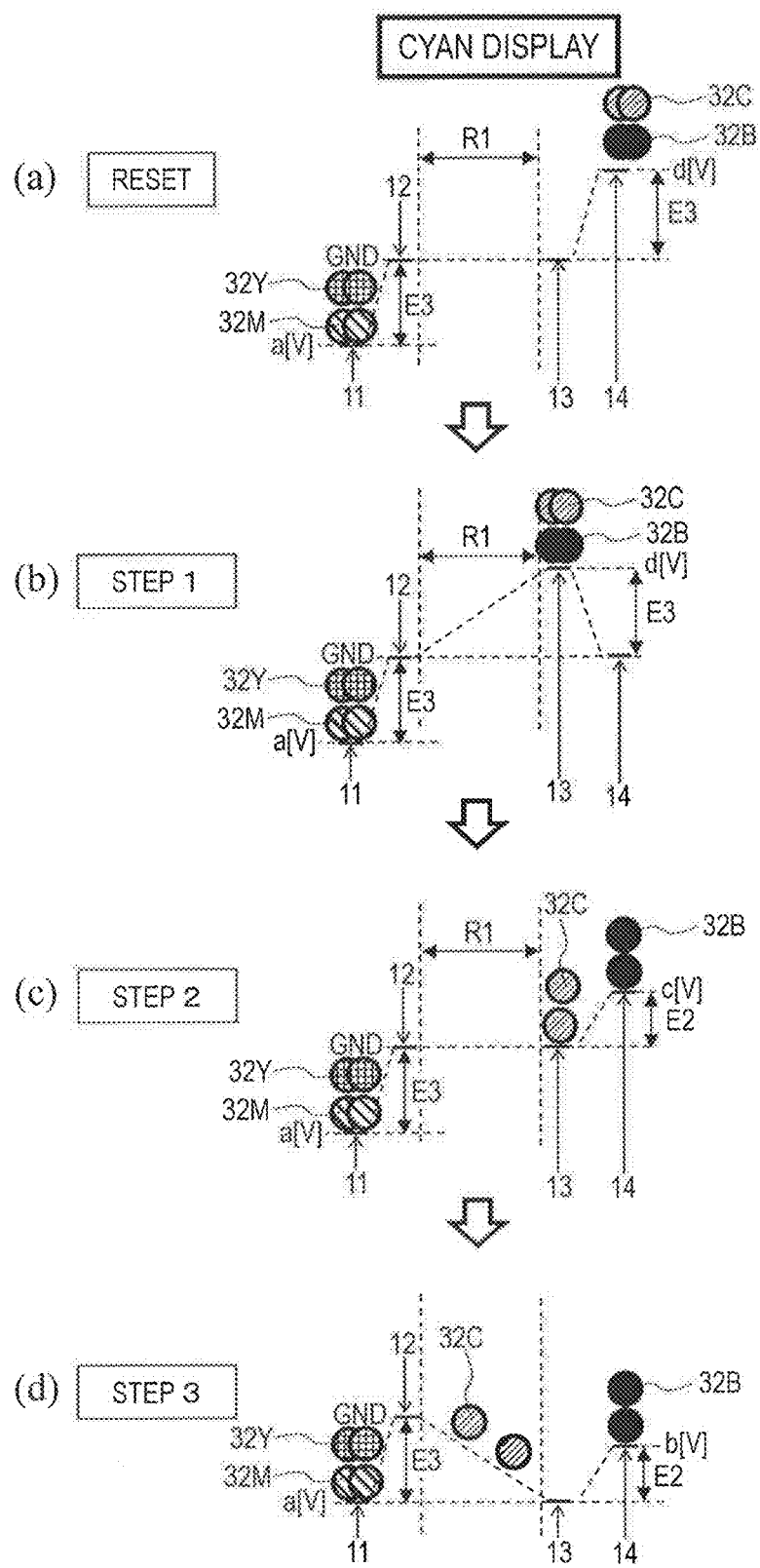
FIG. 42 (a) to (d) are diagrams illustrating a display sequence for cyan display.

Next, as shown in FIG. 42(*b*), the potential of the third electrode 13 is set to d [V], and the potential of the fourth electrode 14 is set to the ground potential GND (step 1). At this point, a potential gradient corresponding to the electric field intensity E3 is formed between the third electrode 13 and the fourth electrode 14. Therefore, the cyan particles 32C and the black particles 32B move from over the fourth electrode 14 to over the third electrode 13.

Next, as shown in FIG. 42(*c*), the potential of the third electrode 13 is set to the ground potential GND, and the potential of the fourth electrode 14 is set to c [V] (step 2). At this point, since a potential gradient corresponding to the electric field intensity E2 is formed between the third electrode 13 and the fourth electrode 14, the black particles 32B move from over the third electrode 13 to over the fourth electrode 14 (the cyan particles 32C remain over the third electrode 13).

Then, as shown in FIG. 42(*d*), the potential of the third electrode 13 is set to a [V], and the potential of the fourth electrode 14 is set to b [V] (step 3). At this point, since a potential gradient corresponding to the electric field intensity E3 is formed between the second electrode 12 and the third electrode 13 (i.e., in the opening region R1), the cyan particles 32C move from over the third electrode 13 to opening region R1. Therefore, in this state, cyan display is produced.

[Magenta Display]

Figure 43:
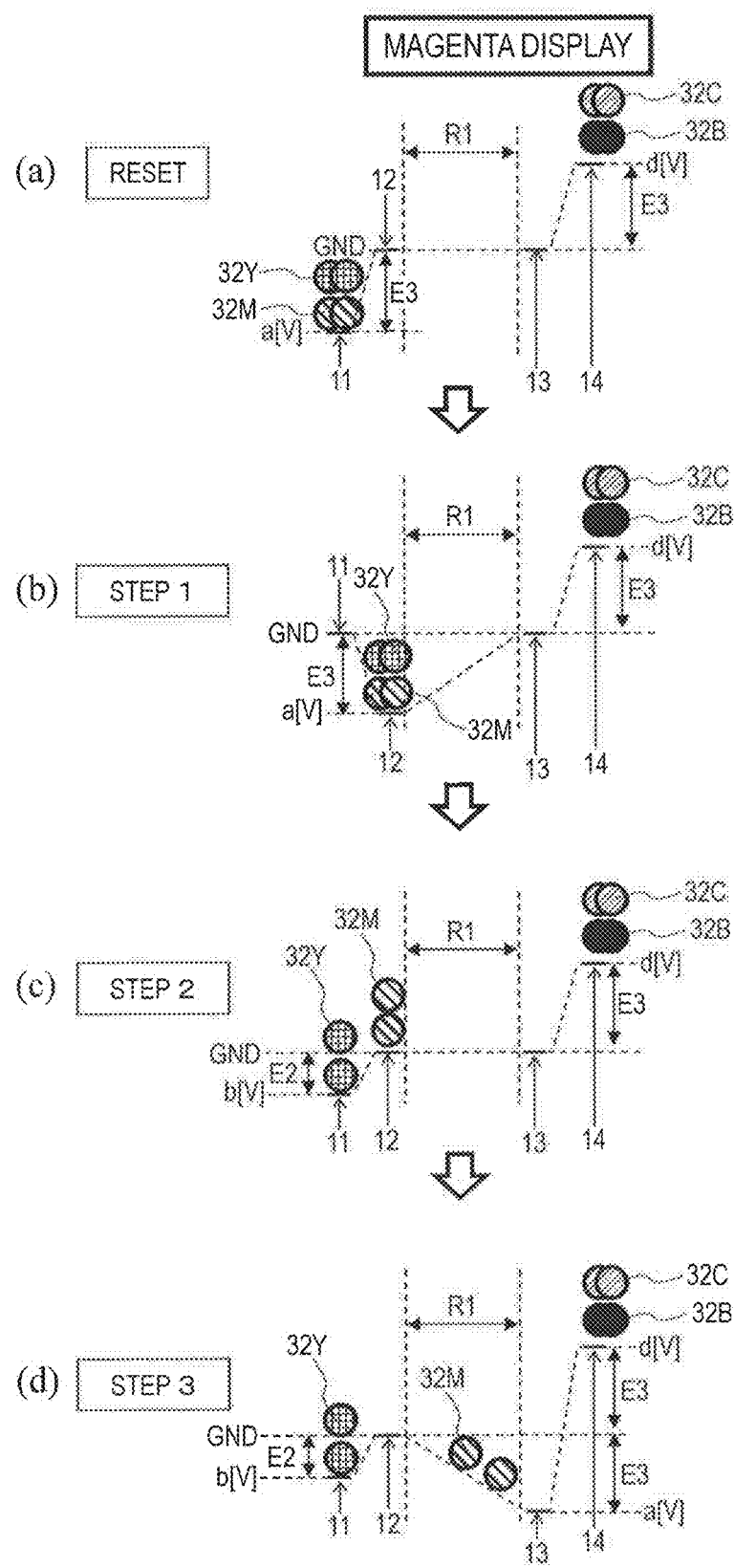
FIG. 43 (a) to (d) are diagrams illustrating a display sequence for magenta display.

FIGS. 43(*a*) to 43(*d*) are diagrams illustrating a display sequence for magenta display. First, as shown in FIG. 43(*a*), the same potentials as those in the white display state are applied to the first electrode 11, the second electrode 12, the third electrode 13 and the fourth electrode 14, thus resetting display.

Next, as shown in FIG. 43(*b*), the potential of the first electrode 11 is set to the ground potential GND, and the potential of the second electrode 12 is set to a [V] (step 1). At this point, since a potential gradient corresponding to the electric field intensity E3 is formed between the first electrode 11 and the second electrode 12, the magenta particles 32M and the yellow particles 32Y move from over the first electrode 11 to over the second electrode 12.

Next, as shown in FIG. 43(*c*), the potential of the first electrode 11 is set to b [V], and the potential of the second electrode 12 is set to the ground potential GND (step 2). At this point, since a potential gradient corresponding to the electric field intensity E2 is formed between the first electrode 11 and the second electrode 12, the yellow particles 32Y move from over the second electrode 12 to over the first electrode 11 (the magenta particles 32M remain over the second electrode 12).

Then, as shown in FIG. 43(*d*), the potential of the third electrode 13 is set to a [V] (step 3). At this point, since a potential gradient corresponding to the electric field intensity E3 is formed between the second electrode 12 and the third electrode 13 (i.e., in the opening region R1), the magenta particles 32M move from over the second electrode 12 to the opening region R1. Therefore, in this state, magenta display is produced.

[Yellow Display]

Figure 44:
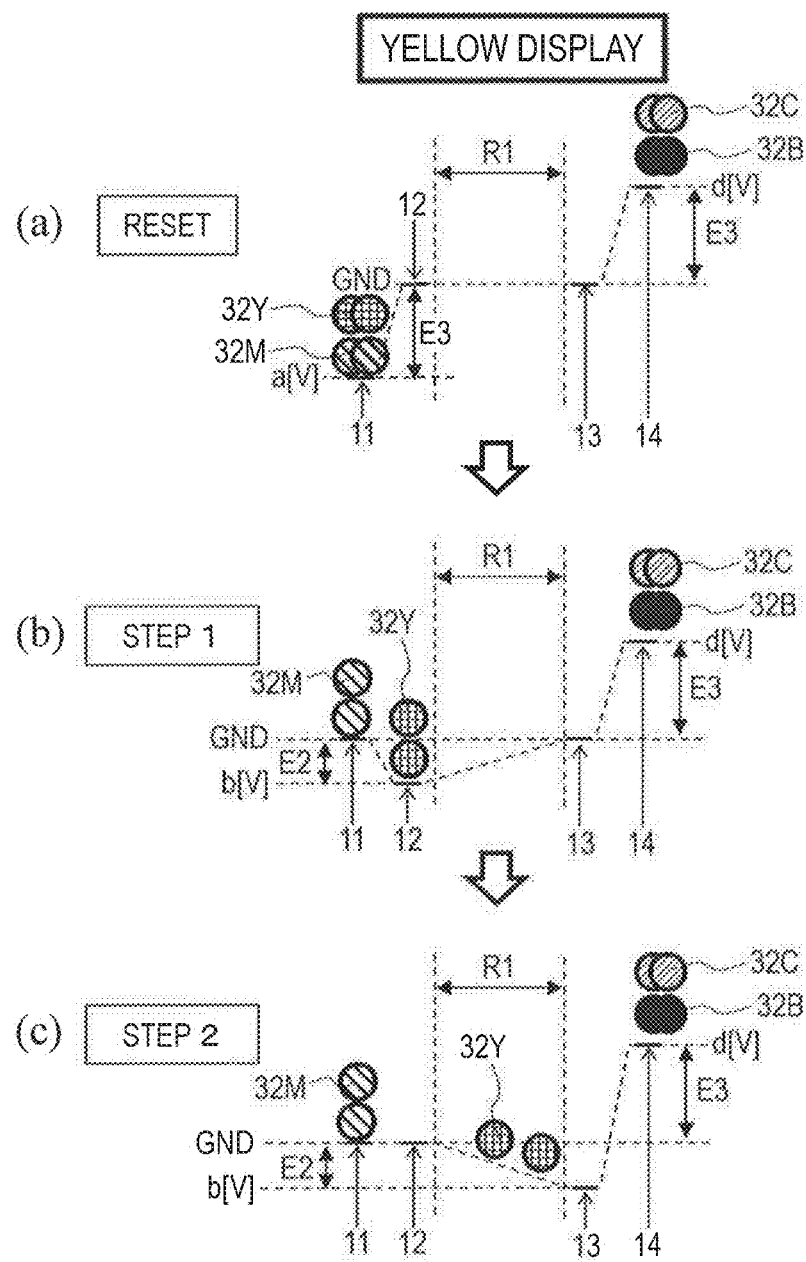
FIG. 44 (a) to (c) are diagrams illustrating a display sequence for yellow display.

FIGS. 44(*a*) to 44(*c*) are diagrams illustrating a display sequence for yellow display. First, as shown in FIG. 44(*a*), the same potentials as those in the white display state are applied to the first electrode 11, the second electrode 12, the third electrode 13 and the fourth electrode 14, thus resetting display.

Next, as shown in FIG. 44(*b*), the potential of the first electrode 11 is set to the ground potential GND, and the potential of the second electrode 12 is set to b [V] (step 1). At this point, since a potential gradient corresponding to the electric field intensity E2 is formed between the first electrode 11 and the second electrode 12, the yellow particles 32Y move from over the first electrode 11 to over the second electrode 12 (the magenta particles 32M remain over the first electrode 11).

Next, as shown in FIG. 44(*c*), the potential of the second electrode 12 is set the ground potential GND, and the potential of the third electrode 13 is set to b [V] (step 2). At this point, since a potential gradient corresponding to the electric field intensity E2 is formed between the second electrode 12 and the third electrode 13 (i.e., in the opening region R1), the yellow particles 32Y move from over the second electrode 12 to the opening region R1. Therefore, in this state, yellow display is produced.

Next, display sequences for green display (mixed color display between cyan and yellow), blue display (mixed color display between cyan and magenta) and red display (mixed color display between magenta and yellow) will be described.

[Green Display]

Figure 45:
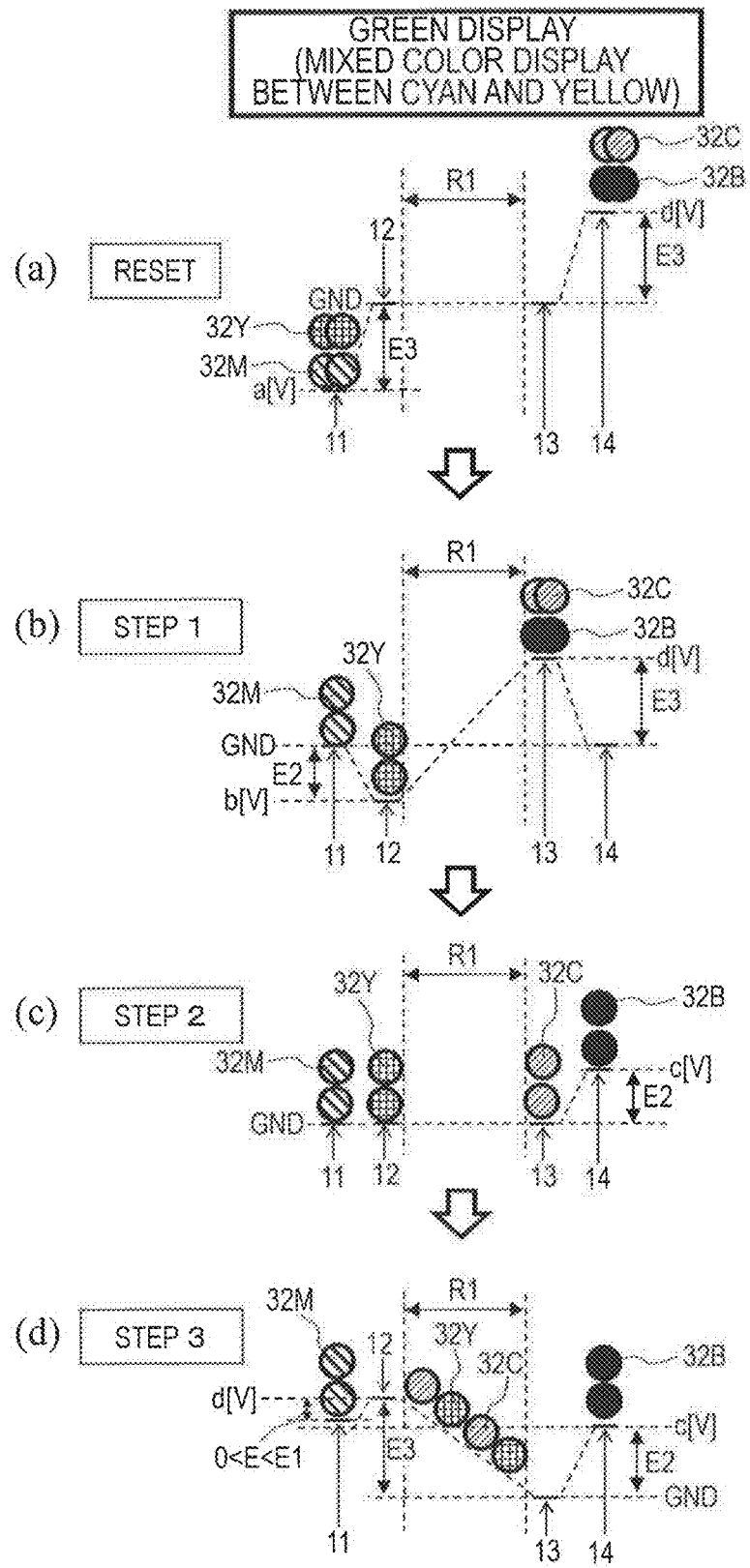
FIG. 45 (a) to (d) are diagrams illustrating a display sequence for green display.

FIGS. 45(*a*) to 45(*d*) are diagrams illustrating a display sequence for green display (i.e., mixed color display between cyan and yellow). First, as shown in FIG. 45(*a*), the same potentials as those in the white display state are applied to the first electrode 11, the second electrode 12, the third electrode 13 and the fourth electrode 14, thus resetting display.

Next, as shown in FIG. 45(*b*), the potentials of the first electrode 11 and the fourth electrode 14 are set to the ground potential GND, the potential of the second electrode 12 is set to b [V], and the potential of the third electrode 13 is set to d [V] (step 1). At this point, a potential gradient corresponding to the electric field intensity E2 is formed between the first electrode 11 and the second electrode 12 and a potential gradient corresponding to the electric field intensity E3 is formed between the third electrode 13 and the fourth electrode 14. Therefore, the yellow particles 32Y move from over the first electrode 11 to over the second electrode 12, and the cyan particles 32C and the black particles 32B move from over the fourth electrode 14 to over the third electrode 13 (the magenta particles 32M remain over the first electrode 11).

Next, as shown in FIG. 45(*c*), the potentials of the second electrode 12 and the third electrode 13 are set to the ground potential GND, and the potential of the fourth electrode 14 is set to c [V] (step 2). At this point, since a potential gradient corresponding to the electric field intensity E2 is formed between the third electrode 13 and the fourth electrode 14, the black particles 32B move from over the third electrode 13 to over the fourth electrode 14 (the cyan particles 32C remain over the third electrode 13).

Then, as shown in FIG. 45(*d*), the potential of the second electrode 11 is set to d [V] (step 3). At this point, since a potential gradient corresponding to the electric field intensity E3 is formed between the second electrode 12 and the third electrode 13 (i.e., in the opening region R1), the yellow particles 32Y move from over the second electrode 12 to the opening region R1 and the cyan particles 32C move from over the third electrode 13 to the opening region R1. Therefore, in this state, green display is produced by subtractive color mixing between cyan and yellow. Note that at this point, the potential of the first electrode 11 is set to such a potential that a potential gradient corresponding to the electric field intensity E lower than the electric field intensity E1 (E that satisfies the relationship 0<E<E1) is formed between the first electrode 11 and the second electrode 12. Thus, the yellow particles 32Y do not move to over the first electrode 11, and it is possible to prevent the magenta particles 32M from moving to over the second electrode 12.

[Blue Display]

Figure 46:
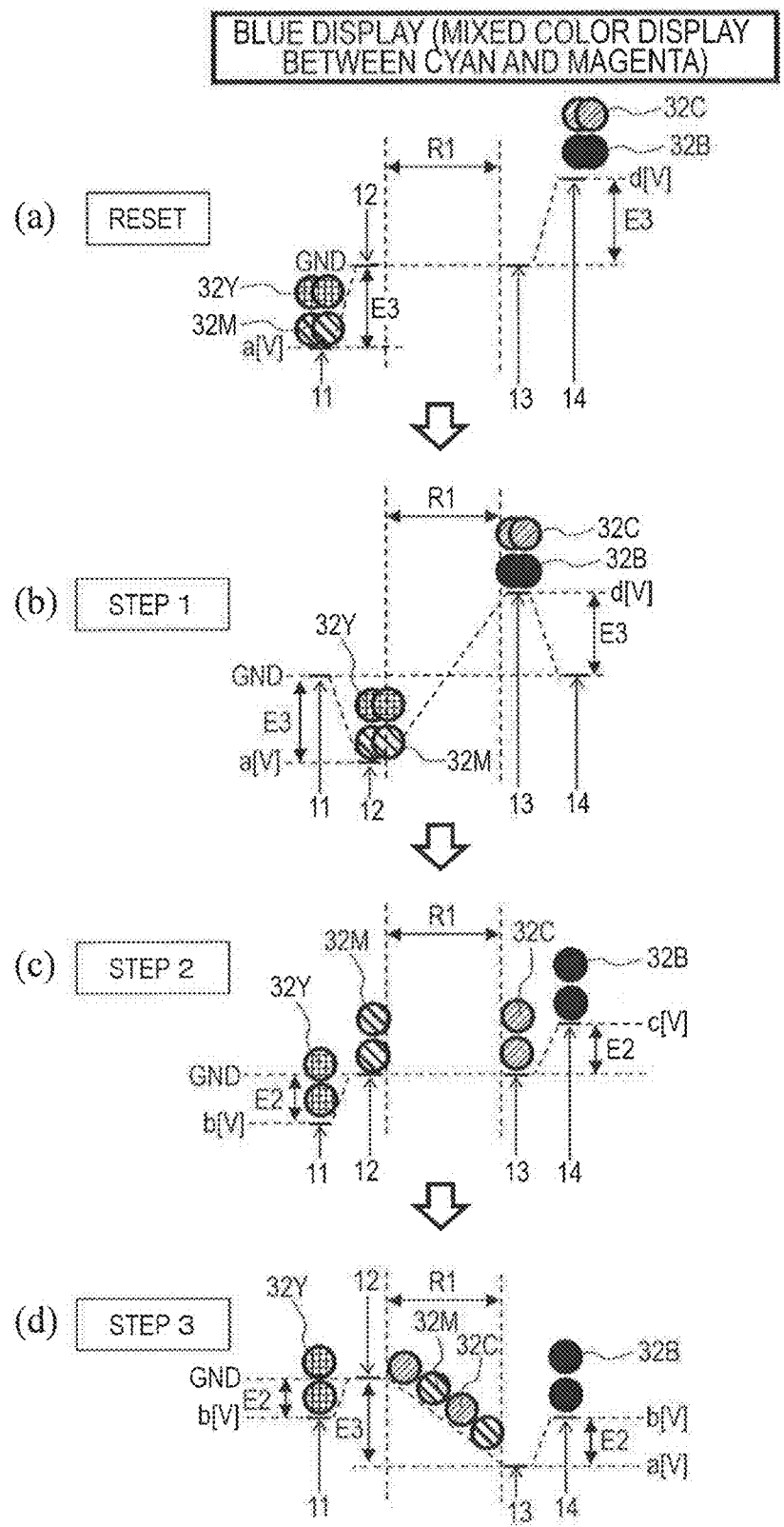
FIG. 46 (a) to (d) are diagrams illustrating a display sequence for blue display.

FIGS. 46(a) to 46(d) are diagrams illustrating a display sequence for blue display (i.e., mixed color display between cyan and magenta). First, as shown in FIG. 46(a), the same potentials as those in the white display state are applied to the first electrode 11, the second electrode 12, the third electrode 13 and the fourth electrode 14, thus resetting display.

Next, as shown in FIG. 46(b), the potentials of the first electrode 11 and the fourth electrode 14 are set to the ground potential GND, the potential of the second electrode 12 is set to a [V], and the potential of the third electrode 13 is set to d [V] (step 1). At this point, a potential gradient corresponding to the electric field intensity E3 is formed between the first electrode 11 and she second electrode 12 and a potential gradient corresponding to the electric field intensity E3 is formed between the third electrode 13 and the fourth electrode 14. Therefore, the magenta particles 32M and the yellow particles 32Y move from over the first electrode 11 to over the second electrode 12, and the cyan particles 32C and the black particles 32B move from over the fourth electrode 14 to over the third electrode 13.

Next, as shown in FIG. 46(c), the potential of the first electrode 11 is set to b [V], the potentials of the second electrode 12 and the third electrode 13 are set to the ground potential GND, and the potential of the fourth electrode 14 is set to c [V] (step 2). At this point, a potential gradient corresponding to the electric field intensity E2 is formed between the first electrode 11 and the second electrode 12 and a potential gradient corresponding to the electric field intensity E2 is formed between the third electrode 13 and the fourth electrode 14. Therefore, the yellow particles 32Y move from over the second electrode 12 to over the first electrode 11, and the black particles 32B move from over the third electrode 13 to over the fourth electrode 14 (the magenta particles 32M remain over the second electrode 12 and the cyan particles 32C remain over the third electrode 13).

Then, as shown in FIG. 46(d), the potential of the third electrode 13 is set to a [V], and the potential of the fourth electrode 14 is set to b [V] (step 3). At this point, since a potential gradient corresponding to the electric field intensity E3 is formed between the second electrode 12 and the third electrode 13 (i.e., in the opening region R1), the magenta particles 32M move from over the second electrode 12 to the opening region R1 and the cyan particles 32C move from over the third electrode to the opening region R1. Therefore, in this state, blue display is produced subtractive color mixing between cyan and magenta.

[Red Display]

Figure 47:
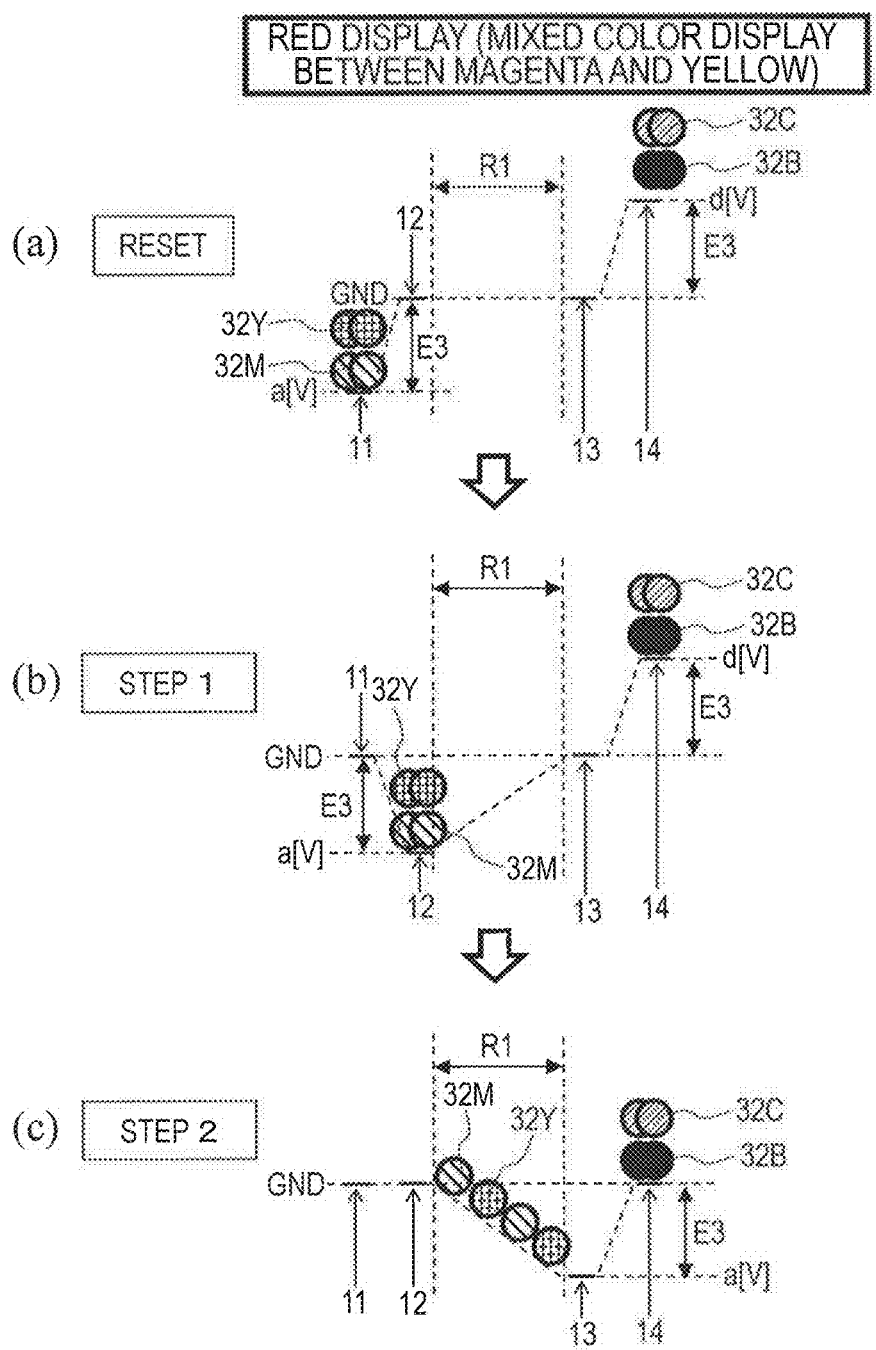
FIG. 47 (a) to (c) are diagrams illustrating a display sequence for red display.

FIGS. 47(a) to 47(c) are diagrams illustrating a display sequence for red display (i.e., mixed color display between magenta and yellow). First, as shown in FIG. 47(a), the same potentials as those in the white display state are applied to the first electrode 11, the second electrode 12, the third electrode 13 and the fourth electrode 14, thus resetting display.

Next, as shown in FIG. 47(b), the potential of the first electrode 11 is set to the ground potential GND, and the potential of the second electrode 12 is set to a [V] (step 1). At this point, since a potential gradient corresponding to the electric field intensity E1 is formed between the first electrode 11 and the second electrode 12, the magenta particles 32M and the yellow particles 32Y move from over the first electrode 11 to over the second electrode 12.

Then, as shown in FIG. 47(c), the potentials of the second electrode 12 and the fourth electrode 14 are set to the ground GND, and the potential of the third electrode 13 is set to a [V] (step 2). At this point, since a potential gradient corresponding to the electric field intensity E3 is formed between the second electrode 12 and the third electrode 13 (i.e., in the opening region R1), the magenta particles 32M and the yellow particles 32Y move from over the second electrode 12 to the opening region R1. Therefore, in this state, red display is produced by subtractive color mixing between magenta and yellow.

As described above, with the electrophoretic element 300 of the present embodiment, by controlling the potentials of the plurality of electrodes 11, 12, 13 and 14 of the first substrate 10, it is possible to locate any one or more of the plurality of types of electrophoretic particles 32 in the opening region R1. Therefore, it is possible to produce display in which only one type of electrophoretic particles 32 is positioned in the opening region R1 (herein, black display, cyan display, magenta display and yellow display), and it is possible to produce display in which none of the types of electrophoretic particles 32 is positioned in opening region R1 (herein, white display). Moreover, with the electrophoretic element 300 of the present embodiment, it is also possible to produce display in which two or more of the plurality of types of electrophoretic particles 32 are positioned in the opening region R1 (e.g., green display, blue display and red display illustrated above). Thus, it is possible to realize subtractive color mixing (superposition of colors) within a pixel Px, rather than juxtapositional color mixing (i.e., mixing or colors between pixels Px). Moreover, by controlling the potential difference and/or the output time between the second electrode 12 and the third electrode 13, it is possible to adjust the amount of the electrophoretic particles 32 to move to the opening region R1, thus realizing gray level display. Moreover, gray level display can be produced preferably by employing a display sequence as described below.

[Gray Level Display]

Figure 48:
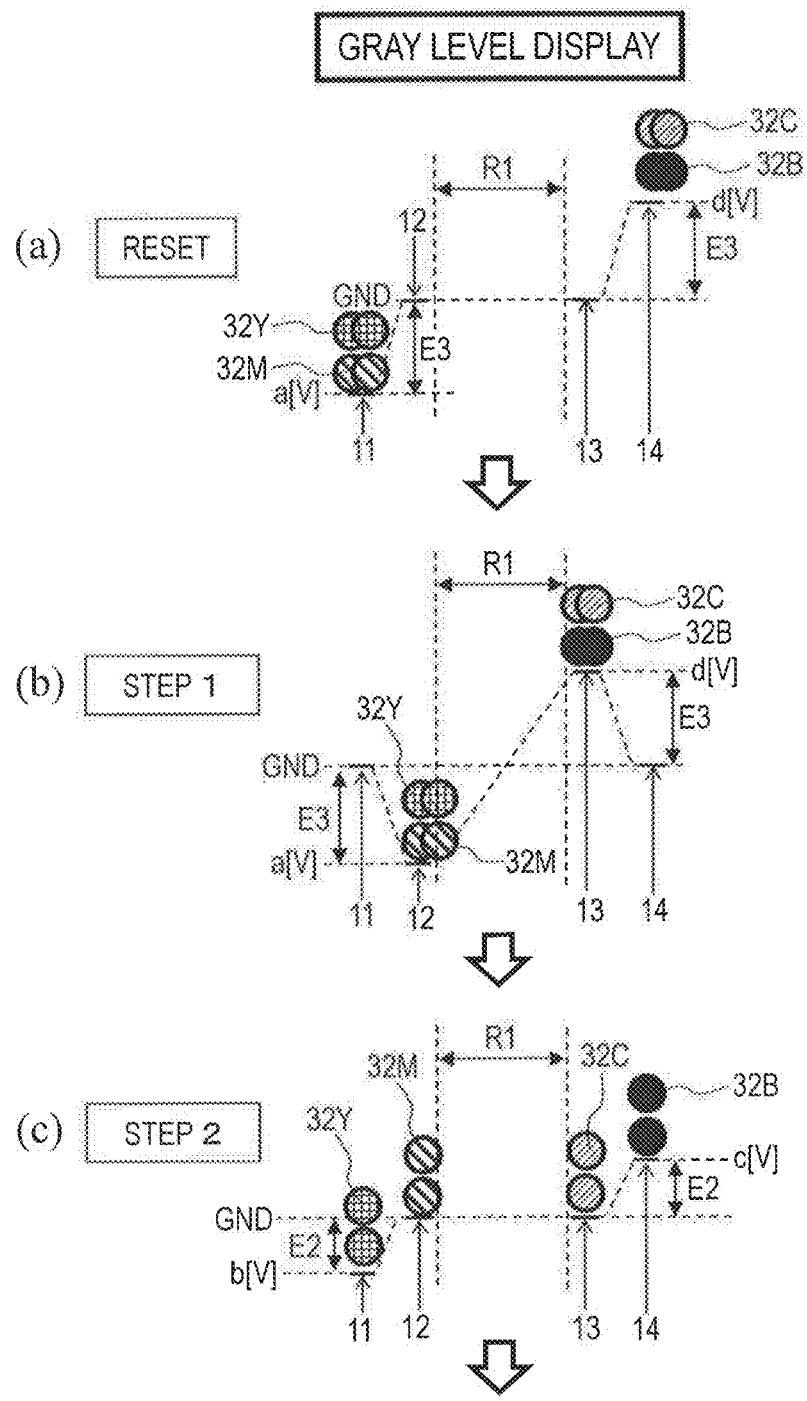
FIG. 48 (a) to (c) are diagrams illustrating a display sequence for gray level display.
Figure 49:
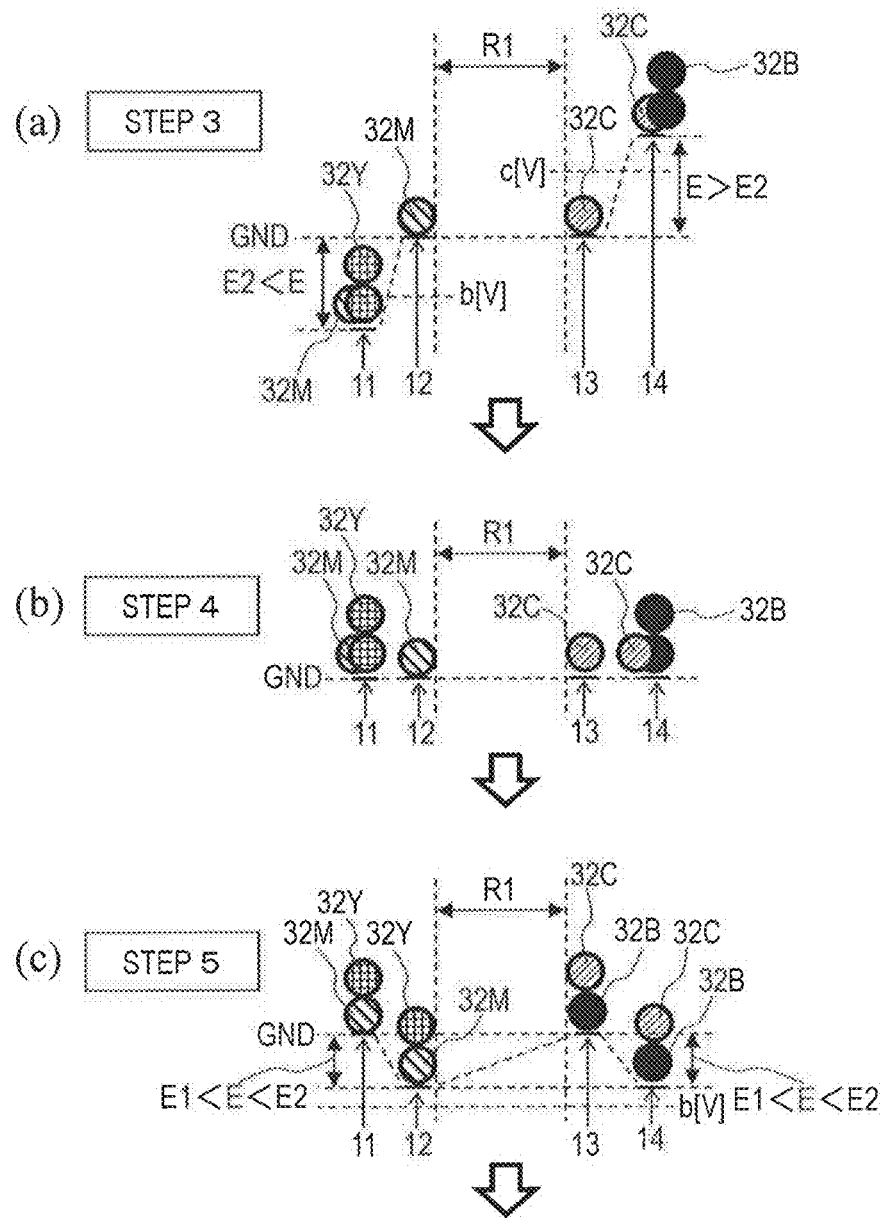
FIG. 49 (a) to (c) are diagrams illustrating a display sequence for gray level display.
Figure 50:
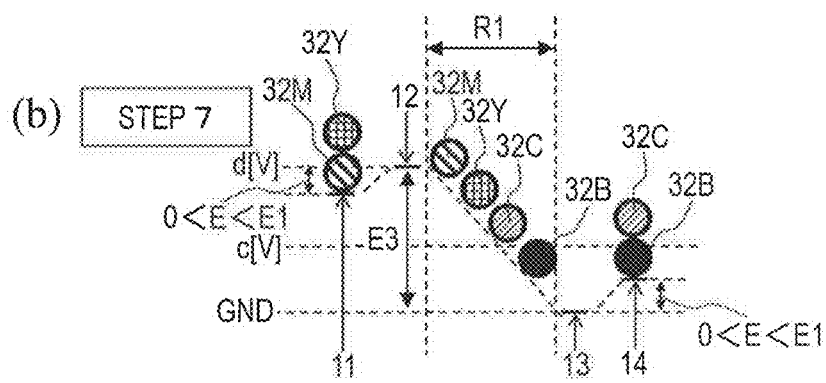
FIGS. 50 (a) and (b) are diagrams illustrating a display sequence for gray level display.

Herein, referring to FIG. 48 to FIG. 50, an example in which an appropriate amount of each of the cyan particles 32C, the magenta particles 32M, the yellow particles 32Y and the black particles 32B is moved to the opening region R1 will be described.

FIGS. 48(a) to 48(c), FIGS. 49(a) to 49(c) and FIGS. 50(a) and 50(b) are diagrams illustrating a display sequence for gray level display. First, as shown in FIG. 48(a), the same potentials as those in the white display state are applied to the first electrode 11, the second electrode 12, the third electrode 13 and the fourth electrode 14, thus resetting display.

Next, as shown in FIG. 48(b), the potentials of the first electrode 11 and the fourth electrode 14 are set to the ground potential GND, the potential of the second electrode 12 is set to a [V], and the potential of the third electrode 13 is set to d [V] (step 1). At this point, a potential gradient corresponding to the electric field intensity E3 is formed between the first electrode 11 and the second electrode 12 and a potential gradient corresponding to the electric field intensity E3 is formed between the third electrode 13 and the fourth electrode 14. Therefore, the magenta particles 32M and the yellow particles 32Y move from over the first electrode 11 to over the second electrode 12, the cyan particles 32C and the black particles 32B move from over the fourth electrode 14 to over the third electrode 13.

Next, as shown in FIG. 48(c), the potential of the first electrode 11 is set to b [V], the potentials of the second electrode 12 and the third electrode 13 are set to the ground potential GND, and the potential of the fourth electrode 14 is set to c [V] (step 2). At this point, a potential gradient corresponding to the electric field intensity E2 is formed between the first electrode 11 and second electrode 12 and a potential gradient corresponding to the electric field intensity E2 is formed between the third electrode 13 and the fourth electrode 14. Therefore, the yellow particles 32Y move from over the second electrode 12 to over the first electrode 11, and the black particles 32B move from over the third electrode 13 to over the fourth electrode 14 (the magenta particles 32M remain over the second electrode 12 and the cyan particles 32C remain over the third electrode 13).

Next, as shown in FIG. 49(a), the potential of the first electrode 11 is set to be lower than b [V], and the potential of the fourth electrode 14 is set to be higher than c [V] (step 3). At this point, since a potential gradient corresponding to the electric field intensity E higher than the electric field intensity E2 (E that satisfies the relationship E>E2) is formed between the first electrode 11 and the second electrode 12, the magenta particles 32M start moving from over the second electrode 12 to over the first electrode 11. Moreover, at this point, since a potential gradient corresponding to the electric field intensity E higher than the electric field intensity E2 (E that satisfies the relationship E>E2) is formed also between the third electrode 13 and the fourth electrode 14, the cyan particles 32C start moving from over the third electrode 13 to over the fourth electrode 14.

Next, when the amount of magenta particles 32M over the second electrode 12 and the amount of cyan particles 32C over the third electrode 13 become appropriate, the potentials of the first electrode 11 and the fourth electrode 14 are set to the ground potential GND as shown in FIG. 49(b) (step 4). At this point, since all the electrodes are at the ground potential GND and no potential gradient is formed between the first electrode 11 and the second electrode 12 or between the third electrode 13 and the fourth electrode 14, the magenta particles 32M and the cyan particles 32C stop moving.

Next, as shown in FIG. 49(c), the potentials of the second electrode 12 and the fourth electrode 14 are set to a potential that is lower than the ground potential GND and higher than b [V] (step 5). More specifically, the potential of the second electrode 12 is set to such a potential that a potential gradient corresponding to the electric field intensity E higher than the electric field intensity E1 and lower than the electric field intensity E2 (E that satisfies the relationship E1<E<E2) is formed between the first electrode 11 and the second electrode 12. Thus, the yellow particles 32Y start moving from over the first electrode 11 to over the second electrode 11. More specifically, the potential of the fourth electrode 14 is set to such a potential that a potential gradient corresponding to the electric field intensity E higher than the electric field intensity E1 and lower than the electric field intensity E2 (E that satisfies the relationship E1<E<E2) is formed between the third electrode 13 and the fourth electrode 14. Thus, the black particles 32B start moving from over the fourth electrode 14 to over the third electrode 13.

Next, when the amount of yellow particles 32Y over the second electrode 12 and the amount of black particles 32B over the third electrode 13 become appropriate, the potentials of the second electrode 12 and the fourth electrode 14 are set to the ground potential GND as shown in FIG. 50(a) (step 6). At this point, since all the electrodes are at the ground potential GND and no potential gradient is formed between the first electrode 11 and the second electrode 12 or between the third electrode 13 and the fourth electrode 14, the yellow particles 32Y and the black particles 32B stop moving.

Then, as shown in FIG. 50(b), the potential of the second electrode 12 is set to d [V] (step 7). At this point, since a potential gradient corresponding to the electric field intensity E3 is formed between the second electrode 12 and the third electrode 13 (i.e., in the opening region R1), the magenta particles 32M and the yellow particles 32Y move from over the second electrode 12 to the opening region R1 and the cyan particles 32C and the black particles 32B move from over the third electrode 13 to the opening region R1. Therefore, in this state, gray level display is produced with respectively appropriate amounts of cyan particles 32C, magenta particles 32M, yellow particles 32Y and black particles 32B. Note that at this point, the potential of the first electrode 11 is set to such a potential that a potential gradient corresponding to the electric field intensity E lower than the electric field intensity E1 (E that satisfies the relationship 0<E<E1) is formed between the first electrode 11 and the second electrode 12. Thus, it is possible to prevent the magenta particles 32M and the yellow particles 32Y from moving from over the first electrode 11 to over the second electrode 12, and prevent the yellow particles 32Y from moving from over the second electrode 12 to the first electrode 11. At this point, the potential of the fourth electrode 14 is set to such a potential that a potential gradient corresponding to the electric field intensity E lower than the electric field intensity E1 (E that satisfies the relationship 0<E<E1) is formed between the third electrode 13 and the fourth electrode 14. Thus, it is possible to prevent the cyan particles 32C and the black particles 32B from moving from over the fourth electrode 14 to over the third electrode 13, and prevent the black particles 32B from moving from over the third electrode 14 to the fourth electrode 14.

As described above, the electrophoretic element 300 of the present embodiment is also capable of subtractive color mixing (superposition of colors) within one pixel Px. With the electrophoretic element 100 of Embodiment 1, there are three types of electrophoretic particles 32 of the same polarity (the cyan particles 32C, the magenta particles 32M and the yellow particles 32Y which are positively charged), meaning that there are three levels of threshold voltage of the same polarity. In contrast, with the electrophoretic element 300 of the present embodiment, there are only two types of electrophoretic particles 32 of the same polarity (the cyan particles 32C and the black particles 32B which are positively charged, and the magenta particles 32M and the yellow particles 32Y which are negatively charged), and there are two levels of threshold voltage of the same polarity. This makes easy the material design of the electrophoretic particles 32, as compared with the electrophoretic element 100 of Embodiment 1.

Note that the present embodiment illustrates a configuration in which the cyan particles 32C and the black particles 32B are charged with the same polarity while the magenta particles 32M and the yellow particles 32Y are charged with a different polarity from the cyan particles 32C and the black particles 32B. However, the grouping of the electrophoretic particles 32 based on the polarity with which they are charged is not limited to this. One may employ a configuration in which the magenta particles 32M and the black particles 32B are charged with the same polarity while the cyan particles 32C and the yellow particles 32Y are charged with a different polarity from the magenta particles 32M and the black particles 32B, or may employ a configuration in which the yellow particles 32Y and the black particles 32B are charged with the same polarity while the cyan particles 32C and the magenta particles 32M are charged with a different polarity from the yellow particles 32Y and the black particles 32B.

Embodiment 14

Figure 51:
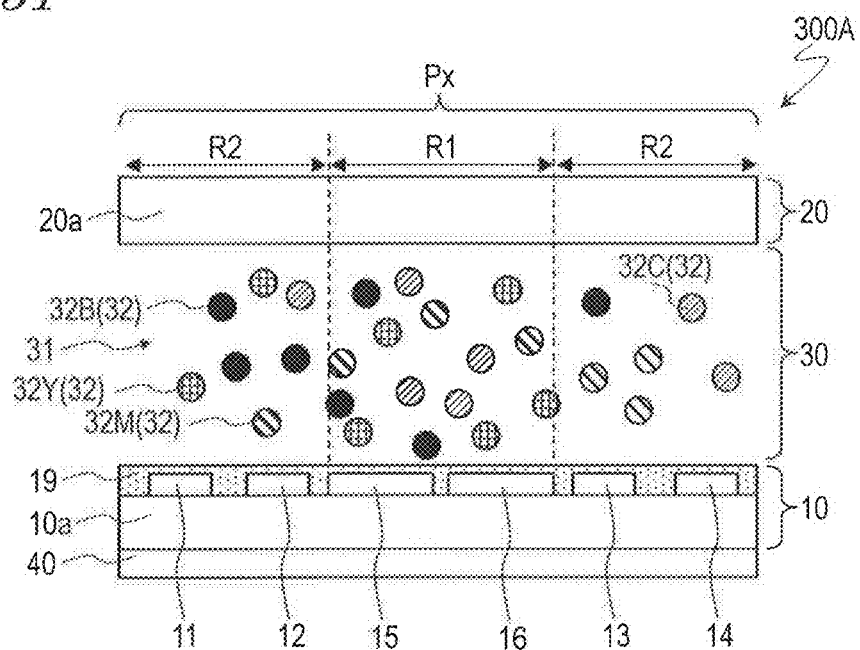
FIG. 51 A cross-sectional view schematically showing an electrophoretic element (display device) 300A according to an embodiment of the present invention.

FIG. 51 shows an electrophoretic element (display device) 300A of the present embodiment. FIG. 51 is a cross-sectional view schematically showing one pixel Px of the electrophoretic element 300A.

The electrophoretic element 300A is different from the electrophoretic element 300 of Embodiment 13 in that the first substrate 10 further includes two electrodes (the fifth electrode and the sixth electrode) 15 and 16 provided in the opening region R1 as shown in FIG. 51.

A potential different from the first electrode 11, the second electrode 12, the third electrode 13 and the fourth electrode 14 can be applied to each of the fifth electrode 15 and the sixth electrode 16. The fifth electrode 15 and the sixth electrode 16 are formed from a transparent conductive material (e.g., ITO). The first electrode 11, the second electrode 12, the fifth electrode 15, the sixth electrode 16, the third electrode 13 and the fourth electrode 14 are placed in this order along a certain direction (the direction from the left side toward the right side in FIG. 51) that is parallel to the substrate surface of the first substrate 10.

With the electrophoretic element 300A of the present embodiment, by controlling the potential of the fifth electrode 15 and the sixth electrode 16, as well as the first electrode 11, the second electrode 12, the potential of the third electrode 13 and the fourth electrode 14, it is possible to locate two or more of the plurality of types of electrophoretic particles 32 in the opening region R1.

With the electrophoretic element 300A, with the provision of the fifth electrode 15 and the sixth electrode 16 in the opening region R1, it is possible to more uniformly locate the electrophoretic particles 32 over the fifth electrode 15 and the sixth electrode 16, i.e., in the opening region R1, by means of the electric field formed by the fifth electrode 15 and the sixth electrode 16 or an image force. The electrophoretic layer 30 includes electrophoretic particles 32 that are charged with different polarities from each other, but with the provision of two electrodes (the fifth electrode 15 and the sixth electrode 16) in the opening region R1, it is possible to locate the electrophoretic particles 32 of the positive polarity over one of the electrodes and locate the electrophoretic particles 32 of the negative polarity over the other electrode by utilizing the potential gradient formed between the two electrodes.

Display sequences for the electrophoretic element 300A of the present embodiment will now be described.

First, a display sequence for white display and a display sequence for black display will be described.

[White Display (Reset)]

Figure 52:
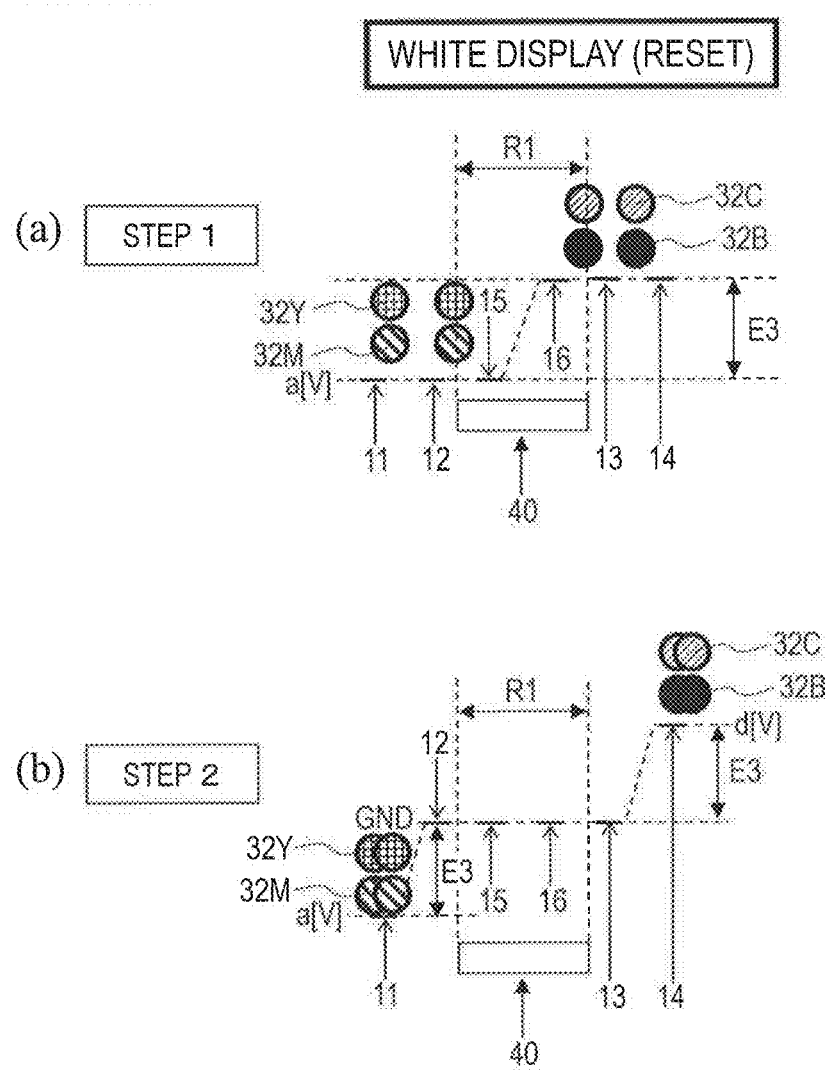
FIGS. 52 (a) and (b) are diagrams illustrating a display sequence for white display.

FIGS. 52(a) and 52(b) are diagrams illustrating a display sequence for white display. First, as shown in FIG. 52(a), the potentials of the first electrode 11, the second electrode 12 and the fifth electrode 15 are set to a [V], and the potentials of the third electrode 13, the fourth electrode 14 and the sixth electrode 16 are set to the ground potential GND (step 1). At this point, since a potential gradient corresponding to the electric field intensity E3 is formed between the fifth electrode 15 and the sixth electrode 16, the magenta particles 32M and the yellow particles 32Y are positioned over the first electrode 11, the second electrode 12 and the fifth electrode 15 and the cyan particles 32C and the black particles 32B are positioned over the third electrode 13, the fourth electrode 14 and the sixth electrode 16.

Next, as shown in FIG. 52(b), the potentials of the second electrode 12 and the fifth electrode 15 are set to the ground potential GND, and the potential of the fourth electrode 14 is set to d [V] (step 2). At this point, since a potential gradient corresponding to the electric field intensity E3 is formed between the first electrode 11 and the second electrode 12 and a potential gradient corresponding to the electric field intensity E3 is formed between the third electrode 13 and the fourth electrode 14, the magenta particles 32M and the yellow particles 32Y move from over the second electrode 12 and the fifth electrode 15 to over the first electrode 11, and the cyan particles 32C and the black particles 32B move from over the third electrode 13 and the sixth electrode 16 to over the fourth electrode 14. In this state, since the electrophoretic particles 32 are absent in the opening region R1, the external light (ambient light) entering the electrophoretic layer 30 from the observer side is reflected by the light-reflecting layer 40, thereby producing white display.

With the electrophoretic element 300A, switching from one color to another is basically done via this white display state. Therefore, white display can also be said to be a reset operation.

[Black Display]

Figure 53:
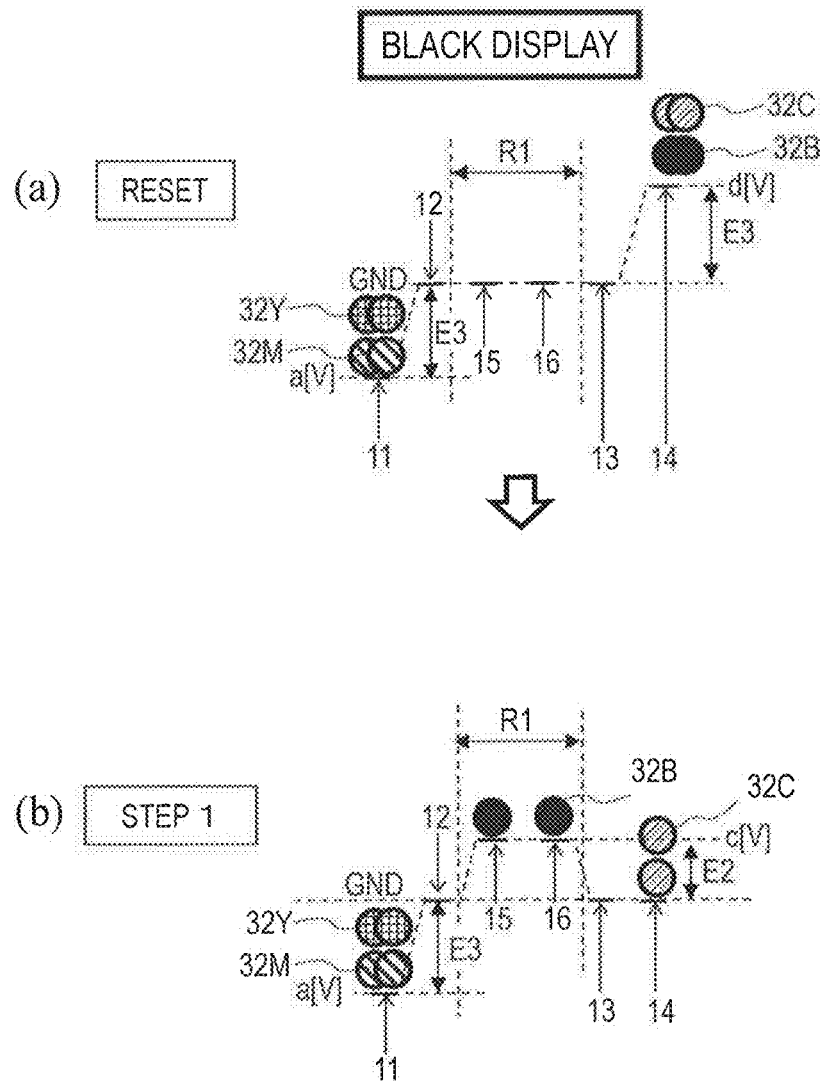
FIGS. 53 (a) and (b) are diagrams illustrating a display sequence for black display.

FIGS. 53(a) and 53(b) are diagrams illustrating a display sequence for black display. First, as shown in FIG. 53(a), the same potentials as those in the white display state are applied to the first electrode 11, the second electrode 12, the third electrode 13, the fourth electrode 14, the fifth electrode 15 and the sixth electrode 16, thus resetting display.

Then, as shown in FIG. 53(b), the potential of the fourth electrode 14 is set the ground potential GND, and the potentials of the fifth electrode 15 and the sixth electrode 16 are set to c [V] (step 1). At this point, since a potential gradient corresponding to the electric intensity E2 is formed between the sixth electrode 16 and the third electrode 13 (and between the second electrode 12 and the fifth electrode 15), the black particles 32B move from over the fourth electrode 14 to the opening region R1 (over the fifth electrode 15 and the sixth electrode 16). Therefore, in this state, black display is produced.

Next, display sequences for single-color display of cyan, magenta and yellow will be described.

[Cyan Display]

Figure 54:
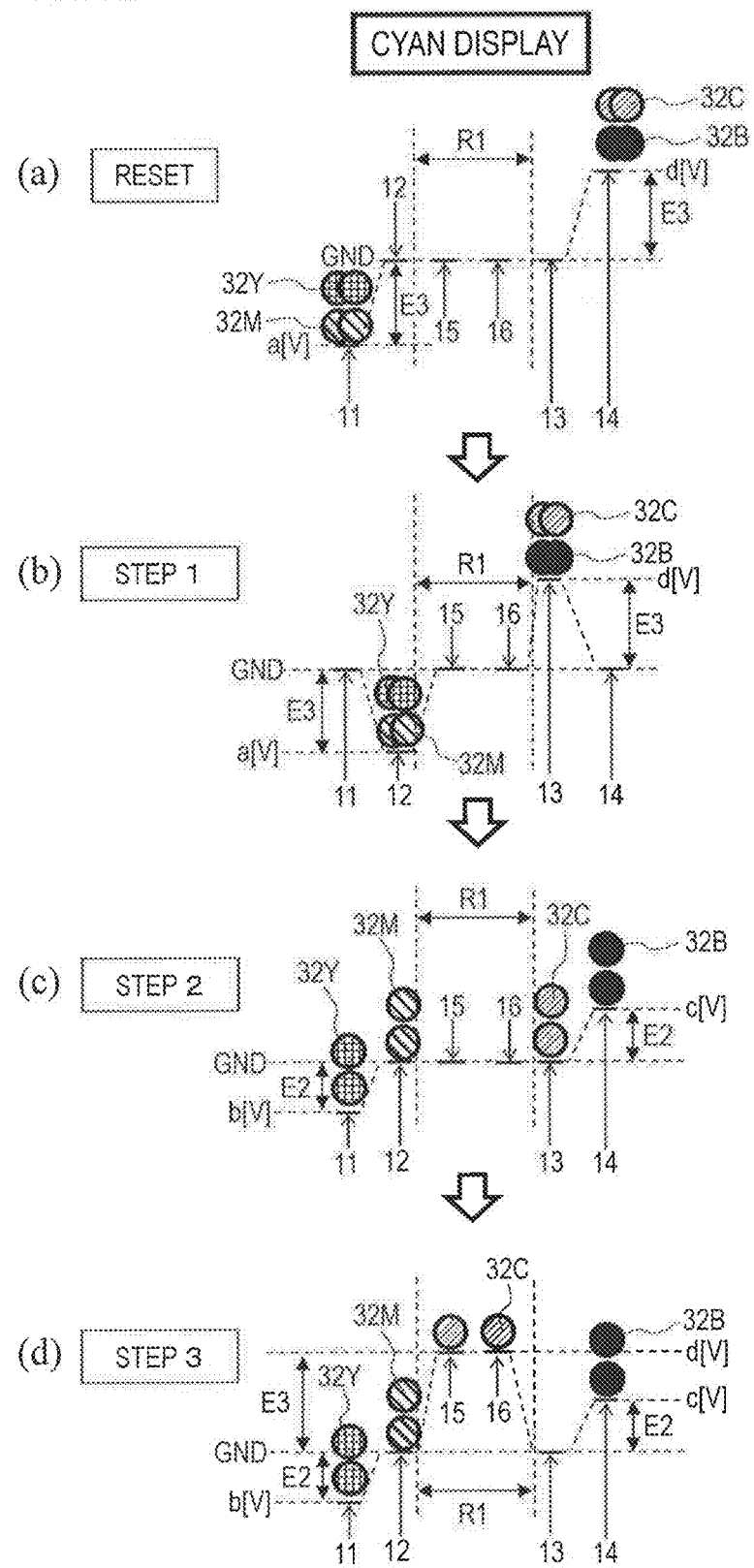
FIG. 54 (a) to (d) are diagrams illustrating a display sequence for cyan display.

FIGS. 54(a) to 54(d) are diagrams illustrating a display sequence for cyan display. First, as shown in FIG. 54(a), the same potentials as those in the white display state are applied to the first electrode 11, the second electrode 12, the third electrode 13, the fourth electrode 14, the fifth electrode 15 and the sixth electrode 16, thus resetting display.

Next, as shown in FIG. 54(b), the potentials of the first electrode 11 and the fourth electrode 14 are set to the ground potential GND, the potential of the second electrode 12 is set to a [V], and the potential of the third electrode 13 is set to d [V] (step 1). At this point, a potential gradient corresponding to the electric field intensity E3 is formed between the first electrode 11 and the second electrode 12 and a potential gradient corresponding to the electric field intensity E3 is formed between the third electrode 13 and the fourth electrode 14. Therefore, the magenta particles 32M and the yellow particles 32Y move from over the first electrode 11 to over the second electrode 12, and the cyan particles 32C and the black particles 32B move from over the fourth electrode 14 to over the third electrode 13.

Next, as shown in FIG. 54(c), the potential of the first electrode 11 is set to b [V], the potentials of the second electrode 12 and the third electrode 13 are set to the ground potential GND, and the potential of the fourth electrode 14 is set to c [V] (step 2). At this point, a potential gradient corresponding to the electric field intensity E2 is formed between the first electrode 11 and second electrode 12 and a potential gradient corresponding to the electric field intensity E2 is formed between the third electrode 13 and the fourth electrode 14. Therefore, the yellow particles 32Y move from over the second electrode 12 to over the first electrode 11, and the black particles 32B move from over the third electrode 13 to over the fourth electrode 14 (the magenta particles 32M remain over the second electrode 12 and the cyan particles 32C remain over the third electrode 13).

Then, as shown in FIG. 54(d), the potentials of the fifth electrode 15 and the sixth electrode 16 are set to d [V] (step 3). At this point, since a potential gradient corresponding to the electric field intensity E3 is formed between the second electrode 12 and the fifth electrode 15 and between the sixth electrode 16 and the third electrode 13, the cyan particles 32C move from over the third electrode 13 to the opening region R1 (over the fifth electrode 15 and the sixth electrode 16). Therefore, in this state, cyan display is produced.

[Magenta Display]

Figure 55:
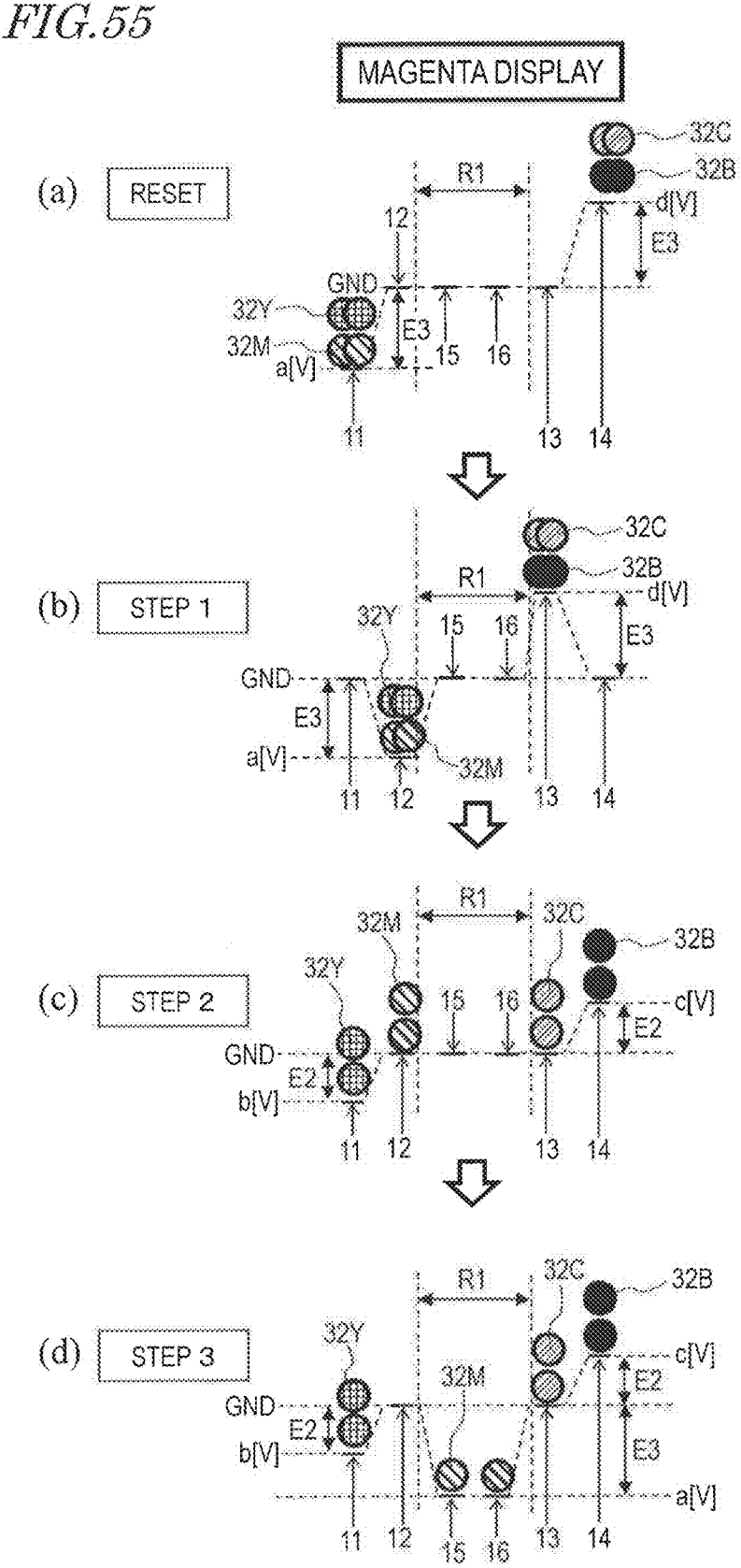
FIG. 55 (a) to (d) are diagrams illustrating a display sequence for magenta display.

FIGS. 55(a) to 55(d) are diagrams illustrating a display sequence for magenta display. First, as shown in FIG. 55(a), the same potentials as those in the white display state are applied to the first electrode 11, the second electrode 12, the third electrode 13, the fourth electrode 14, the fifth electrode 15 and the sixth electrode 16, thus resetting display.

Next, as shown in FIG. 55(b), the potentials of the first electrode 11 and the fourth electrode 14 are set to the ground potential GND, the potential of the second electrode 12 is set to a [V], and the potential of the third electrode 13 is set to d [V] (step 1). At this point, a potential gradient corresponding to the electric field intensity E3 is formed between the first electrode 11 and the second electrode 12 and a potential gradient corresponding to the electric field intensity E3 is formed between the third electrode 13 and the fourth electrode 14. Therefore, the magenta particles 32M and the yellow particles 32Y move from over the first electrode 11 to over the second electrode 12, and the cyan particles 32C and the black particles 32B move from over the fourth electrode 14 to over the third electrode 13.

Next, as shown in FIG. 55(c), the potential of the first electrode 11 is set to b [V], the potentials of the second electrode 12 and the third electrode 13 are set to the ground potential GND, and the potential of the fourth electrode 14 is set to c [V] (step 2). At this point, a potential gradient corresponding to the electric field intensity E2 is formed between the first electrode 11 and the second electrode 12 and a potential gradient corresponding to the electric field intensity E2 is formed between the third electrode 13 and the fourth electrode 14. Therefore, the yellow particles 32Y move from over the second electrode 12 to over the first electrode 11, and the black particles 32B move from over the third electrode 13 to over the fourth electrode 14 (the magenta particles 32M remain over the second electrode 12 and the cyan particles 32C remain over the third electrode 13).

Then, as shown in FIG. 55(d), the potentials of the fifth electrode 15 and the sixth electrode 16 are set to a [V] (step 3). At this point, since a potential gradient corresponding to the electric field intensity E3 is formed between the second electrode 12 and the fifth electrode 15 and between the sixth electrode 16 and the third electrode 13, the magenta particles 32M move from over the second electrode 12 to the opening region R1 (over the fifth electrode 15 and the sixth electrode 16). Therefore, in this state, magenta display is produced.

Figure 56:
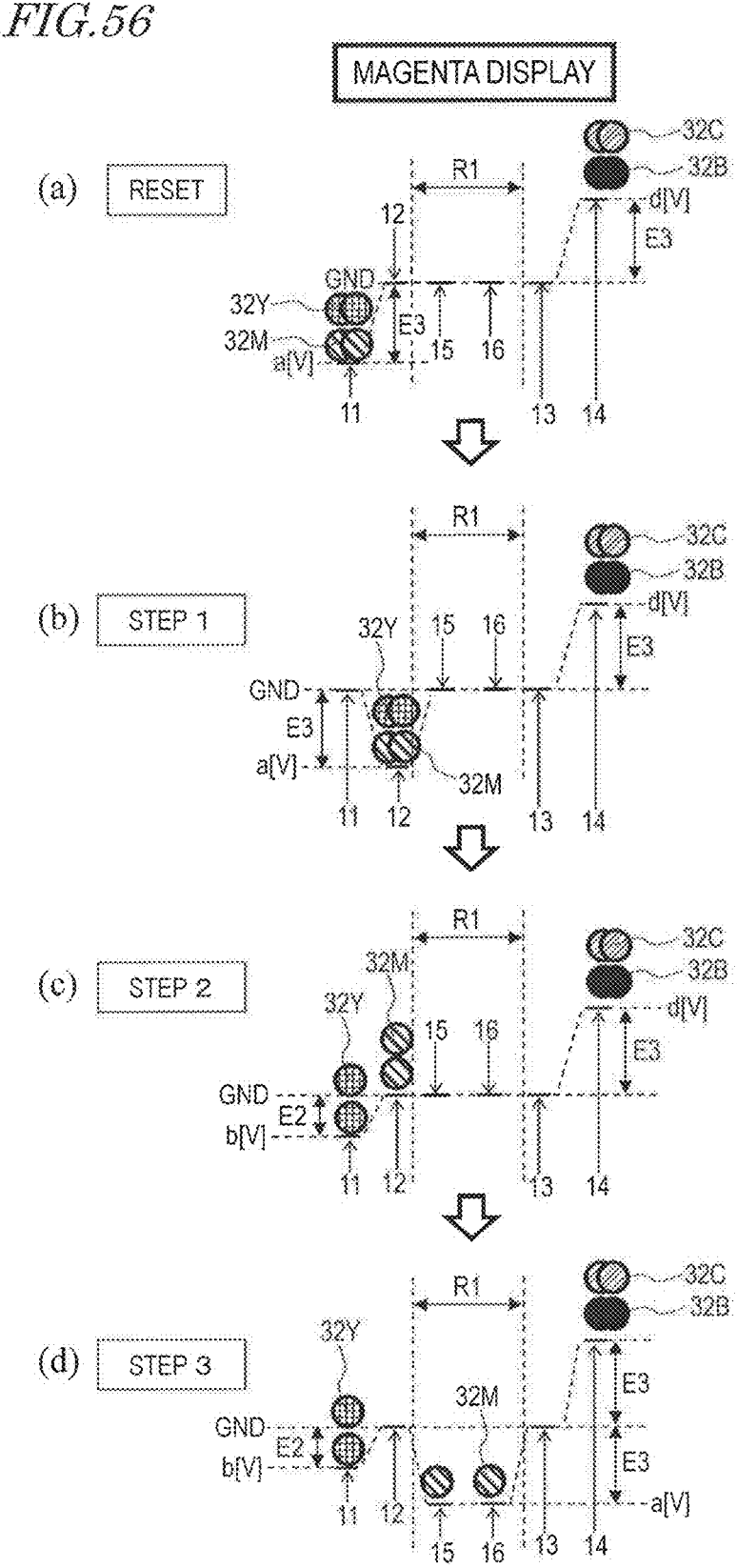
FIG. 56 (a) to (d) are diagrams illustrating a display sequence for magenta display.

FIGS. 56(a) to 56(d) are diagrams illustrating another example of a display sequence for magenta display. First, as shown in FIG. 56(a), the same potentials as those in the white display state are applied to the first electrode 11, the second electrode 12, the third electrode 13, the fourth electrode 14, the fifth electrode 15 and the sixth electrode 16, thus resetting display.

Next, as shown in FIG. 56(b), the potential of the first electrode 11 is set to the ground potential GND, and the potential of the second electrode 12 is set to a [V] (step 1). At this point, a potential gradient corresponding to the electric field intensity E3 is formed between the first electrode 11 and the second electrode 12. Therefore, the magenta particles 32M and the yellow particles 32Y move from over the first electrode 11 to over the second electrode 12.

Next, as shown in FIG. 56(c), the potential of the first electrode 11 is set to b [V], and the potential of the second electrode 12 is set to the ground potential GND (step 2). At this point, a potential gradient corresponding to the electric field intensity E2 is formed between the first electrode 11 and the second electrode 12. Therefore, the yellow particles 32Y move from over the second electrode 12 to over the first electrode 11 (the magenta particles 32M remain over the second electrode 12).

Then, as shown in FIG. 56(d), the potentials of the fifth electrode 15 and the sixth electrode 16 are set to a [V] (step 3). At this point, since a potential gradient corresponding to the electric field intensity E3 is formed between the second electrode 12 and the fifth electrode 15 and between the sixth electrode 16 and the third electrode 13, the magenta particles 32M move from over the second electrode 12 to the opening region R1 (over the fifth electrode 15 and the sixth electrode 16). Therefore, in this state, magenta display is produced.

[Yellow Display]

Figure 57:
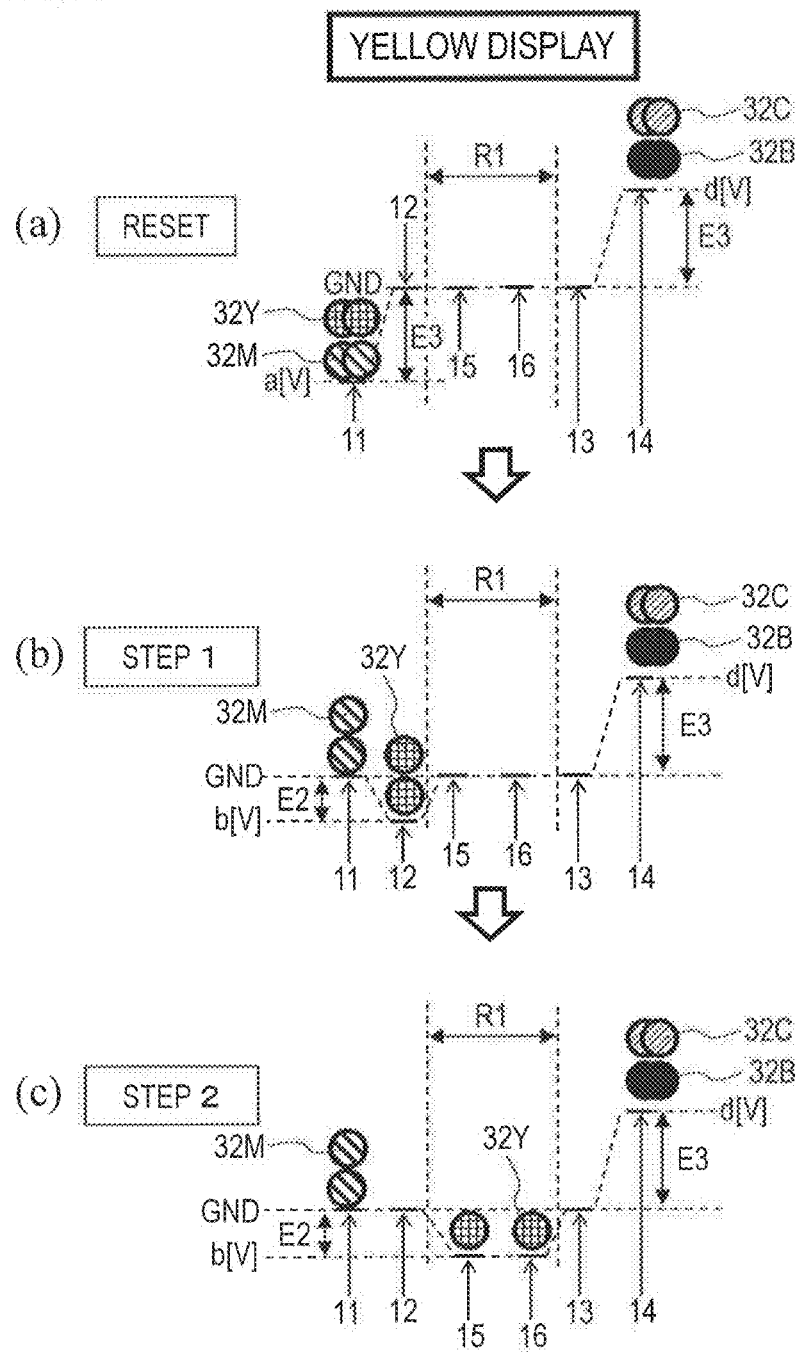
FIG. 57 (a) to (c) are diagrams illustrating a display sequence for yellow display.

FIGS. 57(a) to 57(c) are diagrams illustrating a sequence for yellow display. First, as shown in FIG. 57(a), the same potentials as those in the white display state are applied to the first electrode 11, the second electrode 12, the third electrode 13, the fourth electrode 14, the fifth electrode 15 and the sixth electrode 16, thus resetting display.

Next, as shown in FIG. 57(b), the potential of the first electrode 11 is set to the ground potential GND, and the potential of the second electrode 12 is set to b [V] (step 1). At this point, since a potential gradient corresponding to the electric field intensity E2 is formed between the first electrode 11 and the second electrode 12, the yellow particles 32Y move from over the first electrode 11 to over the second electrode 12 (the magenta particles 32M remain over the first electrode 11).

Next, as shown in FIG. 57(c), the potential of the second electrode 12 is set to the ground potential GND, and the potentials of the fifth electrode 15 and the sixth electrode 16 are set to b [V] step 2). At this point, since a potential gradient corresponding to the electric field intensity E2 is formed between the second electrode 12 and the fifth electrode 15 and between the sixth electrode 16 and the third electrode 13, the yellow particles 32Y move from over the second electrode 12 to the opening region R1 (over the fifth electrode 15 and the sixth electrode 16). Therefore, in this state, yellow display is produced.

Next, display sequences for green display (mixed color display between cyan and yellow), blue display (mixed color display between cyan and magenta) and red display (mixed color display between magenta and yellow) will be described.

[Green Display]

Figure 58:
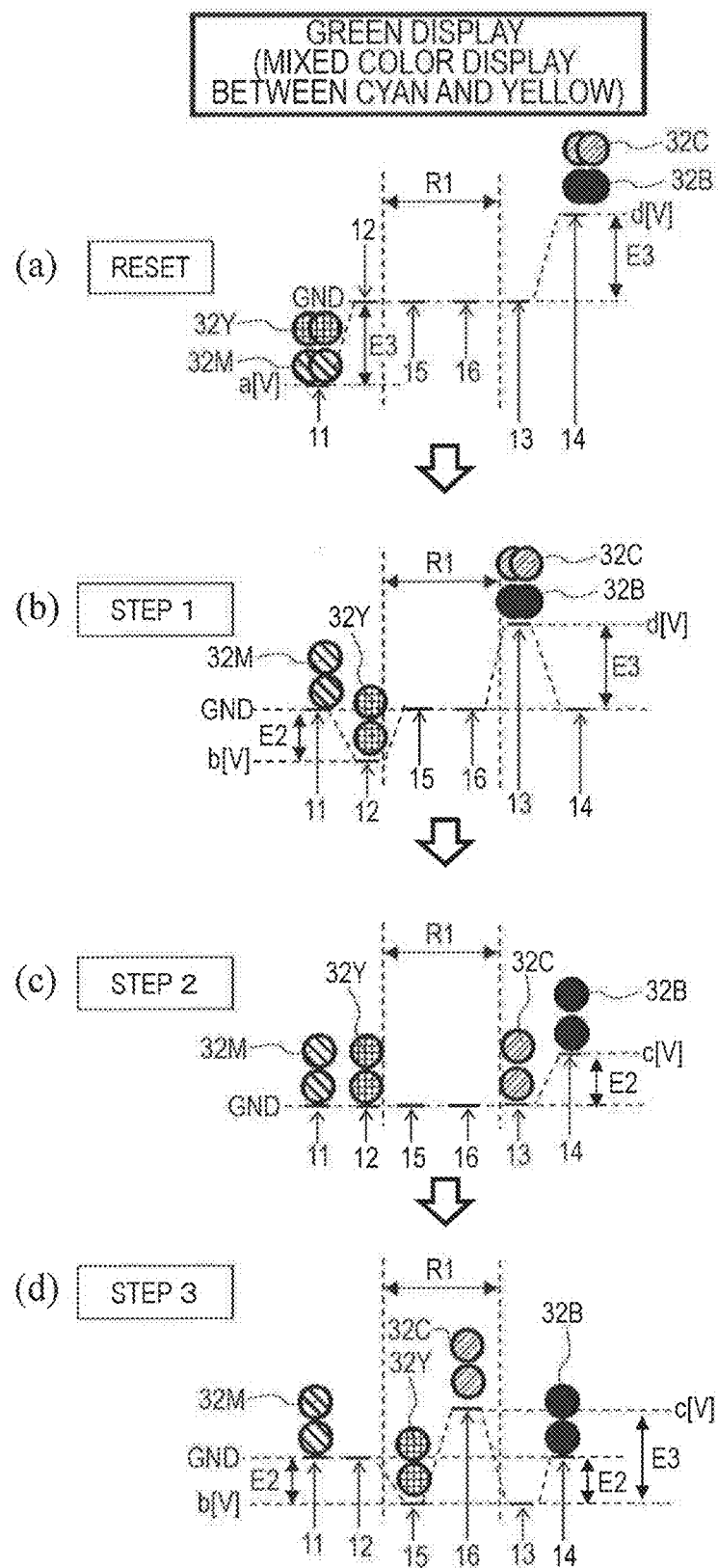
FIG. 58 (a) to (d) are diagrams illustrating a display sequence for green display.

FIGS. 58(a) to 58(d) are diagrams illustrating a display sequence for green display (i.e., mixed color between cyan and yellow). First, as shown in FIG. 58(a), the same potentials as those in the white display state are applied to the first electrode 11, the second electrode 12, the third electrode 13, the fourth electrode 14, the fifth electrode 15 and the sixth electrode 16, thus resetting display.

Next, as shown in FIG. 58(b), the potentials of the first electrode 11 and the fourth electrode 14 are set to the ground potential GND, the potential of the second electrode 12 is set to b [V], and the potential of the third electrode 13 is set to d [V] (step 1). At this point, a potential gradient corresponding to the electric field intensity E2 is formed between the first electrode 11 and the second electrode 12 and a potential gradient corresponding to the electric field intensity E3 is formed between the third electrode 13 and the fourth electrode 14. Therefore, the yellow particles 32Y move from over the first electrode 11 to over the second electrode 12, and the cyan particles 32C and the black particles 32B move from over the fourth electrode 14 to over the third electrode 13 (the magenta particles 32M remain over the first electrode 11).

Next, as shown in FIG. 58(c), the potentials of the second electrode 12 and the third electrode 13 are set to the ground potential GND, and the potential of the fourth electrode 14 is set to c [V] (step 2). At this point, since a potential gradient corresponding to the electric field intensity E2 is formed between the third electrode 13 and the fourth electrode 14, the black particles 32B move from over the third electrode 13 to over the fourth electrode 14 (the cyan particles 32C remain over the third electrode 13).

Then, as shown in FIG. 58(d), the potentials of the third electrode 13 and the fifth electrode 15 are set to b [V], the potential of the fourth electrode 14 is set to the ground potential. GND, and the potential of the sixth electrode 16 is set to c [V] (step 3). At this point, a potential gradient corresponding to the electric field intensity E2 is formed between the second electrode 12 and the fifth electrode 15 and a potential gradient corresponding to the electric field intensity E3 is formed between the sixth electrode 16 and the third electrode 13. Therefore, the yellow particles 32Y move from over the second electrode 12 to the opening region R1 and the cyan particles 32C move from over the third electrode 13 to the opening region R1. More specifically, the yellow particles 32Y move from over the second electrode 12 to over the fifth electrode 15, and the cyan particles 32C move from over the third electrode 13 to over the sixth electrode 16. Therefore, in this state, green display is produced by subtractive color mixing between cyan and yellow.

[Blue Display]

Figure 59:
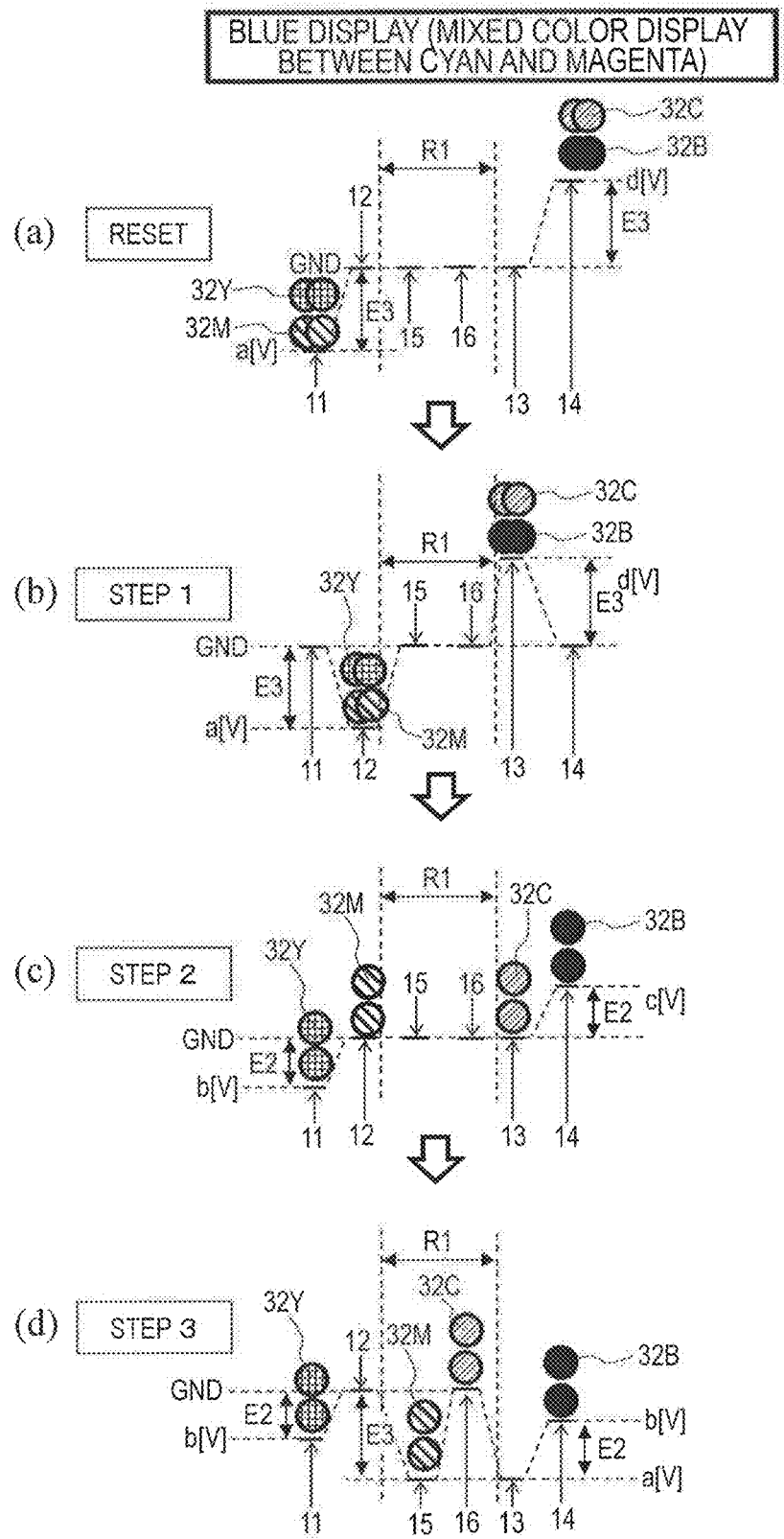
FIG. 59 (a) to (d) are diagrams illustrating a display sequence for blue display.

FIGS. 59(a) to 59(d) are diagrams illustrating a display sequence for blue display (i.e., mixed color display between cyan and magenta). First, as shown in FIG. 59(a), the same potentials as those in the white display state are applied to the first electrode 11, the second electrode 12, the third electrode 13, the fourth electrode 14, the fifth electrode 15 and the sixth electrode 16, thus resetting display.

Next, as shown in FIG. 59(b), the potentials of the first electrode 11 and the fourth electrode 14 are set to the ground potential GND, the potential of the second electrode 12 is set to a [V], and the potential of the third electrode 13 is set to d [V] (step 1). At this point, a potential gradient corresponding to the electric field intensity E3 is formed between the first electrode 11 and the second electrode 12 and a potential gradient corresponding to the electric field intensity E3 is formed between the third electrode 13 and the fourth electrode 14. Therefore, the magenta particles 32M and the yellow particles 32Y move from over the first electrode 11 to over the second electrode 12, and the cyan particles 32C and the black particles 32B move from over the fourth electrode 14 to over the third electrode 13.

Next, as shown in FIG. 59(c), the potential of the first electrode 11 is set to b [V], the potentials of the second electrode 12 and the third electrode 13 are set to the ground potential GND, and the potential of the fourth electrode 14 is set to c [V] (step 2). At this point, a potential gradient corresponding to the electric field intensity E2 is formed between the first electrode 11 and the second electrode 12 and a potential gradient corresponding to the electric field intensity E2 is formed between the third electrode 13 and the fourth electrode 14. Therefore, the yellow particles 32Y move from over the second electrode 12 to over the first electrode 11, and the black particles 32B move from over the third electrode 13 to over the fourth electrode 14 (the magenta particles 32M remain over the second electrode 12 and the cyan particles 32C remain over the third electrode 13).

Then, as shown in FIG. 59(d), the potentials of the third electrode 13 and the fifth electrode 15 are set to a [V], and the potential of the fourth electrode 14 is set to b [V] (step 3). At this point, a potential gradient corresponding to the electric field intensity E3 is formed between the second electrode 12 and the fifth electrode 15 and a potential gradient corresponding to the electric field intensity E3 is formed between the sixth electrode 16 and the third electrode 13. Therefore, the magenta particles 32M move from over the second electrode 12 to the opening region R1 and the cyan particles 32C move from over the third electrode 13 to the opening region R1. More specifically, the magenta particles 32M move from over the second electrode 12 to over the fifth electrode 15, and the cyan particles 32C move from over the third electrode 13 to over the sixth electrode 16. Therefore, in this state, blue display is produced by subtractive color mixing between cyan and magenta.

[Red Display]

Figure 60:
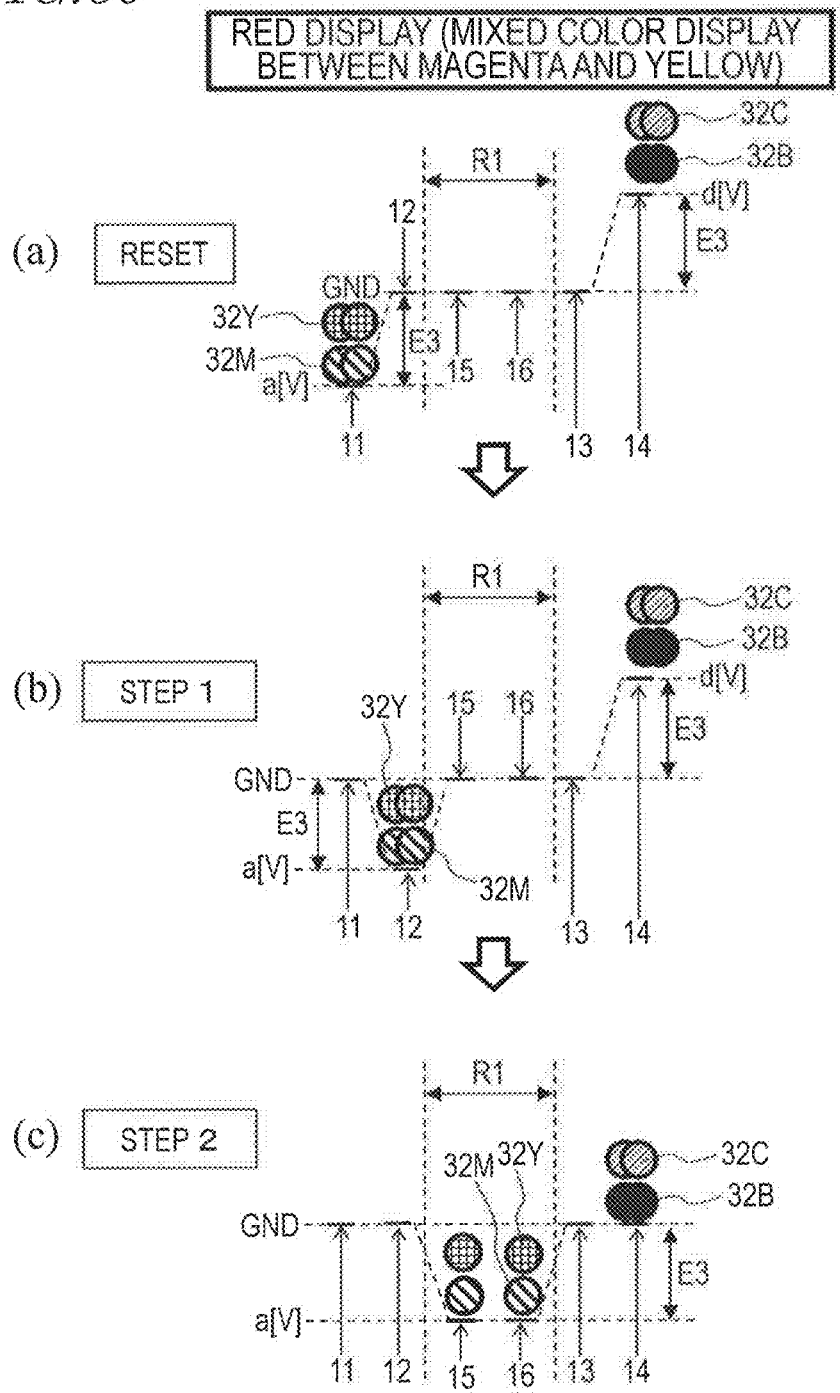
FIG. 60 (a) to (c) are diagrams illustrating a display sequence for red display.

FIGS. 60(a) to 60(c) are diagrams illustrating a display sequence for red display (i.e., mixed color display between magenta and yellow). First, as shown in FIG. 60(a), the same potentials as those in the white display state are applied to the first electrode 11, the second electrode 12, the third electrode 13, the fourth electrode 14, the fifth electrode 15 and the sixth electrode 16, thus resetting display.

Next, as shown in FIG. 60(b), the potential of the first electrode 11 is set to the ground potential GND, and the potential of the second electrode 12 is set to a [V] (step 1). At this point, a potential gradient corresponding to the electric field intensity E3 is formed between the first electrode 11 and the second electrode 12. Therefore, the magenta particles 32M and the yellow particles 32Y move from over the first electrode 11 to over the second electrode 12.

Then, as shown in FIG. 60(c), the potentials of the second electrode 12 and the fourth electrode 14 are set to the ground potential GND, and the potentials of the fifth electrode 15 and the sixth electrode 16 are set to a [V] (step 2). At this point, since a potential gradient corresponding to the electric field intensity E3 is formed between the second electrode 12 and the fifth electrode 15 and between the sixth electrode 16 and the third electrode 13 (i.e., in the opening region R1), the magenta particles 32M and the yellow particles 32Y move from over the second electrode 12 to the opening region R1. Therefore, in this state, red display is produced by subtractive color mixing between magenta and yellow.

Moreover, the electrophoretic element 300A of the present embodiment can preferably produce gray level display by employing a display sequence as described above.

[Gray Level Display]

Figure 61:
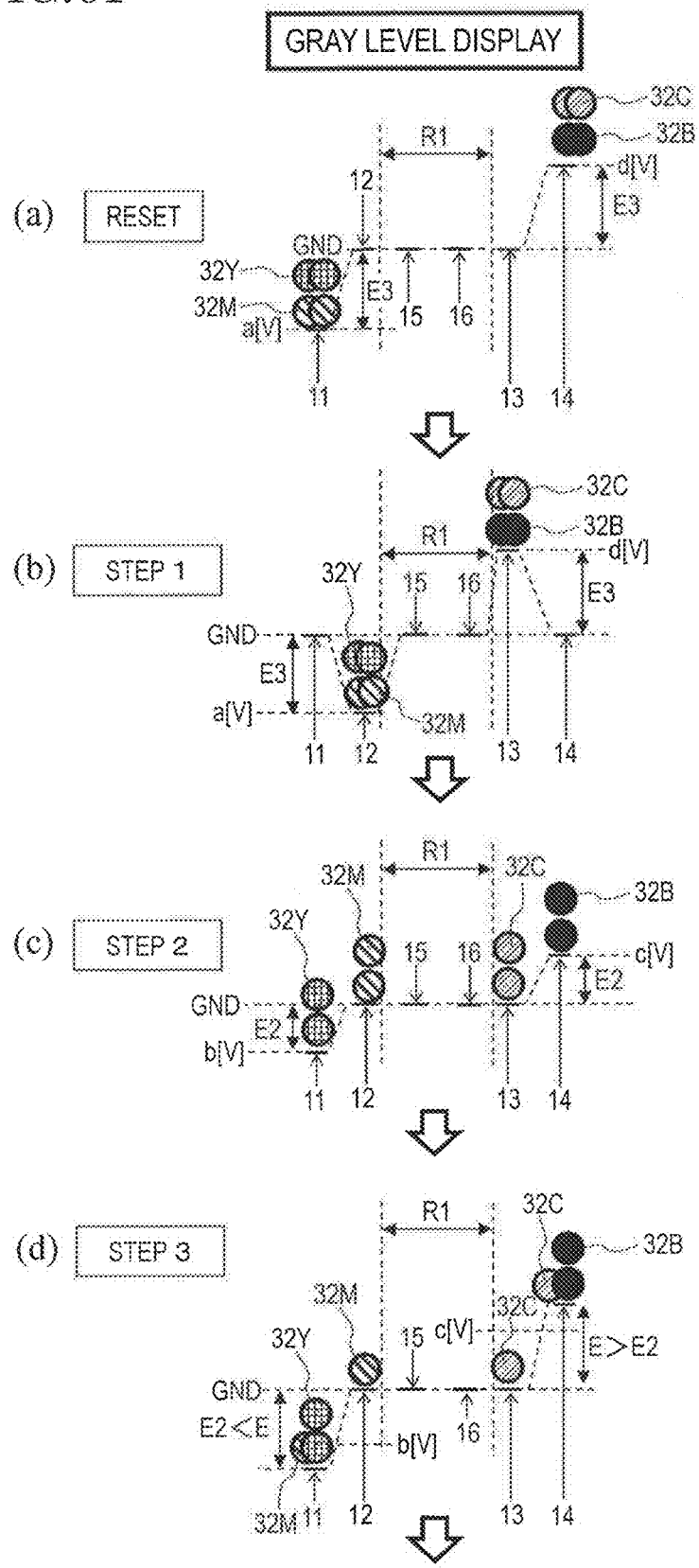
FIG. 61 (a) to (d) are diagrams illustrating a display sequence for gray level display.
Figure 62:
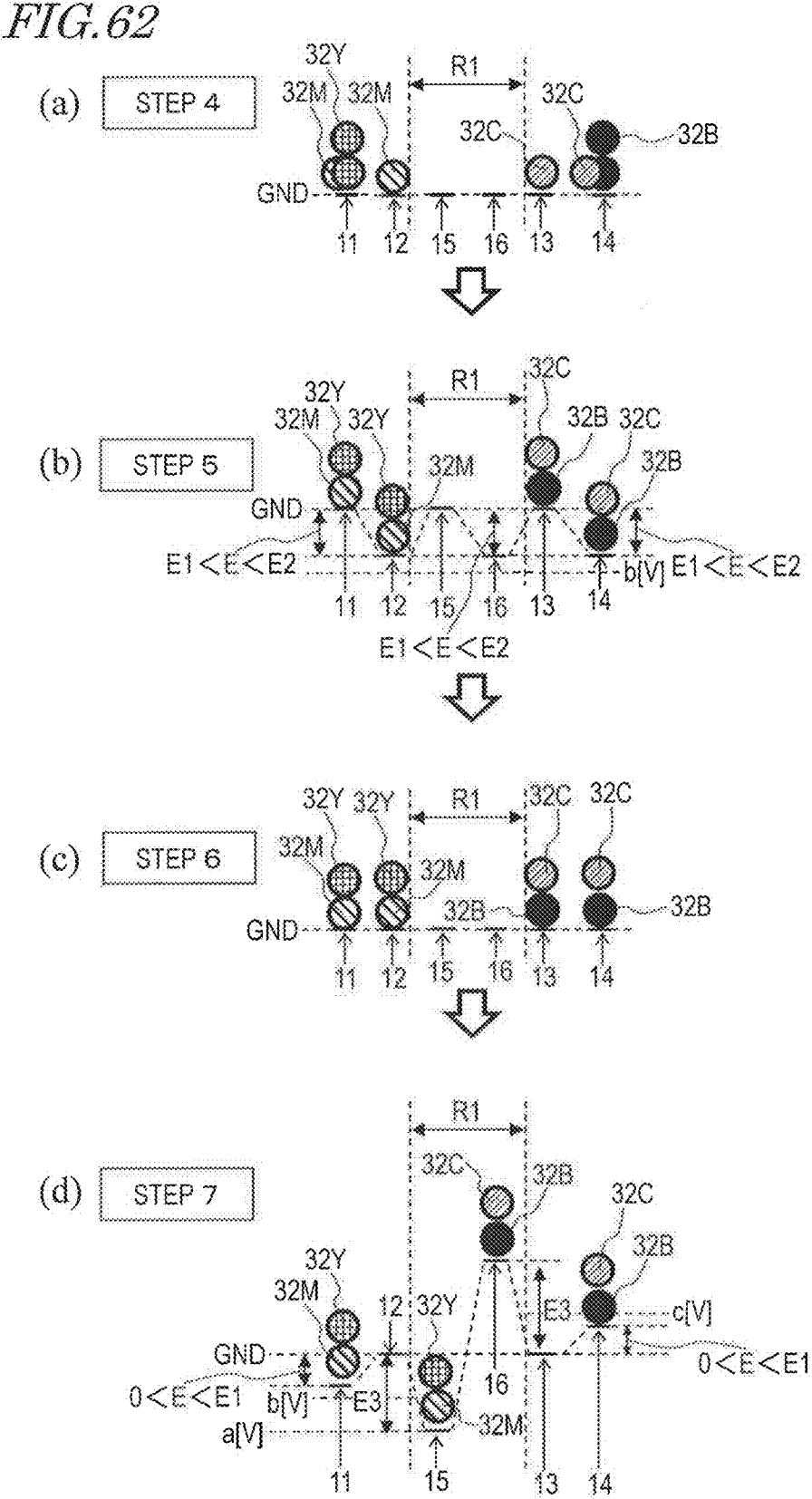
FIG. 62 (a) to (d) are diagrams illustrating a display sequence for gray level display.

Herein, referring to FIG. 61 and FIG. 62, an example in which an appropriate amount of each of the cyan particles 32C, the magenta particles 32M, the yellow particles 32Y and the black particles 32B is moved to the opening region R1 be described.

FIGS. 61(*a*) to 61(*d*) and FIGS. 62(*a*) to 62(*d*) are diagrams illustrating a display sequence for gray level display. First, as shown in FIG. 61(*a*), the same potentials as those in the white display state are applied to the first electrode 11, the second electrode 12, the third electrode 13, the fourth electrode 14, the fifth electrode 15 and the sixth electrode 16, thus resetting display.

Next, as shown in FIG. 61(*b*), the potentials of the first electrode 11 and the fourth electrode 14 are set to the ground potential GND, the potential of the second electrode 12 is set to a [V], and the potential of the third electrode 13 is set to d [V] (step 1). At this point, a potential gradient corresponding to the electric field intensity E3 is formed between the first electrode 11 and the second electrode 12 and a potential gradient corresponding to the electric field intensity E3 is formed between the third electrode 13 and the fourth electrode 14. Therefore, the magenta particles 32M and the yellow particles 32Y move from over the first electrode 11 to over the second electrode 12, and the cyan particles 32C and the black particles 32B move from over the fourth electrode 14 to over the third electrode 13.

Next, as shown in FIG. 61(*c*), the potential of the first electrode 11 is set to b [V], the potentials of the second electrode 12 and the third electrode 13 are set to the ground potential GND, and the potential of the fourth electrode 14 is set to c [V] (step 2). At this point, a potential gradient corresponding to the electric field intensity E2 is formed between the first electrode 11 and the second electrode 12 and a potential gradient corresponding to the electric field intensity E2 is formed between the third electrode 13 and the fourth electrode 14. Therefore, the yellow particles 32Y move from over the second electrode 12 to over the first electrode 11, and the black particles 32B move from over the third electrode 13 to over the fourth electrode 14 (the magenta particles 32M remain over the second electrode 12 and the cyan portholes 32C remain over the third electrode 13).

Next, as shown in FIG. 61(*d*), the potential of the first electrode 11 is set to be lower than b [V], and the potential of the fourth electrode 14 is set to be higher than c [V] (step 3). At this point, since a potential gradient corresponding to the electric field intensity E higher than the electric field intensity E2 (E that satisfies the relationship E>E2) is formed between the first electrode 11 and the second electrode 12, the magenta particles 32M start moving from over the second electrode 12 to over the first electrode 11. Moreover, at this point, since a potential gradient corresponding to the electric field intensity E higher than the electric field intensity E2 (E that satisfies the relationship E>E2) is formed also between the third electrode 13 and the fourth electrode 14, the cyan particles 32C start moving from over the third electrode 13 to over the fourth electrode 14.

Next, when the amount of magenta particles 32M over the second electrode 12 and the amount of cyan particles 32C over the third electrode 13 become appropriate, the potentials of the first electrode 11 and the fourth electrode 14 are set to the ground potential GND as shown in FIG. 62(*a*) (step 4). At this point, since all the electrodes are at the ground potential GND and no potential gradient is formed between the first electrode 11 and the second electrode 12 or between the third electrode 13 and the fourth electrode 14, the magenta particles 32M and the cyan particles 32C stop moving.

Next, as shown in FIG. 62(*b*), the potentials of the second electrode 12, the fourth electrode 14 and the sixth electrode 16 are set to a potential that is lower than the ground potential GND and higher than b [V] (step 5). More specifically, the potential of the second electrode 12 is set to such a potential that a potential gradient corresponding to the electric field intensity E higher than the electric field intensity E1 and lower than the electric field intensity E2 (E that satisfies the relationship E1<E<E2) is formed between the first electrode 11 and the second electrode 12. Thus, the yellow particles 32Y start moving from over the first, electrode 11 to over the second electrode 11. More specifically, the potential of the fourth electrode 14 is set to such a potential that a potential gradient corresponding to the electric field intensity E higher than the electric field intensity E1 and lower than the electric field intensity E2 (E that satisfies the relationship E1<E<E2) is formed between the third electrode 13 and the fourth electrode 14. Thus, the black particles 32B start moving from over the fourth electrode 14 to over the third electrode 13. Note that more specifically, the potential of the sixth electrode 16 is set to such a potential that a potential gradient corresponding to the electric field intensity E higher than the electric field intensity E1 and lower than the electric field intensity E2 (E that satisfies the relationship E1<E<E2) is formed between the sixth electrode 16 and the third electrode 13. Thus, the cyan particles 32C and the black particles 32B are prevented from moving from over the third electrode 13 to over the sixth electrode 16 (i.e., to the opening region R1). The potential of the fifth electrode 15 is set to such a potential that a potential gradient corresponding to the electric field intensity E higher than the electric field intensity E1 and lower than the electric field intensity E2 (E that satisfies the relationship E1<E<E2) is formed between the fifth electrode 15 and the second electrode 12 (herein, the ground potential GND). Thus, the yellow particles 32Y and the magenta particles 32M are prevented from moving from over the second electrode 12 to over the fifth electrode 15 (i.e., to the opening region R1).

Next, when the amount of yellow particles 32Y over the second electrode 12 and the amount of black particles 32B over the third electrode 13 become appropriate, the potentials of the second electrode 12, the fourth electrode 14 and the sixth electrode 16 are set to the ground potential GND as shown in FIG. 62(*c*) (step 6). At this point, since all the electrodes are at the ground potential GND and no potent al gradient is formed between the first electrode 11 and the second electrode 12 or between the third electrode 13 and the fourth electrode 14, the yellow particles 32Y and the black particles 32B stop moving.

Then, as shown in FIG. 62(d), the potential of the fifth electrode 15 is set to a [V], and the potential of the sixth electrode 16 is set to d [V] (step 7). At this point, since a potential gradient corresponding to the electric field intensity E3 is formed between the second electrode 12 and the fifth electrode 15 and between the sixth electrode 16 and the third electrode 13, the magenta particles 32M and the yellow particles 32Y move from over the second electrode 12 to the opening region R1 and the cyan particles 32C and the black particles 32B move from over the third electrode 13 to the opening region R1. More specifically, the magenta particles 32M and the yellow particles 32Y move from over the second electrode 12 to over the fifth electrode 15, and the cyan particles 32C and the black particles 32B move from over the third electrode 13 to over the sixth electrode 16. Therefore, in this state, gray level display is produced with respectively appropriate amounts cyan particles 32C, magenta particles 32M, yellow particles 32Y and black particles 32B. Note that at this point, the potential of the first electrode 11 is set to such a potential that a potential gradient corresponding to the electric field intensity E lower than the electric field intensity E1 (E that satisfies the relationship 0<E<E1) is formed between the first electrode 11 and the second electrode 12. Thus, it is possible to prevent the magenta particles 32M and the yellow particles 32Y from moving from over the first electrode 11 to over the second electrode 12, and prevent the yellow particles 32Y from moving from over the second electrode 12 to the first electrode 11. At this point, the potential of the fourth electrode 14 is set to such a potential that a potential gradient corresponding to the electric field intensity E lower than the electric field intensity E1 (E that satisfies the relationship 0<E<E1) is formed between the third electrode 13 and the fourth electrode 14. Thus, it is possible to prevent the cyan particles 32C and the black particles 32B from moving from over the fourth electrode 14 to over the third electrode 13, and prevent the black particles 32B from moving from over the third electrode 14 to the fourth electrode 14.

Note that the number of (types of) electrodes provided in the opening region R1 is not limited two, as in the illustrated example. Three or more (types of) electrodes may be provided in the opening region R1. Only one electrode may be provided in the opening region R1, as in Embodiment 15 to be described below. One or more electrodes positioned in the opening region R1 may be provided on the second substrate 20 side, rather than on the first substrate 10 side.

Embodiment 15

Figure 63:
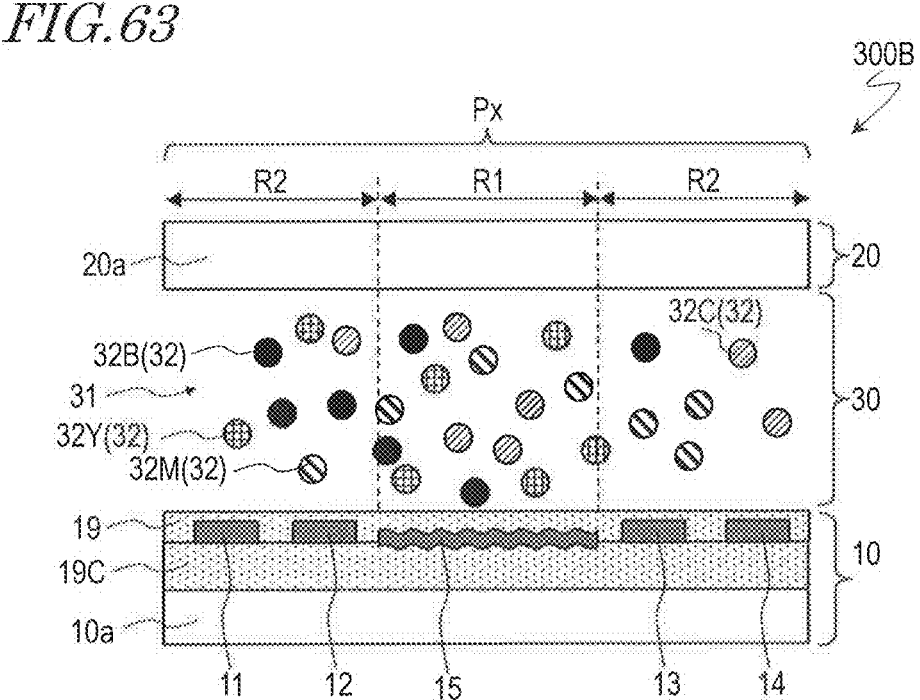
FIG. 63 A cross-sectional view schematically showing an electrophoretic element (display device) 300B according to an embodiment of the present invention.

FIG. 63 shows an electrophoretic element (display device) 300B of the present embodiment. FIG. 63 is a cross-sectional view schematically showing one pixel Px of the electrophoretic element 300B.

The electrophoretic element 300B is different from the electrophoretic element 300 of Embodiment 13 in that the first substrate 10 includes the fifth electrode 15 provided in the opening region R1 as shown in FIG. 63. A potential different from the first electrode 11, the second electrode 12, the third electrode 13 and the fourth electrode 14 can be applied to the fifth electrode 15.

The fifth electrode 15 provided in the opening region R1 is a reflective electrode having a light-reflecting property and functions as a light-reflecting layer. More specifically, the fifth electrode 15 is a diffuse reflection electrode that diffusively reflects light.

The fifth electrode 15 includes a layer that is formed from a metal material having a high reflectance (e.g., aluminum). The fifth electrode 15 may have a multi-layer structure including a plurality of layers formed from different conductive materials. For example, the fifth electrode 15 has a multi-layer structure including a titanium layer, an aluminum layer and an ITO layer layered in this order from the transparent substrate 10a. The ITO layer in this configuration serves to prevent corrosion of the aluminum layer.

The surface of the fifth electrode 15 has an uneven shape, thereby diffusively reflecting (scattering) light at the fifth electrode 15. Herein, an uneven shape is formed on the surface of an insulating layer (e.g., formed from a photosensitive acrylic resin material) 19C located directly below the fifth electrode 15, thereby giving an uneven shape to the surface of the fifth electrode 15 (reflecting the uneven shape of the surface of the insulating layer 19C).

By employing a reflective electrode for the fifth electrode 15, it is possible to place lines, TFTs, storage capacitors, etc., under the reflective electrode (light-reflecting layer), thereby improving the reflective aperture ratio. Moreover, there is no need to provide a light-reflecting layer (the light-reflecting layer 40 in the electrophoretic element 300 of Embodiment 13) separately from the fifth electrode 15, and it is therefore possible to reduce cost.

Note that the first electrode 11, the second electrode 12, the third electrode 13 and the fourth electrode 14 may each be a reflective electrode having the same configuration as the fifth electrode 15 or a transparent electrode formed from a transparent conductive material.

Similar effects can be realized also by employing a reflective electrode (diffuse reflection electrode) for the fifth electrode 15 and the sixth electrode 16 provided in the opening region R1 in the electrophoretic element 300A of Embodiment 14.

Embodiment 16

Figure 64:
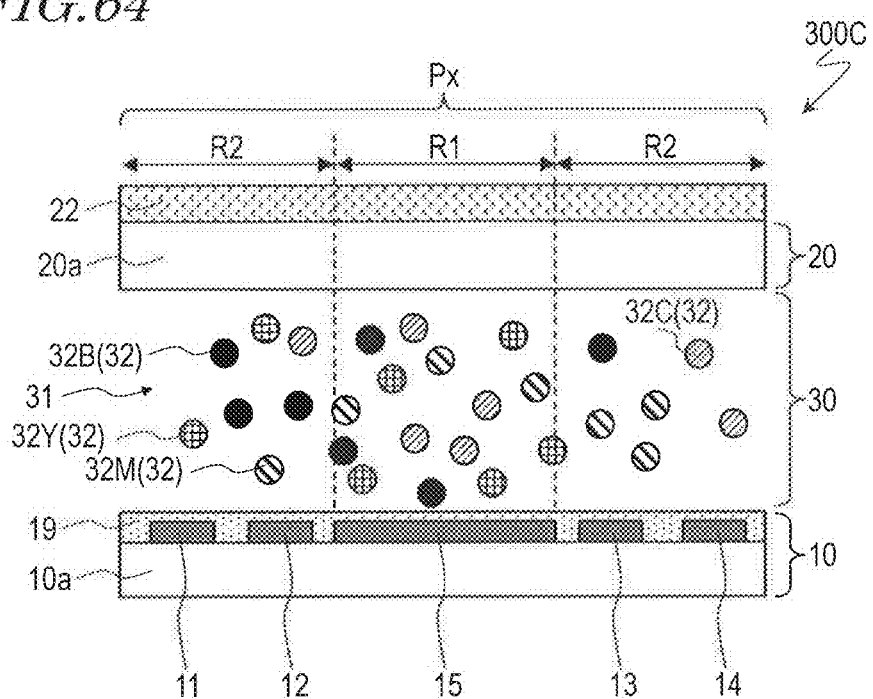
FIG. 64 A cross-sectional view schematically showing an electrophoretic element (display device) 300C according to an embodiment of the present invention.

FIG. 64 shows an electrophoretic element (display device) 300C of the present embodiment. FIG. 64 is a cross-sectional view schematically showing one pixel Px of the electrophoretic element 300C.

The electrophoretic element 300C is different from the electrophoretic element 300 of Embodiment 13 in that the first substrate 10 includes the fifth electrode 15 provided in the opening region R1 as shown in FIG. 64. A potential different from the first electrode 11, the second electrode 12, the third electrode 13 and the fourth electrode 14 can be applied to the fifth electrode 15.

The fifth electrode 15 provided in the opening region R1 is a reflective electrode having a light-reflecting property and functions as a light-reflecting layer. More specifically, the fifth electrode 15 is a specular reflection electrode that specularly reflects light. A light diffusion layer (e.g., a light-diffusing film) 22 that diffuses light is provided on the front side relative to the electrophoretic layer 30 (herein, on the front side of the transparent substrate 20a of the second substrate 20).

The fifth electrode 15 includes a layer that is formed from a metal material having a high reflectance (e.g., aluminum). The fifth electrode 15 may have a multi-layer structure including a plurality of layers formed from different conductive materials. For example, the fifth electrode 15 has a multi-layer structure including a titanium layer, an aluminum layer and an ITO layer layered in this order from the transparent substrate 10a. The ITO layer in this configuration serves to prevent corrosion of the aluminum layer.

By employing a reflective electrode for the fifth electrode 15, it is possible to place lines, TFTs, storage capacitors, etc., under the reflective electrode (light-reflecting layer), thereby improving the reflective aperture ratio. Moreover, there is no need to provide a light-reflecting layer (the light-reflecting layer 40 in the electrophoretic element 300 of Embodiment 13) separately from the fifth electrode 15, and it is therefore possible to reduce cost.

Note that the first electrode 11, the second electrode 12, the third electrode 13 and the fourth electrode 14 may each be a reflective electrode having the same configuration as the fifth electrode 15 or a transparent electrode formed from a transparent conductive material.

Similar effects can be realized also by employing a reflective electrode (specular reflection electrode) for the fifth electrode 15 and the sixth electrode 16 provided in the opening region R1 in the electrophoretic element 300A of Embodiment 14.

Embodiment 17

Figure 65:
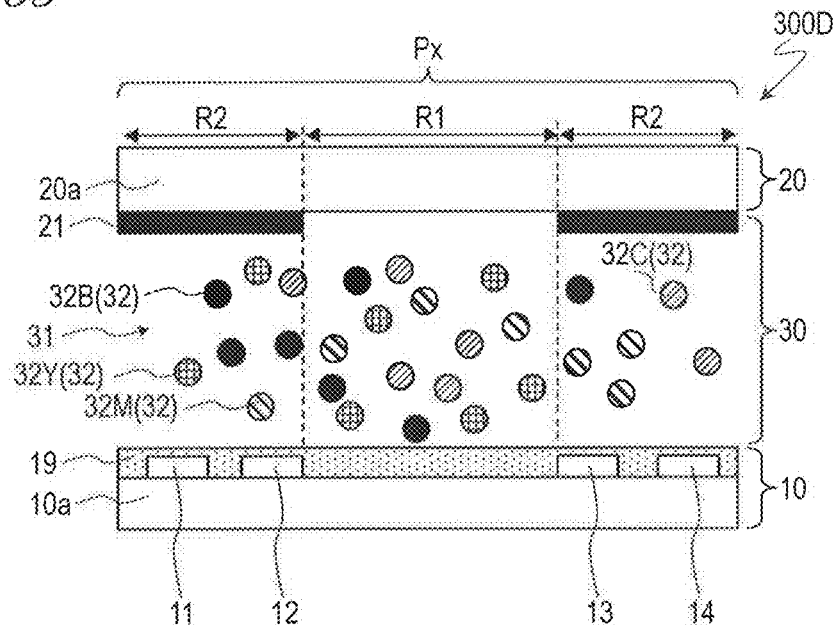
FIG. 65 A cross-sectional view schematically showing an electrophoretic element (display device) 300D according to an embodiment of the present invention.

FIG. 65 shows an electrophoretic element (display device) 300D of the present embodiment. FIG. 65 is a cross-sectional view schematically showing one pixel Px of the electrophoretic element 300D.

As shown in FIG. 65, the electrophoretic element 300D includes the components of the electrophoretic element 300 of Embodiment 13, except for the light-reflecting layer 40. Therefore, when none of the plurality of types of electrophoretic particles 32 is positioned in the opening region R1 of the electrophoretic element 300D, the opening region R1 is substantially colorless and transparent. Therefore, the electrophoretic element 300D can be used as a transparent display (see-through display).

Note that when producing white display on the electrophoretic element 300D, white-colored electrophoretic particles may be included in the electrophoretic layer 30.

Embodiment 18

Figure 66:
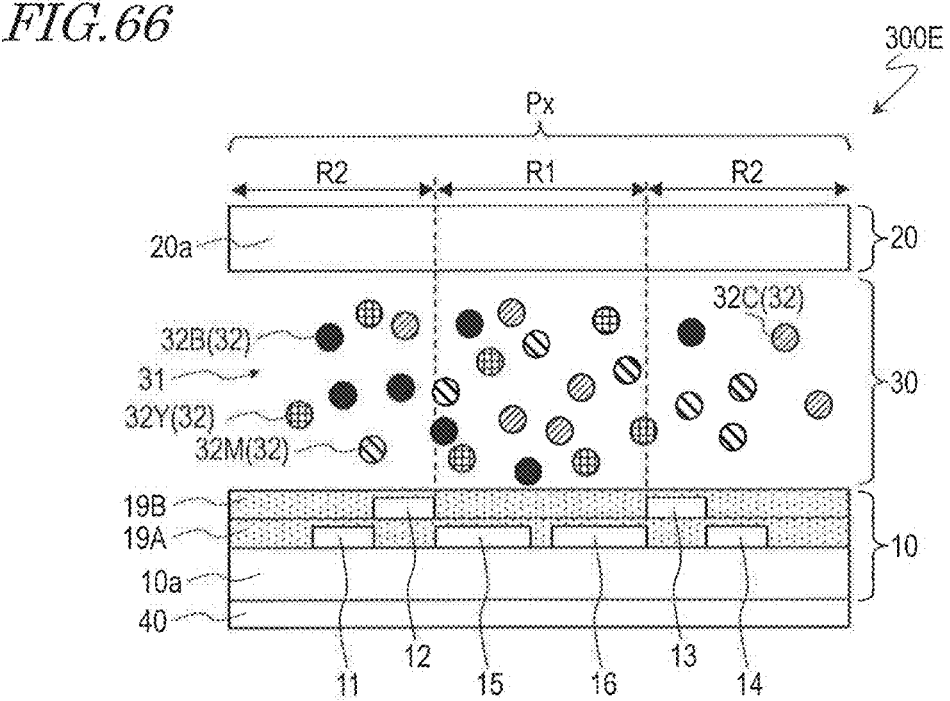
FIG. 66 A cross-sectional view schematically showing an electrophoretic element (display device) 300E according to an embodiment of the present invention.
Figure 67:
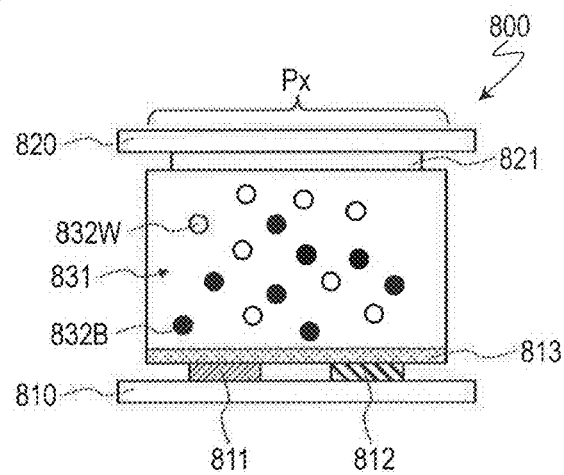
FIG. 67 A cross-sectional view schematically showing one pixel Px of an electrophoretic display 800 of Patent Document No. 1.
Figure 68:
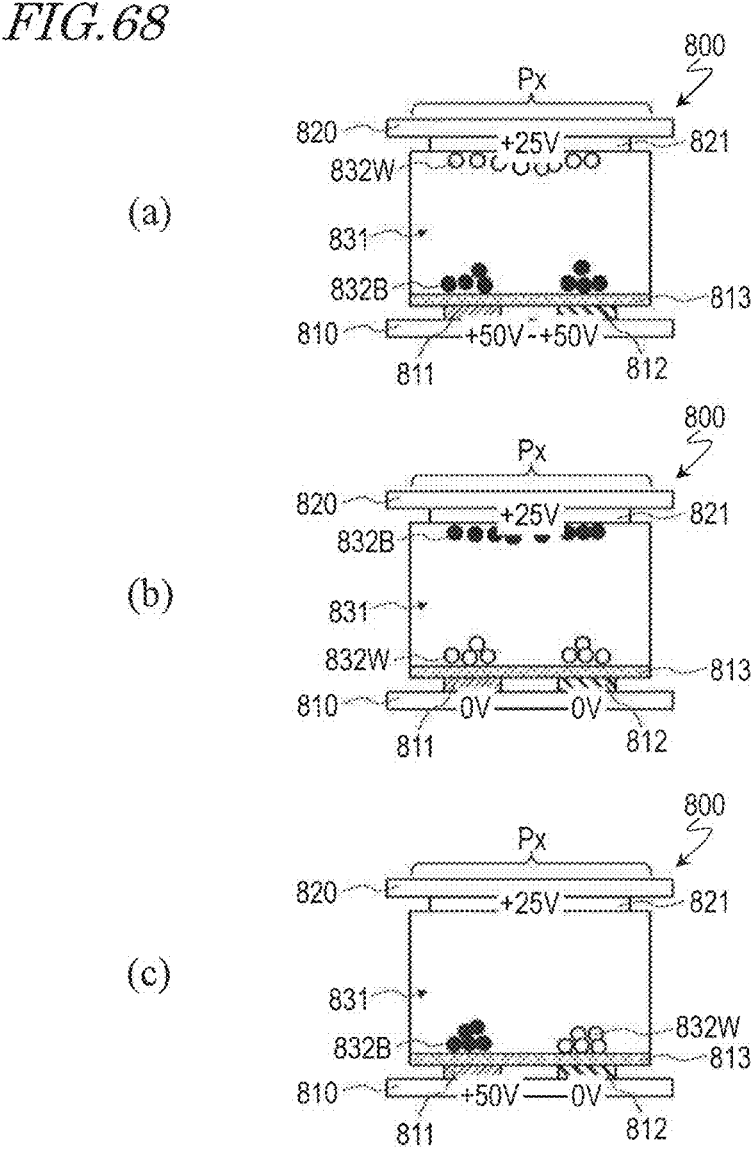
FIG. 68 (a) to (c) are diagrams illustrating display principles of the electrophoretic display 800 of Patent Document No. 1.
Figure 69:
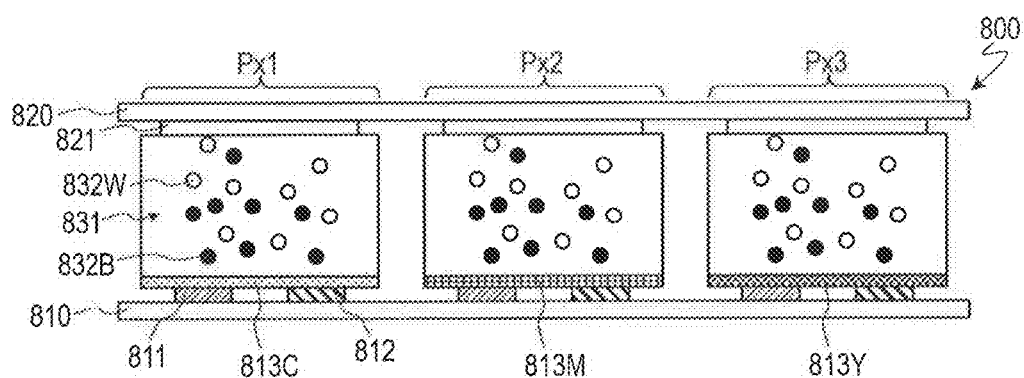
FIG. 69 A cross-sectional view schematically showing three pixels Px1, Px2 and Px3 of the electrophoretic display 800 of Patent Document No. 1.

FIG. 66 shows an electrophoretic element (display device) 300E of the present embodiment. FIG. 66 is a cross-sectional view schematically showing one pixel Px of the electrophoretic element 300E. The following description will focus on the difference between the electrophoretic element 300E of the present embodiment and the electrophoretic element 300A of Embodiment 14.

In the present embodiment, the insulating layer (lower-layer insulating layer) 19A is formed so as to cover the first electrode 11, the fourth electrode 14, the fifth electrode 15 and the sixth electrode 16 of the first substrate 10, and the second electrode 12 and the third electrode 13 are provided on the insulating layer 19A. The insulating layer (upper-layer insulating layer) 19B is formed so as to cover the second electrode 12 and the third electrode 13.

As described above, in the present embodiment, the first substrate 10 includes the insulating layer 19A that covers some (the electrodes 11, 14, 15 and 16) of the plurality of electrodes 11, 12, 13, 14, 15 and 16, with the rest of the electrodes 12 and 13 being provided on the insulating layer 19A. Therefore, even if adjacent electrodes overlap with each other as seen from above (as seen from the direction normal to the display surface), they will not be short-circuited, and there is no need to provide a gap between adjacent electrodes. Therefore, it is possible to increase the ratio of the opening region R1 in each pixel Px and to produce brighter display.

Note that since adjacent electrodes are formed at different levels (heights) in the present embodiment (note however that the fifth electrode 15 and the sixth electrode 16 are formed at the same level), a fringe electric field is formed in the electrophoretic layer 30 when a potential difference is applied between the adjacent electrodes. With an electrode structure configured to form such a fringe electric field, the inter-electrode distance can be made smaller than with an electrode structure configured to form a simple transverse electric field. Therefore, it is possible to increase the electric field intensity between electrodes, and it is therefore possible to increase the force for separating the electrophoretic particles 32 from between electrodes. As a result, it is possible to preferably move the electrophoretic particles 32, to improve the response speed, to lower the driving voltage, etc.

INDUSTRIAL APPLICABILITY

An embodiment of the present invention provides an electrophoretic element capable of subtractive color mixing (superposition of colors) within a pixel, rather than juxtapositional color mixing (i.e., mixing of colors between pixels).

REFERENCE SIGNS LIST

10: First substrate
10a: Transparent substrate
11: First electrode
12: Second electrode
13: Third electrode
14: Fourth electrode
15: Fifth electrode
16: Sixth electrode
17: Seventh electrode
18: Eighth electrode
19: insulating layer
19A: Lower-layer insulating layer
19B: Upper-layer insulating layer
19C: Insulating layer
20: Second substrate
20a: Transparent substrate
21: Light-blocking layer
22: Light diffusion layer
29: insulating layer
29A: Lower-layer insulating layer
29B: Upper-layer insulating layer
26: Sixth electrode
27: Seventh electrode
28: Eighth electrode
30: Electrophoretic layer
31: Dispersion medium
32: Electrophoretic particles
32C: Cyan particles
32M: Magenta particles
32Y: Yellow particles
32B: Black particles
33: Partition wall
40: Light-reflecting layer
100, 200, 300: Electrophoretic element (display device)
100A, 100B, 100C, 100D: Electrophoretic element (display device)
100E, 100F, 100G, 100H: Electrophoretic element (display device)
100I, 100J, 100K, 200A: Electrophoretic element (display device)
300, 300A, 300B, 300C: Electrophoretic element (display device)

300D, 300E: Electrophoretic element (display device)
Px: Pixel
R1: Opening region
R2: Light-blocking region

The invention claimed is:
1. An electrophoretic element comprising:
a first substrate and a second substrate facing each other;
an electrophoretic layer provided between the first substrate and the second substrate; and
a plurality of pixels each including an opening region through which light is transmitted from the electrophoretic layer to a front side, wherein:
in each of the plurality of pixels, the electrophoretic layer includes a dispersion medium, and a plurality of types of electrophoretic particles dispersed in the dispersion medium;
the plurality of types of electrophoretic particles include first electrophoretic particles and second electrophoretic particles that are charged with the same polarity; and
a first threshold voltage at which the first electrophoretic particles start to move and a second threshold voltage at which the second electrophoretic particles start to move are different from each other; and
in each of the plurality of pixels, the first substrate includes at least three electrodes to which different potentials can be applied.

2. The electrophoretic element according to claim 1, wherein two or more of the plurality of types of electrophoretic particles can be positioned in the opening region by controlling the potentials of the at least three electrodes.

3. The electrophoretic element according to claim 1, wherein:
the plurality of types of electrophoretic particles include third electrophoretic particles that are charged with a different polarity from the first electrophoretic particles and the second electrophoretic particles; and
the at least three electrodes of the first substrate are four or more electrodes to which different potentials can be applied.

4. The electrophoretic element according to claim 3, wherein:
the four or more electrodes include a first electrode, a second electrode, a third electrode and a fourth electrode; and
the first electrode, the second electrode, the opening region, the third electrode and the fourth electrode are placed in this order along a certain direction that is parallel to a substrate surface of the first substrate.

5. The electrophoretic element according to claim 1, wherein the at least three electrodes include at least one electrode provided in the opening region.

6. The electrophoretic element according to claim 5, wherein the at least one electrode provided in the opening region is a reflective electrode having a light-reflecting property.

7. The electrophoretic element according to claim 1, wherein:
the first substrate further includes at least one further electrode that is provided in the opening region, and to which a different potential from the at least three electrodes can be applied; and
the at least one further electrode provided in the opening region is a reflective electrode having a light-reflecting property.

8. The electrophoretic element according to claim 1, wherein:
the plurality of types of electrophoretic particles include third electrophoretic particles and fourth electrophoretic particles that are charged with a different polarity from the first electrophoretic particles and the second electrophoretic particles and have different threshold characteristics from each other; and
the at least three electrodes of the first substrate are four or more electrodes to which different potentials can be applied.

9. The electrophoretic element according to claim 8, wherein the first substrate includes at least two further electrodes that are provided in the opening region and to which different potentials from the four or more electrodes can be applied.

10. The electrophoretic element according to claim 9, wherein it is possible to locate two or more of the plurality of types of electrophoretic particles in the opening region by controlling the potentials of the at least two further electrodes as well as the potentials of the four or more electrodes.

11. The electrophoretic element according to claim 10, wherein the at least two further electrodes provided in the opening region are each a reflective electrode having a light-reflecting property.

12. The electrophoretic element according to claim 1, further comprising a light-reflecting layer or a light-absorbing layer that is provided in the opening region on a back side relative to the electrophoretic layer.

13. The electrophoretic element according to any one of claim 1, wherein the opening region is substantially colorless and transparent when none of the plurality of types of electrophoretic particles is positioned in the opening region.

14. The electrophoretic element according to claim 1, wherein:
in the opening region, the electrophoretic element further comprises a white-colored light-reflecting layer provided on a back side relative to the electrophoretic layer, or the light-reflecting layer and a light diffusion layer provided on a front side relative to the electrophoretic layer; and
the plurality of types of electrophoretic particles include cyan-colored electrophoretic particles, magenta-colored electrophoretic particles, yellow-colored electrophoretic particles and black-colored electrophoretic particles.

15. The electrophoretic element according to claim 14, wherein:
the cyan-colored electrophoretic particles, the magenta-colored electrophoretic particles and the yellow-colored electrophoretic particles are charged with the same polarity and have different threshold characteristics from each other; and
the black-colored electrophoretic particles are charged with a different polarity from the cyan-colored electrophoretic particles, the magenta-colored electrophoretic particles and the yellow-colored electrophoretic particles.

16. The electrophoretic element according to claim 14, wherein:
two types of electrophoretic particles, from among the cyan-colored electrophoretic particles, the magenta-colored electrophoretic particles and the yellow-colored electrophoretic particles, are charged with the same polarity and have different threshold characteristics from each other; and
the remaining one type of electrophoretic particles, from among the cyan-colored electrophoretic particles, the magenta-colored electrophoretic particles and the yellow-colored electrophoretic particles, and the black-colored electrophoretic particles are charged with a different polarity from the two types of electrophoretic particles and have different threshold characteristics from each other.

17. The electrophoretic element according to claim 1, wherein:
   the first substrate further includes an insulating layer covering at least one of the at least three electrodes; and
   the remaining one or ones of the at least three electrodes are provided on the insulating layer.

18. The electrophoretic element according to claim 1, wherein a partition wall that divides the electrophoretic layer into pixels is absent.

19. The electrophoretic element according to claim 18, further comprising:
   a seal portion that is provided between the first substrate and the second substrate and surrounds the electrophoretic layer; and
   a plurality of spacers that are provided between the first substrate and the second substrate and define a thickness of the electrophoretic layer.

20. The electrophoretic element according to claim 1, further comprising a light-blocking layer that is provided in a region, other than the opening region, of each of the plurality of pixels, and is located on a front side relative to the electrophoretic layer,
   wherein two or more of the at least three electrodes of the first substrate are placed so as to oppose the light-blocking layer.

* * * * *